US005574825A

United States Patent [19]

Chen et al.

[11] Patent Number: 5,574,825

[45] Date of Patent: * Nov. 12, 1996

[54] LINEAR PREDICTION COEFFICIENT GENERATION DURING FRAME ERASURE OR PACKET LOSS

[75] Inventors: Juin-Hwey Chen, Neshanic Station, N.J.; Craig R. Watkins, Latham, Australia

[73] Assignee: Lucent Technologies Inc., Murray Hill, N.J.

[ * ] Notice: The term of this patent shall not extend beyond the expiration date of Pat. No. 5,450,449.

[21] Appl. No.: 212,475

[22] Filed: Mar. 14, 1994

[51] Int. Cl.$^6$ .............................. C10L 3/02; H04B 14/06

[52] U.S. Cl. ........................ 395/2.37; 395/2.28; 395/2.41; 375/350

[58] Field of Search ............................ 375/350; 348/409; 395/2, 2.1, 2.35–2.37, 2.41; 381/351

[56] References Cited

U.S. PATENT DOCUMENTS 5,450,449 9/1995 Kroon ..................................... 375/350

OTHER PUBLICATIONS

Lara–Barron et al, "Packet based embedded encoding for transmission of low–bit–rate–encoded speech in packet networks"; IEEE Proceedings. Part I: Communications, Speech and Vision, vol. 139 iss. 5, Oct. 1992.

Study Group XV—Contribution No., "Title: A Solution for the P50 Problem:," International Telegraph and Telephone Consultative Committee (CCITT) Study Period 1989–1992, COM XV–No., 1–7 (May 1992).

R. V. Cox et al., "Robust CELP Coders for Noisy Backgrounds and Noise Channels," *IEEE,* 739–742 (1989).

D. J. Goodman et al., "Waveform Substitution Techniques for Recovering Missing Speech Segments in Packet Voice Communications," *IEEE Transactions on Acoustics, Speech, and Signal Processing,* vol. ASSP–34, No. 6, 1440–1448 (Dec. 1986).

T. Tohkura et al., "Spectral Smoothing Technique in PARCOR Speech Analysis–Synthesis," *IEEE Transactions on Acoustics, Speech, and Signal Processing,* vol. ASSP–26, No. 6, 587–596 (Dec. 1978).

*Primary Examiner*—David K. Moore
*Assistant Examiner*—Tariq R. Hafiz
*Attorney, Agent, or Firm*—Thomas A. Restaino; Kenneth M. Brown

[57] ABSTRACT

A speech coding system robust to frame erasure (or packet loss) is described. Illustrative embodiments are directed to a modified version of CCITT standard G.728. In the event of frame erasure, vectors of an excitation signal are synthesized based on previously stored excitation signal vectors generated during non-erased frames. This synthesis differs for voiced and non-voiced speech. During erased frames, linear prediction filter coefficients are synthesized as a weighted extrapolation of a set of linear prediction filter coefficients determined during non-erased frames. The weighting factor is a number less than 1. This weighting accomplishes a bandwidth-expansion of peaks in the frequency response of a linear predictive filter. Computational complexity during erased frames is reduced through the elimination of certain computations needed during non-erased frames only. This reduction in computational complexity offsets additional computation required for excitation signal synthesis and linear prediction filter coefficient generation during erased frames.

6 Claims, 7 Drawing Sheets

FIG. 1
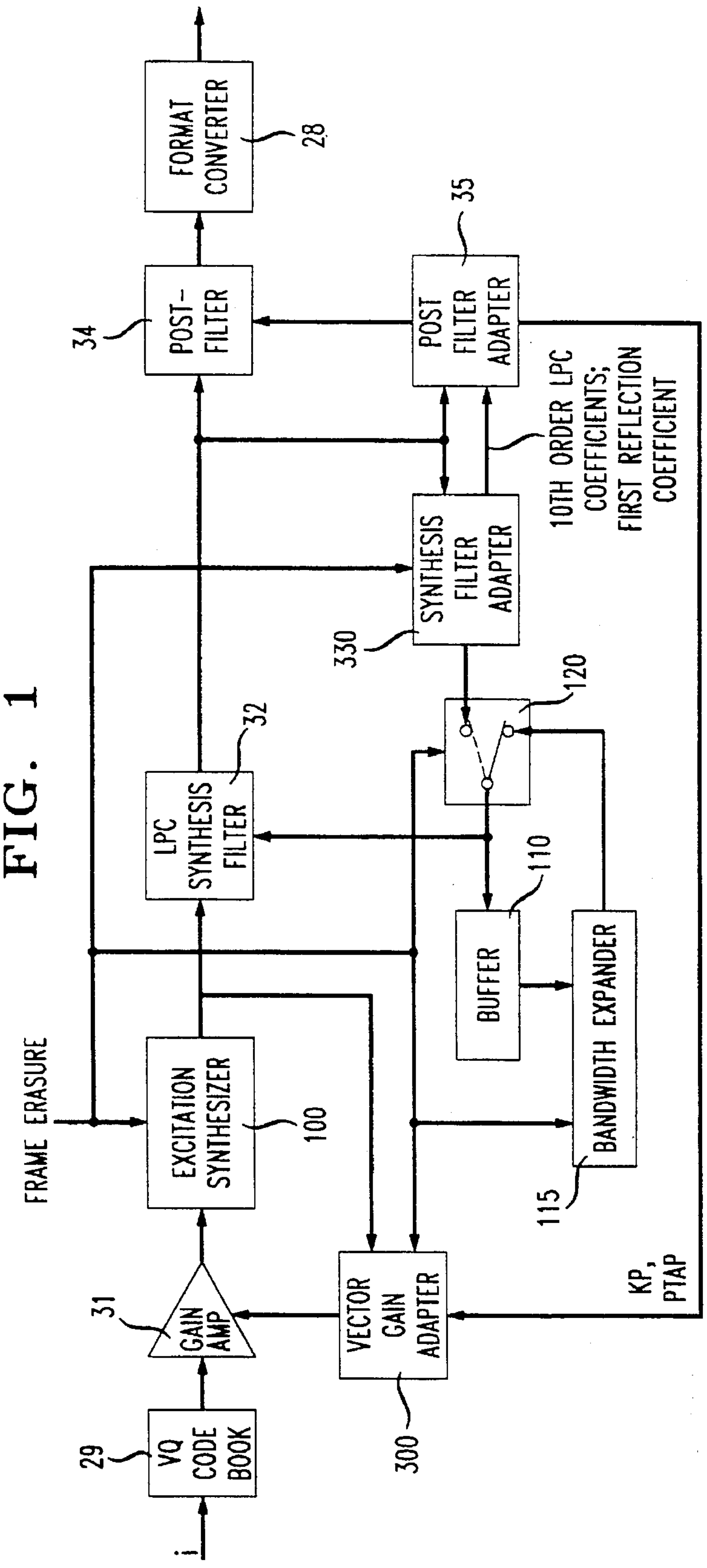
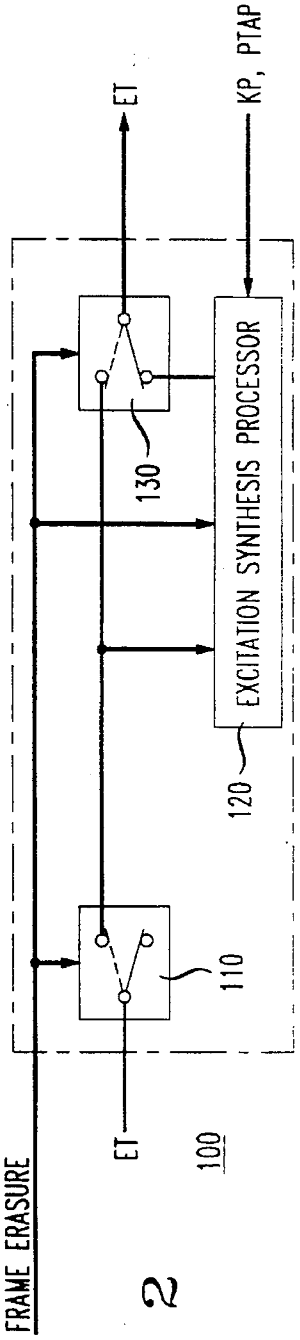
FIG. 2

LINEAR PREDICTION COEFFICIENT GENERATION DURING FRAME ERASURE OR PACKET LOSS

FIELD OF THE INVENTION

The present invention relates generally to speech coding arrangements for use in wireless communication systems, and more particularly to the ways in which such speech coders function in the event of burst-like errors in wireless transmission.

BACKGROUND OF THE INVENTION

Many communication systems, such as cellular telephone and personal communications systems, rely on wireless channels to communicate information. In the course of communicating such information, wireless communication channels can suffer from several sources of error, such as multipath fading. These error sources can cause, among other things, the problem of frame erasure. An erasure refers to the total loss or substantial corruption of a set of bits communicated to a receiver. A frame is a predetermined fixed number of bits.

If a frame of bits is totally lost, then the receiver has no bits to interpret. Under such circumstances, the receiver may produce a meaningless result. If a frame of received bits is corrupted and therefore unreliable, the receiver may produce a severely distorted result.

As the demand for wireless system capacity has increased, a need has arisen to make the best use of available wireless system bandwidth. One way to enhance the efficient use of system bandwidth is to employ a signal compression technique. For wireless systems which carry speech signals, speech compression (or speech coding) techniques may be employed for this purpose. Such speech coding techniques include analysis-by-synthesis speech coders, such as the well-known code-excited linear prediction (or CELP) speech coder.

The problem of packet loss in packet-switched networks employing speech coding arrangements is very similar to frame erasure in the wireless context. That is, due to packet loss, a speech decoder may either fail to receive a frame or receive a frame having a significant number of missing bits. In either case, the speech decoder is presented with the same essential problem—the need to synthesize speech despite the loss of compressed speech information. Both "frame erasure" and "packet loss" concern a communication channel (or network) problem which causes the loss of transmitted bits. For purposes of this description, therefore, the term "frame erasure" may be deemed synonymous with packet loss.

CELP speech coders employ a codebook of excitation signals to encode an original speech signal. These excitation signals are used to "excite" a linear predictive (LPC) filter which synthesizes a speech signal (or some precursor to a speech signal) in response to the excitation. The synthesized speech signal is compared to the signal to be coded. The codebook excitation signal which most closely matches the original signal is identified. The identified excitation signal's codebook index is then communicated to a CELP decoder (depending upon the type of CELP system, other types of information may be communicated as well). The decoder contains a codebook identical to that of the CELP coder. The decoder uses the transmitted index to select an excitation signal from its own codebook. This selected excitation signal is used to excite the decoder's LPC filter. Thus excited, the LPC filter of the decoder generates a decoded (or quantized) speech signal—the same speech signal which was previously determined to be closest to the original speech signal.

Wireless and other systems which employ speech coders may be more sensitive to the problem of frame erasure than those systems which do not compress speech. This sensitivity is due to the reduced redundancy of coded speech (compared to uncoded speech) making the possible loss of each communicated bit more significant. In the context of a CELP speech coders experiencing frame erasure, excitation signal codebook indices may be either lost or substantially corrupted. Because of the erased frame(s), the CELP decoder will not be able to reliably identify which entry in its codebook should be used to synthesize speech. As a result, speech coding system performance may degrade significantly.

As a result of lost excitation signal codebook indicies, normal techniques for synthesizing an excitation signal in a decoder are ineffective. These techniques must therefore be replaced by alternative measures. A further result of the loss of codebook indices is that the normal signals available for use in generating linear prediction coefficients are unavailable. Therefore, an alternative technique for generating such coefficients is needed.

SUMMARY OF THE INVENTION

The present invention generates linear prediction coefficient signals during frame erasure based on a weighted extrapolation of linear prediction coefficient signals generated during a non-erased frame. This weighted extrapolation accomplishes an expansion of the bandwidth of peaks in the frequency response of a linear prediction filter.

Illustratively, linear prediction coefficient signals generated during a non-erased frame are stored in a buffer memory. When a frame erasure occurs, the last "good" set of coefficient signals are weighted by a bandwidth expansion factor raised to an exponent. The exponent is the index identifying the coefficient of interest. The factor is a number in the range of 0.95 to 0.99.

BRIEF DESCRIPTION OF THE DRAWINGS

FIG. 1 presents a block diagram of a G.728 decoder modified in accordance with the present invention.

FIG. 2 presents a block diagram of an illustrative excitation synthesizer of FIG. 1 in accordance with the present invention.

DETAILED DESCRIPTION

I. Introduction

Figure 3:
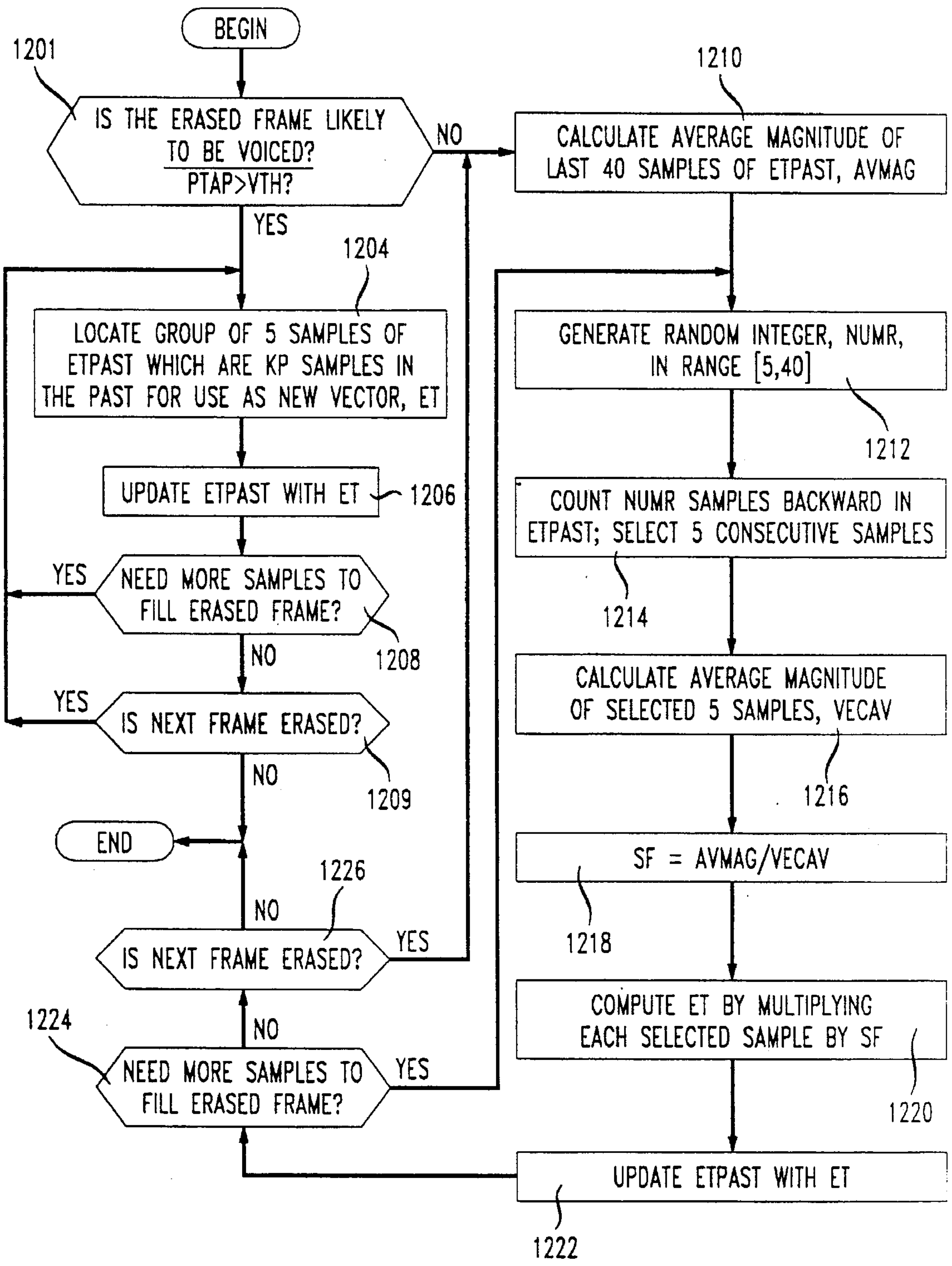
FIG. 3 presents a block-flow diagram of the synthesis mode operation of an excitation synthesis processor of FIG. 2.

The present invention concerns the operation of a speech coding system experiencing frame erasure—that is, the loss of a group of consecutive bits in the compressed bit-stream which group is ordinarily used to synthesize speech. The description which follows concerns features of the present invention applied illustratively to the well-known 16 kbit/s low-delay CELP (LD-CELP) speech coding system adopted by the CCITT as its international standard G.728 (for the convenience of the reader, the draft recommendation which was adopted as the G.728 standard is attached hereto as an Appendix; the draft will be referred to herein as the "G.728 standard draft"). This description notwithstanding, those of ordinary skill in the art will appreciate that features of the present invention have applicability to other speech coding systems.

The G.728 standard draft includes detailed descriptions of the speech encoder and decoder of the standard (See G.728 standard draft, sections 3 and 4). The first illustrative embodiment concerns modifications to the decoder of the standard. While no modifications to the encoder are required to implement the present invention, the present invention may be augmented by encoder modifications. In fact, one illustrative speech coding system described below includes a modified encoder.

Knowledge of the erasure of one or more frames is an input to the illustrative embodiment of the present invention. Such knowledge may be obtained in any of the conventional ways well known in the art. For example, frame erasures may be detected through the use of a conventional error detection code. Such a code would be implemented as part of a conventional radio transmission/reception subsystem of a wireless communication system.

For purposes of this description, the output signal of the decoder's LPC synthesis filter, whether in the speech domain or in a domain which is a precursor to the speech domain, will be referred to as the "speech signal." Also, for clarity of presentation, an illustrative frame will be an integral multiple of the length of an adaptation cycle of the G.728 standard. This illustrative frame length is, in fact, reasonable and allows presentation of the invention without loss of generality. It may be assumed, for example, that a frame is 10 ms in duration or four times the length of a G.728 adaptation cycle. The adaptation cycle is 20 samples and corresponds to a duration of 2.5 ms.

For clarity of explanation, the illustrative embodiment of the present invention is presented as comprising individual functional blocks. The functions these blocks represent may be provided through the use of either shared or dedicated hardware, including, but not limited to, hardware capable of executing software. For example, the blocks presented in FIGS. 1, 2, 6, and 7 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

II. An Illustrative Embodiment

FIG. 1 presents a block diagram of a G.728 LD-CELP decoder modified in accordance with the present invention (FIG. 1 is a modified version of FIG. 3 of the G.728 standard draft). In normal operation (i.e., without experiencing frame erasure) the decoder operates in accordance with G.728. It first receives codebook indices, i, from a communication channel. Each index represents a vector of five excitation signal samples which may be obtained from excitation VQ codebook 29. Codebook 29 comprises gain and shape codebooks as described in the G.728 standard draft. Codebook 29 uses each received index to extract an excitation codevector. The extracted codevector is that which was determined by the encoder to be the best match with the original signal. Each extracted excitation codevector is scaled by gain amplifier 31. Amplifier 31 multiplies each sample of the excitation vector by a gain determined by vector gain adapter 300 (the operation of vector gain adapter 300 is discussed below). Each scaled excitation vector, ET, is provided as an input to an excitation synthesizer 100. When no frame erasures occur, synthesizer 100 simply outputs the scaled excitation vectors without change. Each scaled excitation vector is then provided as input to an LPC synthesis filter 32. The LPC synthesis filter 32 uses LPC coefficients provided by a synthesis filter adapter 330 through switch 120 (switch 120 is configured according to the "dashed" line when no frame erasure occurs; the operation of synthesis filter adapter 330, switch 120, and bandwidth expander 115 are discussed below). Filter 32 generates decoded (or "quantized") speech. Filter 32 is a 50th order synthesis filter capable of introducing periodicity in the decoded speech signal (such periodicity enhancement generally requires a filter of order greater than 20). In accordance with the G.728 standard, this decoded speech is then postfiltered by operation of postfilter 34 and postfilter adapter 35. Once postfiltered, the format of the decoded speech is converted to an appropriate standard format by format converter 28. This format conversion facilitates subsequent use of the decoded speech by other systems.

A. Excitation Signal Synthesis During Frame Erasure

In the presence of frame erasures, the decoder of FIG. 1 does not receive reliable information (if it receives anything at all) concerning which vector of excitation signal samples should be extracted from codebook 29. In this case, the decoder must obtain a substitute excitation signal for use in synthesizing a speech signal. The generation of a substitute excitation signal during periods of frame erasure is accomplished by excitation synthesizer 100.

FIG. 2 presents a block diagram of an illustrative excitation synthesizer 100 in accordance with the present invention. During frame erasures, excitation synthesizer 100 generates one or more vectors of excitation signal samples based on previously determined excitation signal samples. These previously determined excitation signal samples were extracted with use of previously received codebook indices received from the communication channel. As shown in FIG. 2, excitation synthesizer 100 includes tandem switches 110, 130 and excitation synthesis processor 120. Switches 110, 130 respond to a frame erasure signal to switch the mode of the synthesizer 100 between normal mode (no frame erasure) and synthesis mode (frame erasure). The frame erasure signal is a binary flag which indicates whether the current frame is normal (e.g., a value of "0") or erased (e.g., a value of "1"). This binary flag is refreshed for each frame.

1. Normal Mode

In normal mode (shown by the dashed lines in switches 110 and 130), synthesizer 100 receives gain-scaled excitation vectors, ET (each of which comprises five excitation sample values), and passes those vectors to its output. Vector sample values are also passed to excitation synthesis processor 120. Processor 120 stores these sample values in a buffer, ETPAST, for subsequent use in the event of frame erasure. ETPAST holds 200 of the most recent excitation signal sample values (i.e., 40 vectors) to provide a history of recently received (or synthesized) excitation signal values. When ETPAST is full, each successive vector of five samples pushed into the buffer causes the oldest vector of five samples to fall out of the buffer. (As will be discussed below with reference to the synthesis mode, the history of vectors may include those vectors generated in the event of frame erasure.)

2. Synthesis Mode

In synthesis mode (shown by the solid lines in switches 110 and 130), synthesizer 100 decouples the gain-scaled excitation vector input and couples the excitation synthesis processor 120 to the synthesizer output. Processor 120, in response to the frame erasure signal, operates to synthesize excitation signal vectors.

FIG. 3 presents a block-flow diagram of the operation of processor 120 in synthesis mode. At the outset of processing, processor 120 determines whether erased frame(s) are likely to have contained voiced speech (see step 1201). This may be done by conventional voiced speech detection on past speech samples. In the context of the G.728 decoder, a signal PTAP is available (from the postfilter) which may be used in a voiced speech decision process. PTAP represents the optimal weight of a single-tap pitch predictor for the decoded speech. If PTAP is large (e.g., close to 1), then the erased speech is likely to have been voiced. If PTAP is small (e.g., close to 0), then the erased speech is likely to have been non-voiced (i.e., unvoiced speech, silence, noise). An empirically determined threshold, VTH, is used to make a decision between voiced and non-voiced speech. This threshold is equal to 0.6/1.4 (where 0.6 is a voicing threshold used by the G.728 postfilter and 1.4 is an experimentally determined number which reduces the threshold so as to err on the side on voiced speech).

If the erased frame(s) is determined to have contained voiced speech, a new gain-scaled excitation vector ET is synthesized by locating a vector of samples within buffer ETPAST, the earliest of which is KP samples in the past (see step 1204). KP is a sample count corresponding to one pitch-period of voiced speech. KP may be determined conventionally from decoded speech; however, the postfilter of the G.728 decoder has this value already computed. Thus, the synthesis of a new vector, ET, comprises an extrapolation (e.g., copying) of a set of 5 consecutive samples into the present. Buffer ETPAST is updated to reflect the latest synthesized vector of sample values, ET (see step 1206). This process is repeated until a good (non-erased) frame is received (see steps 1208 and 1209). The process of steps 1204, 1206, 1208 and 1209 amount to a periodic repetition of the last KP samples of ETPAST and produce a periodic sequence of ET vectors in the erased frame(s) (where KP is the period). When a good (non-erased) frame is received, the process ends.

If the erased frame(s) is determined to have contained non-voiced speech (by step 1201), then a different synthesis procedure is implemented. An illustrative synthesis of ET vectors is based on a randomized extrapolation of groups of five samples in ETPAST. This randomized extrapolation procedure begins with the computation of an average magnitude of the most recent 40 samples of ETPAST (see step 1210). This average magnitude is designated as AVMAG. AVMAG is used in a process which insures that extrapolated ET vector samples have the same average magnitude as the most recent 40 samples of ETPAST.

A random integer number, NUMR, is generated to introduce a measure of randomness into the excitation synthesis process. This randomness is important because the erased frame contained unvoiced speech (as determined by step 1201). NUMR may take on any integer value between 5 and 40, inclusive (see step 1212). Five consecutive samples of ETPAST are then selected, the oldest of which is NUMR samples in the past (see step 1214). The average magnitude of these selected samples is then computed (see step 1216). This average magnitude is termed VECAV. A scale factor, SF, is computed as the ratio of AVMAG to VECAV (see step 1218). Each sample selected from ETPAST is then multiplied by SF. The scaled samples are then used as the synthesized samples of ET (see step 1220). These synthesized samples are also used to update ETPAST as described above (see step 1222).

If more synthesized samples are needed to fill an erased frame (see step 1224), steps 1212–1222 are repeated until the erased frame has been filled. If a consecutive subsequent frame(s) is also erased (see step 1226), steps 1210–1224 are repeated to fill the subsequent erased frame(s). When all consecutive erased frames are filled with synthesized ET vectors, the process ends.

3. Alternative Synthesis Mode for Non-voiced Speech

Figure 4:
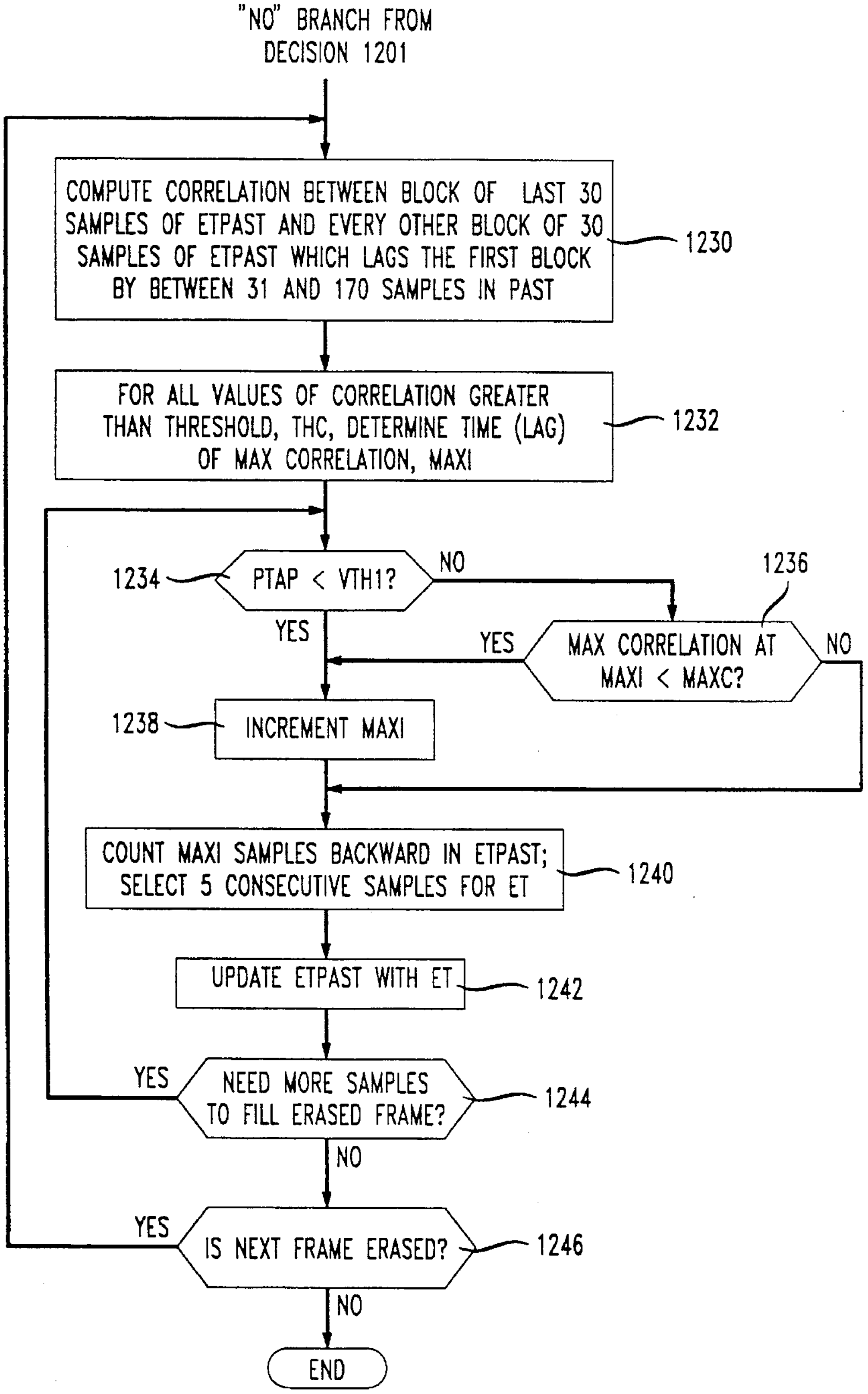
FIG. 4 presents a block-flow diagram of an alternative synthesis mode operation of the excitation synthesis processor of FIG. 2.

FIG. 4 presents a block-flow diagram of an alternative operation of processor 120 in excitation synthesis mode. In this alternative, processing for voiced speech is identical to that described above with reference to FIG. 3. The difference between alternatives is found in the synthesis of ET vectors for non-voiced speech. Because of this, only that processing associated with non-voiced speech is presented in FIG. 4.

As shown in the Figure, synthesis of ET vectors for non-voiced speech begins with the computation of correlations between the most recent block of 30 samples stored in buffer ETPAST and every other block of 30 samples of ETPAST which lags the most recent block by between 31 and 170 samples (see step 1230). For example, the most recent 30 samples of ETPAST is first correlated with a block of samples between ETPAST samples 32–61, inclusive. Next, the most recent block of 30 samples is correlated with samples of ETPAST between 33–62, inclusive, and so on. The process continues for all blocks of 30 samples up to the block containing samples between 171–200, inclusive For all computed correlation values greater than a threshold value, THC, a time lag (MAXI) corresponding to the maximum correlation is determined (see step 1232).

Next, tests are made to determine whether the erased frame likely exhibited very low periodicity. Under circumstances of such low periodicity, it is advantageous to avoid the introduction of artificial periodicity into the ET vector synthesis process. This is accomplished by varying the value of time lag MAXI. If either (i) PTAP is less than a threshold, VTH1 (see step 1234), or (ii) the maximum correlation corresponding to MAXI is less than a constant, MAXC (see step 1236), then very low periodicity is found. As a result, MAXI is incremented by 1 (see step 1238). If neither of conditions (i) and (ii) are satisfied, MAXI is not incremented. Illustrative values for VTH1 and MAXC are 0.3 and $3\times10^7$, respectively.

MAXI is then used as an index to extract a vector of samples from ETPAST. The earliest of the extracted samples are MAXI samples in the past. These extracted samples serve as the next ET vector (see step 1240). As before, buffer ETPAST is updated with the newest ET vector samples (see step 1242).

If additional samples are needed to fill the erased frame (see step 1244), then steps 1234–1242 are repeated. After all samples in the erased frame have been filled, samples in each subsequent erased frame are filled (see step 1246) by repeating steps 1230–1244. When all consecutive erased frames are filled with synthesized ET vectors, the process ends.

B. LPC Filter Coefficients for Erased Frames

In addition to the synthesis of gain-scaled excitation vectors, ET, LPC filter coefficients must be generated during erased frames. In accordance with the present invention, LPC filter coefficients for erased frames are generated through a bandwidth expansion procedure. This bandwidth expansion procedure helps account for uncertainty in the LPC filter frequency response in erased frames. Bandwidth expansion softens the sharpness of peaks in the LPC filter frequency response.

Figure 10:
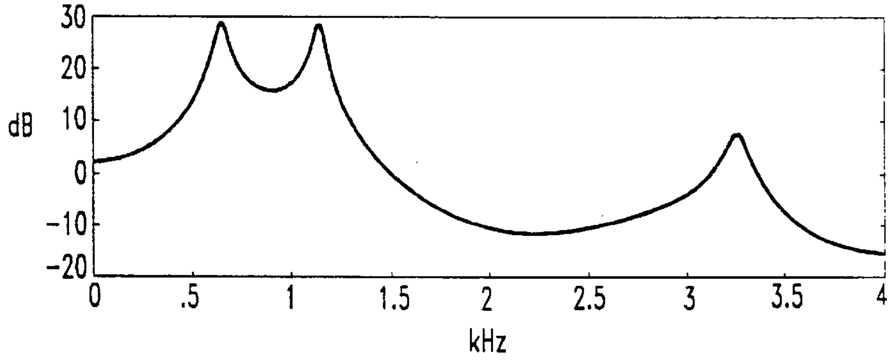
FIGS. 10 and 11 present an LPC filter frequency response and a bandwidth-expanded version of same, respectively.
Figure 11:
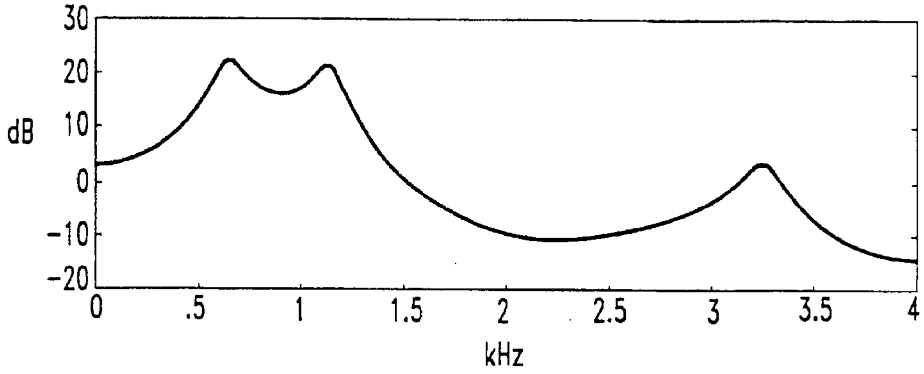

FIG. 10 presents an illustrative LPC filter frequency response based on LPC coefficients determined for a non-erased frame. As can be seen, the response contains certain "peaks." It is the proper location of these peaks during frame erasure which is a matter of some uncertainty. For example, correct frequency response for a consecutive frame might look like that response of FIG. 10 with the peaks shifted to the right or to the left. During frame erasure, since decoded speech is not available to determine LPC coefficients, these coefficients (and hence the filter frequency response) must be estimated. Such an estimation may be accomplished through bandwidth expansion. The result of an illustrative bandwidth expansion is shown in FIG. 11. As may be seen from FIG. 11, the peaks of the frequency response are attenuated resulting in an expanded 3 db bandwidth of the peaks. Such attenuation helps account for shifts in a "correct" frequency response which cannot be determined because of frame erasure.

According to the G.728 standard, LPC coefficients are updated at the third vector of each four-vector adaptation cycle. The presence of erased frames need not disturb this timing. As with conventional G.728, new LPC coefficients are computed at the third vector ET during a frame. In this case, however, the ET vectors are synthesized during an erased frame.

As shown in FIG. 1, the embodiment includes a switch 120, a buffer 110, and a bandwidth expander 115. During normal operation switch 120 is in the position indicated by the dashed line. This means that the LPC coefficients, $a_i$, are provided to the LPC synthesis filter by the synthesis filter adapter 33. Each set of newly adapted coefficients, $a_i$, is stored in buffer 110 (each new set overwriting the previously saved set of coefficients). Advantageously, bandwidth expander 115 need not operate in normal mode (if it does, its output goes unused since switch 120 is in the dashed position).

Upon the occurrence of a frame erasure, switch 120 changes state (as shown in the solid line position). Buffer 110 contains the last set of LPC coefficients as computed with speech signal samples from the last good frame. At the third vector of the erased frame, the bandwidth expander 115 computes new coefficients, $a_i'$.

Figure 5:
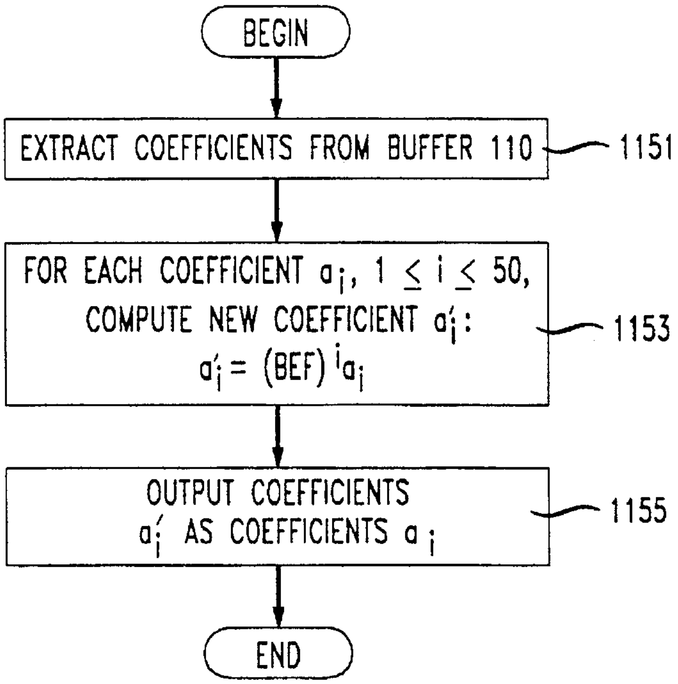
FIG. 5 presents a block-flow diagram of the LPC parameter bandwidth expansion performed by the bandwidth expander of FIG. 1.

FIG. 5 is a block-flow diagram of the processing performed by the bandwidth expander 115 to generate new LPC coefficients. As shown in the Figure, expander 115 extracts the previously saved LPC coefficients from buffer 110 (see step 1151). New coefficients $a_1'$ are generated in accordance with expression (1):

$$a_i'=(BEF)^i a_i,\ 1\leqq i\leqq 50, \tag{1}$$

where BEF is a bandwidth expansion factor illustratively takes on a value in the range 0.95–0.99 and is advantageously set to 0.97 or 0.98 (see step 1153). These newly computed coefficients are then output (see step 1155). Note that coefficients $a_i'$ are computed only once for each erased frame.

The newly computed coefficients are used by the LPC synthesis filter 32 for the entire erased frame. The LPC synthesis filter uses the new coefficients as though they were computed under normal circumstances by adapter 33. The newly computed LPC coefficients are also stored in buffer 110, as shown in FIG. 1. Should there be consecutive frame erasures, the newly computed LPC coefficients stored in the buffer 110 would be used as the basis for another iteration of bandwidth expansion according to the process presented in FIG. 5. Thus, the greater the number of consecutive erased frames, the greater the applied bandwidth expansion (i.e., for the kth erased frame of a sequence of erased frames, the effective bandwidth expansion factor is $BEF^k$).

Other techniques for generating LPC coefficients during erased frames could be employed instead of the bandwidth expansion technique described above. These include (i) the repeated use of the last set of LPC coefficients from the last good frame and (ii) use of the synthesized excitation signal in the conventional G.728 LPC adapter 33.

C. Operation of Backward Adapters During Frame Erased Frames

Figure 6:
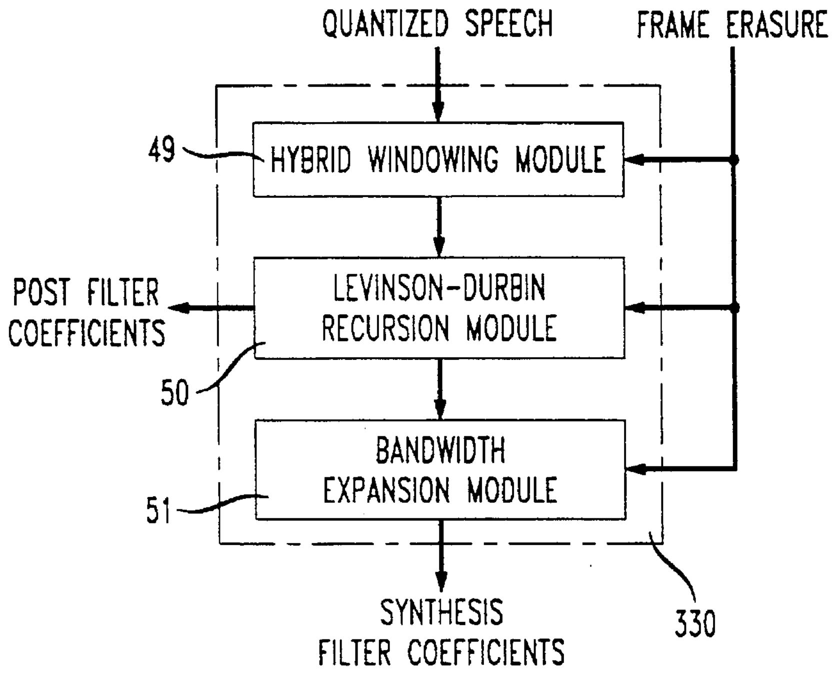
FIG. 6 presents a block diagram of the signal processing performed by the synthesis filter adapter of FIG. 1.

The decoder of the G.728 standard includes a synthesis filter adapter and a vector gain adapter (blocks 33 and 30, respectively, of FIG. 3, as well as FIGS. 5 and 6, respectively, of the G.728 standard draft). Under normal operation (i.e., operation in the absence of frame erasure), these adapters dynamically vary certain parameter values based on signals present in the decoder. The decoder of the illustrative embodiment also includes a synthesis filter adapter 330 and a vector gain adapter 300. When no frame erasure occurs, the synthesis filter adapter 330 and the vector gain adapter 300 operate in accordance with the G.728 standard. The operation of adapters 330, 300 differ from the corresponding adapters 33, 30 of G.728 only during erased frames.

As discussed above, neither the update to LPC coefficients by adapter 330 nor the update to gain predictor parameters by adapter 300 is needed during the occurrence of erased frames. In the case of the LPC coefficients, this is because such coefficients are generated through a bandwidth expansion procedure. In the case of the gain predictor parameters, this is because excitation synthesis is performed in the gain-scaled domain. Because the outputs of blocks 330 and 300 are not needed during erased frames, signal processing operations performed by these blocks 330, 300 may be modified to reduce computational complexity.

Figure 7:
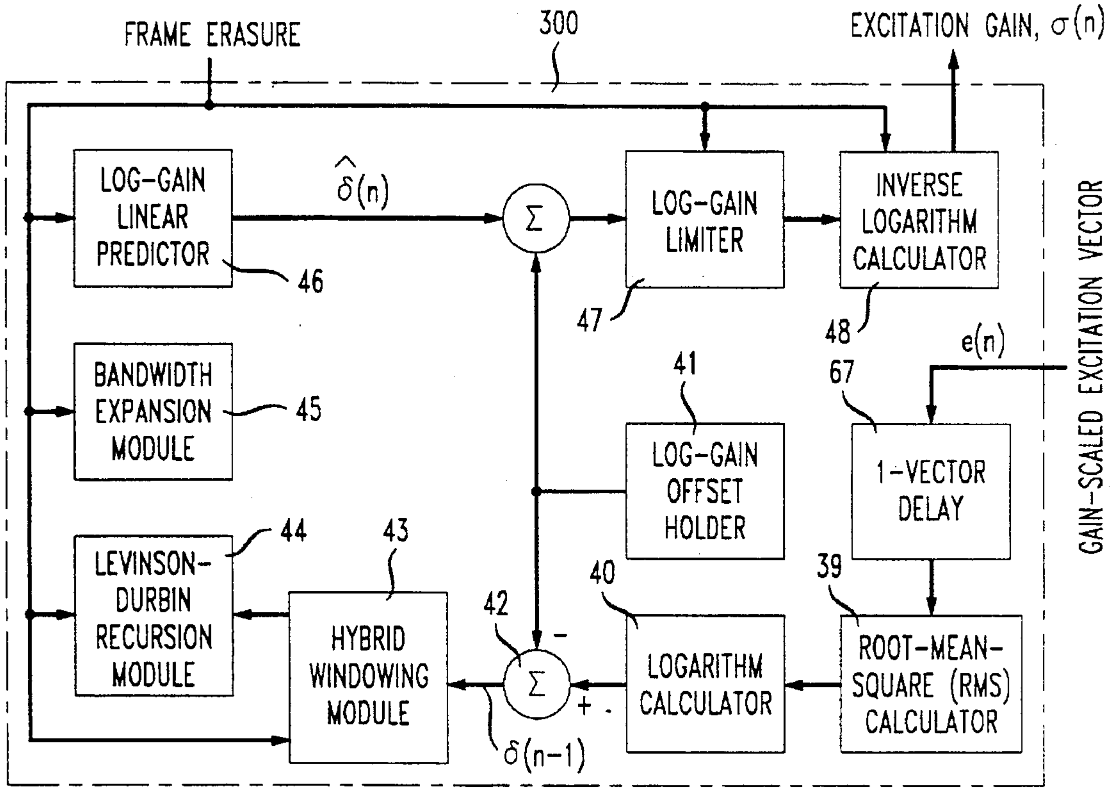
FIG. 7 presents a block diagram of the signal processing performed by the vector gain adapter of FIG. 1.

As may be seen in FIGS. 6 and 7, respectively, the adapters 330 and 300 each include several signal processing steps indicated by blocks (blocks 49–51 in FIG. 6; blocks 39–48 and 67 in FIG. 7). These blocks are generally the same as those defined by the G.728 standard draft. In the first good frame following one or more erased frames, both blocks 330 and 300 form output signals based on signals they stored in memory during an erased frame. Prior to storage, these signals were generated by the adapters based on an excitation signal synthesized during an erased frame. In the case of the synthesis filter adapter 330, the excitation signal is first synthesized into quantized speech prior to use by the adapter. In the case of vector gain adapter 300, the excitation signal is used directly. In either case, both adapters need to generate signals during an erased frame so that when the next good frame occurs, adapter output may be determined.

Advantageously, a reduced number of signal processing operations normally performed by the adapters of FIGS. 6 and 7 may be performed during erased frames. The operations which are performed are those which are either (i) needed for the formation and storage of signals used in forming adapter output in a subsequent good (i.e., non-erased) frame or (ii) needed for the formation of signals used by other signal processing blocks of the decoder during erased frames. No additional signal processing operations are necessary. Blocks 330 and 300 perform a reduced number of signal processing operations responsive to the receipt of the frame erasure signal, as shown in FIG. 1, 6, and 7. The frame erasure signal either prompts modified processing or causes the module not to operate.

Note that a reduction in the number of signal processing operations in response to a frame erasure is not required for proper operation; blocks 330 and 300 could operate normally, as though no frame erasure has occurred, with their output signals being ignored, as discussed above. Under normal conditions, operations (i) and (ii) are performed. Reduced signal processing operations, however, allow the overall complexity of the decoder to remain within the level of complexity established for a G.728 decoder under normal operation. Without reducing operations, the additional operations required to synthesize an excitation signal and bandwidth-expand LPC coefficients would raise the overall complexity of the decoder.

In the case of the synthesis filter adapter 330 presented in FIG. 6, and with reference to the pseudo-code presented in the discussion of the "HYBRID WINDOWING MODULE" at pages 28–29 of the G.728 standard draft, an illustrative reduced set of operations comprises (i) updating buffer memory SB using the synthesized speech (which is obtained by passing extrapolated ET vectors through a bandwidth expanded version of the last good LPC filter) and (ii) computing REXP in the specified manner using the updated SB buffer.

In addition, because the G.728 embodiment use a post-filter which employs 10th-order LPC coefficients and the first reflection coefficient during erased frames, the illustrative set of reduced operations further comprises (iii) the generation of signal values RTMP(1) through RTMP(11) (RTMP(12) through RTMP(51) not needed) and, (iv) with reference to the pseudo-code presented in the discussion of the "LEVINSON-DURBIN RECURSION MODULE" at pages 29–30 of the G.728 standard draft, Levinson-Durbin recursion is performed from order 1 to order 10 (with the recursion from order 11 through order 50 not needed). Note that bandwidth expansion is not performed.

In the case of vector gain adapter 300 presented in FIG. 7, an illustrative reduced set of operations comprises (i) the operations of blocks 67, 39, 40, 41, and 42, which together compute the offset-removed logarithmic gain (based on synthesized ET vectors) and GTMP, the input to block 43; (ii) with reference to the pseudo-code presented in the discussion of the "HYBRID WINDOWING MODULE" at pages 32–33, the operations of updating buffer memory SBLG with GTMP and updating REXPLG, the recursive component of the autocorrelation function; and (iii) with reference to the pseudo-code presented in the discussion of the "LOG-GAIN LINEAR PREDICTOR" at page 34, the operation of updating filter memory GSTATE with GTMP. Note that the functions of modules 44, 45, 47 and 48 are not performed.

As a result of performing the reduced set of operations during erased frames (rather than all operations), the decoder can properly prepare for the next good frame and provide any needed signals during erased frames while reducing the computational complexity of the decoder.

D. Encoder Modification

As stated above, the present invention does not require any modification to the encoder of the G.728 standard. However, such modifications may be advantageous under certain circumstances. For example, if a frame erasure occurs at the beginning of a talk spurt (e.g., at the onset of voiced speech from silence), then a synthesized speech signal obtained from an extrapolated excitation signal is generally not a good approximation of the original speech. Moreover, upon the occurrence of the next good frame there is likely to be a significant mismatch between the internal states of the decoder and those of the encoder. This mismatch of encoder and decoder states may take some time to converge.

One way to address this circumstance is to modify the adapters of the encoder (in addition to the above-described modifications to those of the G.728 decoder) so as to improve convergence speed. Both the LPC filter coefficient adapter and the gain adapter (predictor) of the encoder may be modified by introducing a spectral smoothing technique (SST) and increasing the amount of bandwidth expansion.

Figure 8:
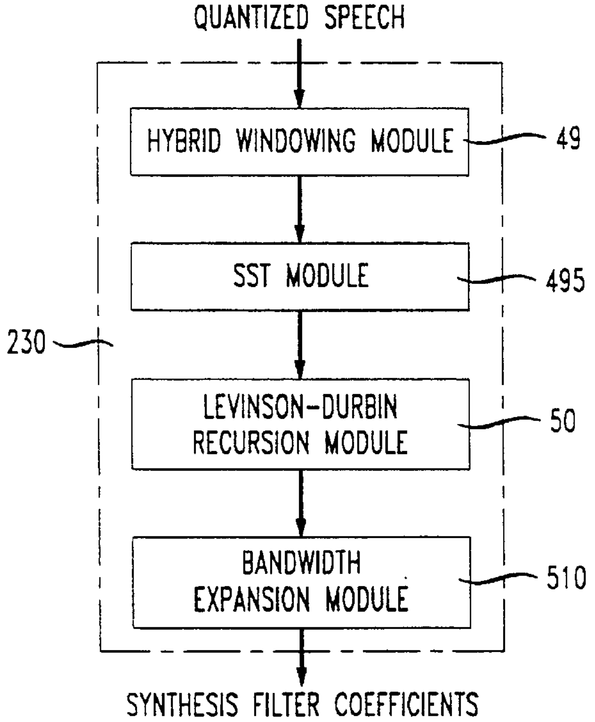
FIGS. 8 and 9 present a modified version of an LPC synthesis filter adapter and vector gain adapter, respectively, for G.728.

FIG. 8 presents a modified version of the LPC synthesis filter adapter of FIG. 5 of the G.728 standard draft for use in the encoder. The modified synthesis filter adapter 230 includes hybrid windowing module 49, which generates autocorrelation coefficients; SST module 495, which performs a spectral smoothing of autocorrelation coefficients from windowing module 49; Levinson-Durbin recursion module 50, for generating synthesis filter coefficients; and bandwidth expansion module 510, for expanding the bandwidth of the spectral peaks of the LPC spectrum. The SST module 495 performs spectral smoothing of autocorrelation coefficients by multiplying the buffer of autocorrelation coefficients, RTMP(1)–RTMP(51), with the right half of a Gaussian window having a standard deviation of 60 Hz. This windowed set of autocorrelation coefficients is then applied to the Levinson-Durbin recursion module 50 in the normal fashion. Bandwidth expansion module 510 operates on the synthesis filter coefficients like module 51 of the G.728 of the standard draft, but uses a bandwidth expansion factor of 0.96, rather than 0.988.

Figure 9:
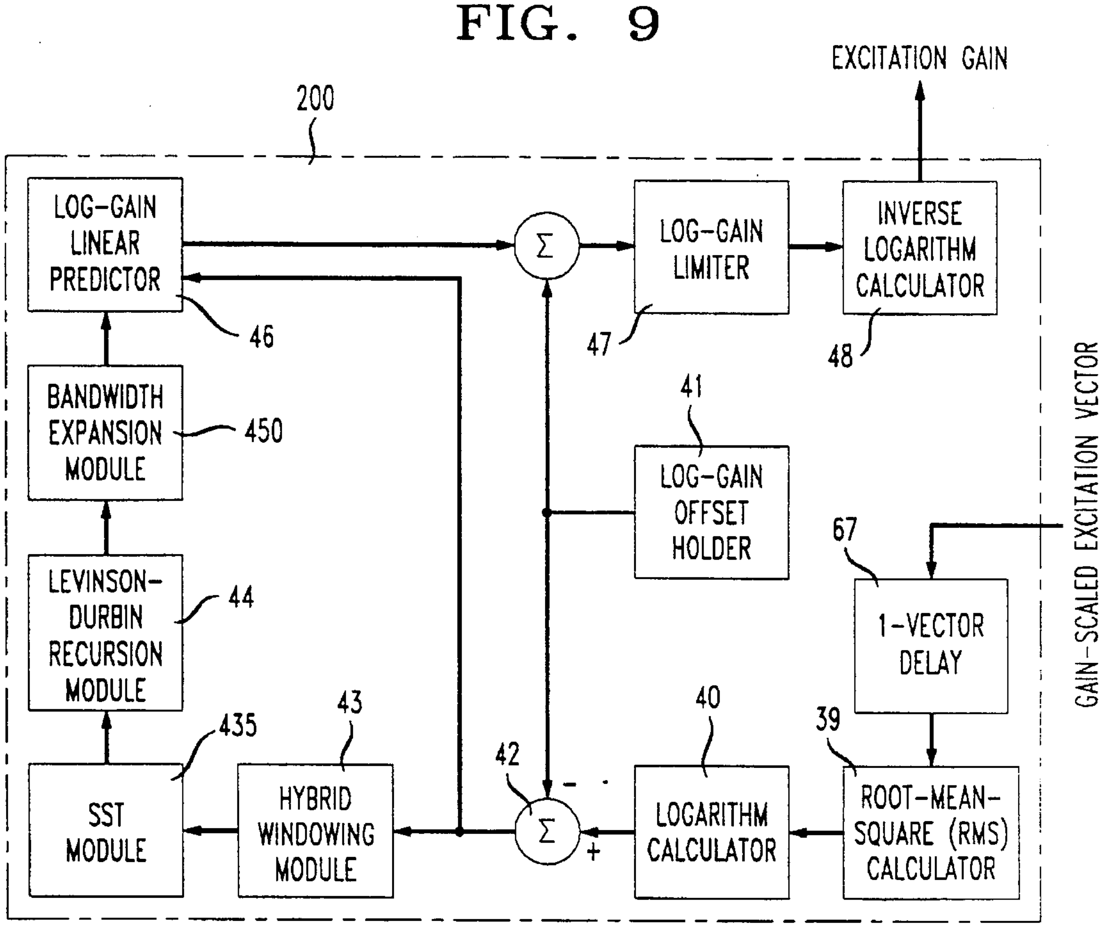

FIG. 9 presents a modified version of the vector gain adapter of FIG. 6 of the G.728 standard draft for use in the encoder. The adapter 200 includes a hybrid windowing module 43, an SST module 435, a Levinson-Durbin recursion module 44, and a bandwidth expansion module 450. All blocks in FIG. 9 are identical to those of FIG. 6 of the G.728 standard except for new blocks 435 and 450. Overall, modules 43,435, 44, and 450 are arranged like the modules of FIG. 8 referenced above. Like SST module 495 of FIG. 8, SST module 435 of FIG. 9 performs a spectral smoothing of autocorrelation coefficients by multiplying the buffer of autocorrelation coefficients, R(1)–R(11), with the right half of a Gaussian window. This time, however, the Gaussian window has a standard deviation of 45 Hz. Bandwidth expansion module 450 of FIG. 9 operates on the synthesis filter coefficients like the bandwidth expansion module 51 of FIG. 6 of the G.728 standard draft, but uses a bandwidth expansion factor of 0.87, rather than 0.906.

E. An Illustrative Wireless System

Figure 12:
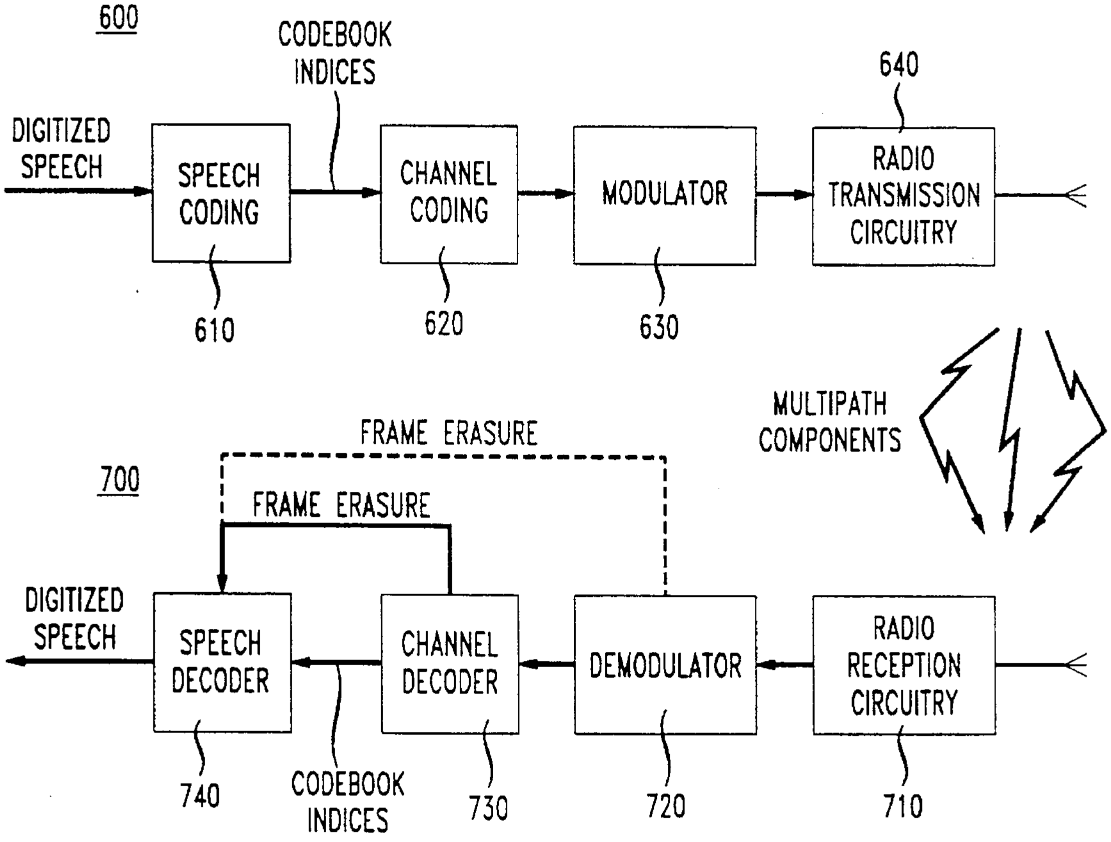
FIG. 12 presents an illustrative wireless communication system in accordance with the present invention.

As stated above, the present invention has application to wireless speech communication systems. FIG. 12 presents an illustrative wireless communication system employing an embodiment of the present invention. FIG. 12 includes a transmitter 600 and a receiver 700. An illustrative embodiment of the transmitter 600 is a wireless base station. An illustrative embodiment of the receiver 700 is a mobile user terminal, such as a cellular or wireless telephone, or other personal communications system device. (Naturally, a wireless base station and user terminal may also include receiver and transmitter circuitry, respectively.) The transmitter 600 includes a speech coder 610, which may be, for example, a coder according to CCITT standard G.728. The transmitter further includes a conventional channel coder 620 to provide error detection (or detection and correction) capability; a conventional modulator 630; and conventional radio transmission circuitry; all well known in the art. Radio signals transmitted by transmitter 600 are received by receiver 700 through a transmission channel. Due to, for example, possible destructive interference of various multipath components of the transmitted signal, receiver 700 may be in a deep fade preventing the clear reception of transmitted bits. Under such circumstances, frame erasure may occur.

Receiver 700 includes conventional radio receiver circuitry 710, conventional demodulator 720, channel decoder 730, and a speech decoder 740 in accordance with the present invention. Note that the channel decoder generates a frame erasure signal whenever the channel decoder determines the presence of a substantial number of bit errors (or unreceived bits). Alternatively (or in addition to a frame erasure signal from the channel decoder), demodulator 720 may provide a frame erasure signal to the decoder 740.

F. Discussion

Although specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

For example, while the present invention has been described in the context of the G.728 LD-CELP speech coding system, features of the invention may be applied to other speech coding systems as well. For example, such coding systems may include a long-term predictor (or long-term synthesis filter) for converting a gain-scaled excitation signal to a signal having pitch periodicity. Or, such a coding system may not include a postfilter.

In addition, the illustrative embodiment of the present invention is presented as synthesizing excitation signal samples based on a previously stored gain-scaled excitation signal samples. However, the present invention may be implemented to synthesize excitation signal samples prior to gain-scaling (i.e., prior to operation of gain amplifier 31). Under such circumstances, gain values must also be synthesized (e.g., extrapolated).

In the discussion above concerning the synthesis of an excitation signal during erased frames, synthesis was accomplished illustratively through an extrapolation procedure. It will be apparent to those of skill in the art that other synthesis techniques, such as interpolation, could be employed.

As used herein, the term "filter refers to conventional structures for signal synthesis, as well as other processes accomplishing a filter-like synthesis function. Such other processes include the manipulation of Fourier transform coefficients a filter-like result (with or without the removal of perceptually irrelevant information).

APPENDIX

Draft Recommendation G.728

Coding of Speech at 16 kbit/s
Using
Low-Delay Code Excited Linear Prediction (LD-CELP)

1. INTRODUCTION

This recommendation contains the description of an algorithm for the coding of speech signals at 16 kbit/s using Low-Delay Code Excited Linear Prediction (LD-CELP). This recommendation is organized as follows.

In Section 2 a brief outline of the LD-CELP algorithm is given. In Sections 3 and 4, the LD-CELP encoder and LD-CELP decoder principles are discussed, respectively. In Section 5, the computational details pertaining to each functional algorithmic block are defined. Annexes A, B, C and D contain tables of constants used by the LD-CELP algorithm. In Annex E the sequencing of variable adaptation and use is given. Finally, in Appendix I information is given on procedures applicable to the implementation verification of the algorithm.

Under further study is the future incorporation of three additional appendices (to be published separately) consisting of LD-CELP network aspects, LD-CELP fixed-point implementation description, and LD-CELP fixed-point verification procedures.

2. OUTLINE OF LD-CELP

The LD-CELP algorithm consists of an encoder and a decoder described in Sections 2.1 and 2.2 respectively, and illustrated in Figure 1/G.728.

The essence of CELP techniques, which is an analysis-by-synthesis approach to codebook search, is retained in LD-CELP. The LD-CELP however, uses backward adaptation of predictors and gain to achieve an algorithmic delay of 0.625 ms. Only the index to the excitation codebook is transmitted. The predictor coefficients are updated through LPC analysis of previously quantized speech. The excitation gain is updated by using the gain information embedded in the previously quantized excitation. The block size for the excitation vector and gain adaptation is 5 samples only. A perceptual weighting filter is updated using LPC analysis of the unquantized speech.

*2.1 LD-CELP Encoder*

After the conversion from A-law or μ-law PCM to uniform PCM, the input signal is partitioned into blocks of 5 consecutive input signal samples. For each input block, the encoder passes each of 1024 candidate codebook vectors (stored in an excitation codebook) through a gain scaling unit and a synthesis filter. From the resulting 1024 candidate quantized signal vectors, the encoder identifies the one that minimizes a frequency-weighted mean-squared error measure with respect to the input signal vector. The 10-bit codebook index of the corresponding best codebook vector (or "codevector") which gives rise to that best candidate quantized signal vector is transmitted to the decoder. The best codevector is then passed through the gain scaling unit and the synthesis filter to establish the correct filter memory in preparation for the encoding of the next signal vector. The synthesis filter coefficients and the gain are updated periodically in a backward adaptive manner based on the previously quantized signal and gain-scaled excitation.

*2.2 LD-CELP Decoder*

The decoding operation is also performed on a block-by-block basis. Upon receiving each 10-bit index, the decoder performs a table look-up to extract the corresponding codevector from the excitation codebook. The extracted codevector is then passed through a gain scaling unit and a synthesis filter to produce the current decoded signal vector. The synthesis filter coefficients and the gain are then updated in the same way as in the encoder. The decoded signal vector is then passed through an adaptive postfilter to enhance the perceptual quality. The postfilter coefficients are updated periodically using the information available at the decoder. The 5 samples of the postfilter signal vector are next converted to 5 A-law or μ-law PCM output samples.

3. LD-CELP ENCODER PRINCIPLES

Figure 2/G.728 is a detailed block schematic of the LD-CELP encoder. The encoder in Figure 2/G.728 is mathematically equivalent to the encoder previously shown in Figure 1/G.728 but is computationally more efficient to implement.

In the following description, a. For each variable to be described, $k$ is the sampling index and samples are taken at 125 μs intervals.

b. A group of 5 consecutive samples in a given signal is called a *vector* of that signal. For example, 5 consecutive speech samples form a speech vector, 5 excitation samples form an excitation vector, and so on.

c. We use $n$ to denote the vector index, which is different from the sample index $k$.

d. Four consecutive vectors build one *adaptation cycle*. In a later section, we also refer to adaptation cycles as *frames*. The two terms are used interchangably.

The excitation Vector Quantization (VQ) codebook index is the only information explicitly transmitted from the encoder to the decoder. Three other types of parameters will be periodically updated: the excitation gain, the synthesis filter coefficients, and the perceptual weighting filter coefficients. These parameters are derived in a backward adaptive manner from signals that occur prior to the current signal vector. The excitation gain is updated once per vector, while the synthesis filter coefficients and the perceptual weighting filter coefficients are updated once every 4 vectors (i.e., a 20-sample, or 2.5 ms update period). Note that, although the processing sequence in the algorithm has an adaptation cycle of 4 vectors (20 samples), the basic buffer size is still only 1 vector (5 samples). This small buffer size makes it possible to achieve a one-way delay less than 2 ms.

A description of each block of the encoder is given below. Since the LD-CELP coder is mainly used for encoding speech, for convenience of description, in the following we will assume that the input signal is speech, although in practice it can be other non-speech signals as well.

*3.1 Input PCM Format Conversion*

This block converts the input A-law or μ-law PCM signal $s_o(k)$ to a uniform PCM signal $s_u(k)$.

*3.1.1 Internal Linear PCM Levels*

In converting from *A*-law or μ-law to linear PCM, different internal representations are possible, depending on the device. For example, standard tables for μ-law PCM define a linear range of -4015.5 to +4015.5. The corresponding range for *A*-law PCM is -2016 to +2016. Both tables list some output values having a fractional part of 0.5. These fractional parts cannot be represented in an integer device unless the entire table is multiplied by 2 to make all of the values integers. In fact, this is what is most commonly done in fixed point Digital Signal Processing (DSP) chips. On the other hand, floating point DSP chips can represent the same values listed in the tables. Throughout this document it is assumed that the input signal has a maximum range of -4095 to +4095. This encompasses both the μ-law and *A*-law cases. In the case of *A*-law it implies that when the linear conversion results in a range of -2016 to +2016, those values should be scaled up by a factor of 2 before continuing to encode the signal. In the case of μ-law input to a fixed point processor where the input range is converted to -8031 to +8031, it implies that values should be scaled down by a factor of 2 before beginning the encoding process. Alternatively, these values can be treated as being in Q1 format, meaning there is 1 bit to the right of the decimal point. All computation involving the data would then need to take this bit into account.

For the case of 16-bit linear PCM input signals having the full dynamic range of -32768 to +32767, the input values should be considered to be in Q3 format. This means that the input values should be scaled down (divided) by a factor of 8. On output at the decoder the factor of 8 would be restored for these signals.

*3.2 Vector Buffer*

This block buffers 5 consecutive speech samples $s_u(5n)$, $s_u(5n+1)$, ..., $s_u(5n+4)$ to form a 5-dimensional speech vector $s(n) = [s_u(5n), s_u(5n+1), \cdots, s_u(5n+4)]$.

*3.3 Adapter for Perceptual Weighting Filter*

Figure 4/G.728 shows the detailed operation of the perceptual weighting filter adapter (block 3 in Figure 2/G.728). This adapter calculates the coefficients of the perceptual weighting filter once every 4 speech vectors based on linear prediction analysis (often referred to as LPC analysis) of unquantized speech. The coefficient updates occur at the third speech vector of every 4-vector adaptation cycle. The coefficients are held constant in between updates.

Refer to Figure 4(a)/G.728. The calculation is performed as follows. First, the input (unquantized) speech vector is passed through a hybrid windowing module (block 36) which places a window on previous speech vectors and calculates the first 11 autocorrelation coefficients of the windowed speech signal as the output. The Levinson-Durbin recursion module (block 37) then converts these autocorrelation coefficients to predictor coefficients. Based on these predictor coefficients, the weighting filter coefficient calculator (block 38) derives the desired coefficients of the weighting filter. These three blocks are discussed in more detail below.

First, let us describe the principles of hybrid windowing. Since this hybrid windowing technique will be used in three different kinds of LPC analyses, we first give a more general description of the technique and then specialize it to different cases. Suppose the LPC analysis is to be performed once every $L$ signal samples. To be general, assume that the signal samples corresponding to the current LD-CELP adaptation cycle are $s_u(m)$, $s_u(m+1)$, $s_u(m+2)$, ..., $s_u(m+L-1)$. Then, for backward-adaptive LPC analysis, the hybrid window is applied to all previous signal samples with a sample index less than $m$ (as shown in Figure 4(b)/G.728). Let there be $N$ non-recursive samples in the hybrid window function. Then, the signal samples $s_u(m-1)$, $s_u(m-2)$, ..., $s_u(m-N)$ are all weighted by the non-recursive portion of the window. Starting with $s_u(m-N-1)$, all signal samples to the left of (and including) this sample are weighted by the recursive portion of the window, which has values $b$, $b\alpha$, $b\alpha^2$, ..., where $0 < b < 1$ and $0 < \alpha < 1$.

At time $m$, the hybrid window function $w_m(k)$ is defined as $$w_m(k) = \begin{cases} f_m(k) = b\alpha^{-[k-(m-N-1)]}, & \text{if } k \le m-N-1 \\ g_m(k) = -\sin[c\,(k-m)], & \text{if } m-N \le k \le m-1 \\ 0, & \text{if } k \ge m \end{cases} \tag{1a}$$

and the window-weighted signal is $$s_m(k) = s_u(k)w_m(k) = \begin{cases} s_u(k)f_m(k) = s_u(k)b\alpha^{-[k-(m-N-1)]}, & \text{if } k \le m-N-1 \\ s_u(k)g_m(k) = -s_u(k)\sin[c\,(k-m)], & \text{if } m-N \le k \le m-1 \\ 0, & \text{if } k \ge m \end{cases} \tag{1b}$$

The samples of non-recursive portion $g_m(k)$ and the initial section of the recursive portion $f_m(k)$ for different hybrid windows are specified in Annex A. For an $M$-th order LPC analysis, we need to calculate $M+1$ autocorrelation coefficients $R_m(i)$ for $i = 0, 1, 2, ..., M$. The $i$-th autocorrelation coefficient for the current adaptation cycle can be expressed as $$R_m(i) = \sum_{k=-\infty}^{m-1} s_m(k)s_m(k-i) = r_m(i) + \sum_{k=m-N}^{m-1} s_m(k)s_m(k-i), \tag{1c}$$

where $$r_m(i) = \sum_{k=-\infty}^{m-N-1} s_m(k)s_m(k-i) = \sum_{k=-\infty}^{m-N-1} s_u(k)s_u(k-i)f_m(k)f_m(k-i). \tag{1d}$$

On the right-hand side of equation (1c), the first term $r_m(i)$ is the "recursive component" of $R_m(i)$, while the second term is the "non-recursive component". The finite summation of the non-recursive component is calculated for each adaptation cycle. On the other hand, the recursive component is calculated recursively. The following paragraphs explain how.

Suppose we have calculated and stored all $r_m(i)$'s for the current adaptation cycle and want to go on to the next adaptation cycle, which starts at sample $s_u(m+L)$. After the hybrid window is shifted to the right by $L$ samples, the new window-weighted signal for the next adaptation cycle becomes $$s_{m+L}(k)=s_u(k)w_{m+L}(k)=\begin{cases} s_u(k)f_{m+L}(k)=s_u(k)f_m(k)\alpha^L, & \text{if } k\le m+L-N-1 \\ s_u(k)g_{m+L}(k)=-s_u(k)\sin[c(k-m-L)], & \text{if } m+L-N\le k\le m+L-1 \\ 0, & \text{if } k\ge m+L \end{cases} \quad (1e)$$

The recursive component of $R_{m+L}(i)$ can be written as $$\begin{aligned} r_{m+L}(i) &= \sum_{k=-\infty}^{m+L-N-1} s_{m+L}(k)s_{m+L}(k-i) \\ &= \sum_{k=-\infty}^{m-N-1} s_{m+L}(k)s_{m+L}(k-i) + \sum_{k=m-N}^{m+L-N-1} s_{m+L}(k)s_{m+L}(k-i) \\ &= \sum_{k=-\infty}^{m-N-1} s_u(k)f_m(k)\alpha^L s_u(k-i)f_m(k-i)\alpha^L + \sum_{k=m-N}^{m+L-N-1} s_{m+L}(k)s_{m+L}(k-i) \end{aligned} \quad (1f)$$

or $$r_{m+L}(i)=\alpha^{2L}r_m(i)+\sum_{k=m-N}^{m+L-N-1} s_{m+L}(k)s_{m+L}(k-i)\ . \quad (1g)$$

Therefore, $r_{m+L}(i)$ can be calculated recursively from $r_m(i)$ using equation (1g). This newly calculated $r_{m+L}(i)$ is stored back to memory for use in the following adaptation cycle. The autocorrelation coefficient $R_{m+L}(i)$ is then calculated as $$R_{m+L}(i)=r_{m+L}(i)+\sum_{k=m+L-N}^{m+L-1} s_{m+L}(k)s_{m+L}(k-i)\ . \quad (1h)$$

So far we have described in a general manner the principles of a hybrid window calculation procedure. The parameter values for the hybrid windowing module 36 in Figure 4(a)/G.728 are $M = 10$, $L = 20$, $N = 30$, and $\alpha = \left(\frac{1}{2}\right)^{\frac{1}{40}} = 0.982820598$ (so that $\alpha^{2L} = \frac{1}{2}$).

Once the 11 autocorrelation coefficients $R(i)$, $i = 0, 1, \ldots, 10$ are calculated by the hybrid windowing procedure described above, a "white noise correction" procedure is applied. This is done by increasing the energy $R(0)$ by a small amount:

$$R(0) \leftarrow \left(\frac{257}{256}\right) R(0) \quad (1i)$$

This has the effect of filling the spectral valleys with white noise so as to reduce the spectral dynamic range and alleviate ill-conditioning of the subsequent Levinson-Durbin recursion. The white noise correction factor (WNCF) of 257/256 corresponds to a white noise level about 24 dB below the average speech power.

Next, using the white noise corrected autocorrelation coefficients, the Levinson-Durbin recursion module 37 recursively computes the predictor coefficients from order 1 to order 10. Let the $j$-th coefficients of the $i$-th order predictor be $a_j^{(i)}$. Then, the recursive procedure can be specified as follows:

$$E(0) = R(0) \quad (2a)$$

$$k_i = -\frac{R(i) + \sum_{j=1}^{i-1} a_j^{(i-1)} R(i-j)}{E(i-1)} \tag{2b}$$

$$a_i^{(i)} = k_i \tag{2c}$$

$$a_j^{(i)} = a_j^{(i-1)} + k_i a_{i-j}^{(i-1)}, \quad 1 \le j \le i-1 \tag{2d}$$

$$E(i) = (1 - k_i^2) E(i-1). \tag{2e}$$

Equations (2b) through (2e) are evaluated recursively for $i = 1, 2, \ldots, 10$, and the final solution is given by $$q_i = a_i^{(10)}, \quad 1 \le i \le 10. \tag{2f}$$

If we define $q_0 = 1$, then the 10-th order "prediction-error filter" (sometimes called "analysis filter") has the transfer function $$\tilde{Q}(z) = \sum_{i=0}^{10} q_i z^{-i}, \tag{3a}$$

and the corresponding 10-th order linear predictor is defined by the following transfer function $$Q(z) = -\sum_{i=1}^{10} q_i z^{-i}. \tag{3b}$$

The weighting filter coefficient calculator (block 38) calculates the perceptual weighting filter coefficients according to the following equations:

$$W(z) = \frac{1 - Q(z/\gamma_1)}{1 - Q(z/\gamma_2)}, \quad 0 < \gamma_2 < \gamma_1 \le 1, \tag{4a}$$

$$Q(z/\gamma_1) = -\sum_{i=1}^{10} (q_i \gamma_1^i) z^{-i}, \tag{4b}$$

and $$Q(z/\gamma_2) = -\sum_{i=1}^{10} (q_i \gamma_2^i) z^{-i}. \tag{4c}$$

The perceptual weighting filter is a 10-th order pole-zero filter defined by the transfer function $W(z)$ in equation (4a). The values of $\gamma_1$ and $\gamma_2$ are 0.9 and 0.6, respectively.

Now refer to Figure 2/G.728. The perceptual weighting filter adapter (block 3) periodically updates the coefficients of $W(z)$ according to equations. (2) through (4), and feeds the coefficients to the impulse response vector calculator (block 12) and the perceptual weighting filters (blocks 4 and 10).

*3.4 Perceptual Weighting Filter*

In Figure 2/G.728, the current input speech vector $s(n)$ is passed through the perceptual weighting filter (block 4), resulting in the weighted speech vector $v(n)$. Note that except during initialization, the filter memory (i.e., internal state variables, or the values held in the delay units of the filter) should not be reset to zero at any time. On the other hand, the memory of the perceptual weighting filter (block 10) will need special handling as described later.

*3.4.1 Non-speech Operation*

For modem signals or other non-speech signals, CCITT test results indicate that it is desirable to disable the perceptual weighting filter. This is equivalent to setting $W(z)=1$. This can most easily be accomplished if $\gamma_1$ and $\gamma_2$ in equation (4a) are set equal to zero. The nominal values for these variables in the speech mode are 0.9 and 0.6, respectively.

*3.5 Synthesis Filter*

In Figure 2/G.728, there are two synthesis filters (blocks 9 and 22) with identical coefficients. Both filters are updated by the backward synthesis filter adapter (block 23). Each synthesis filter is a 50-th order all-pole filter that consists of a feedback loop with a 50-th order LPC predictor in the feedback branch. The transfer function of the synthesis filter is $F(z)=1/[1-P(z)]$, where $P(z)$ is the transfer function of the 50-th order LPC predictor.

After the weighted speech vector $v(n)$ has been obtained, a zero-input response vector $r(n)$ will be generated using the synthesis filter (block 9) and the perceptual weighting filter (block 10). To accomplish this, we first open the switch 5, i.e., point it to node 6. This implies that the signal going from node 7 to the synthesis filter 9 will be zero. We then let the synthesis filter 9 and the perceptual weighting filter 10 "ring" for 5 samples (1 vector). This means that we continue the filtering operation for 5 samples with a zero signal applied at node 7. The resulting output of the perceptual weighting filter 10 is the desired zero-input response vector $r(n)$.

Note that except for the vector right after initialization, the memory of the filters 9 and 10 is in general non-zero; therefore, the output vector $r(n)$ is also non-zero in general, even though the filter input from node 7 is zero. In effect, this vector $r(n)$ is the response of the two filters to previous gain-scaled excitation vectors $e(n-1)$, $e(n-2)$, ... This vector actually represents the effect due to filter memory up to time $(n-1)$.

*3.6 VQ Target Vector Computation*

This block subtracts the zero-input response vector $r(n)$ from the weighted speech vector $v(n)$ to obtain the VQ codebook search target vector $x(n)$.

*3.7 Backward Synthesis Filter Adapter*

This adapter 23 updates the coefficients of the synthesis filters 9 and 22. It takes the quantized (synthesized) speech as input and produces a set of synthesis filter coefficients as output. Its operation is quite similar to the perceptual weighting filter adapter 3.

A blown-up version of this adapter is shown in Figure 5/G.728. The operation of the hybrid windowing module 49 and the Levinson-Durbin recursion module 50 is exactly the same as their counter parts (36 and 37) in Figure 4(a)/G.728, except for the following three differences:

a. The input signal is now the quantized speech rather than the unquantized input speech.

b. The predictor order is 50 rather than 10.

c. The hybrid window parameters are different: $N = 35$, $\alpha = \left(\frac{3}{4}\right)^{\frac{1}{40}} = 0.992833749$.

Note that the update period is still $L = 20$, and the white noise correction factor is still 257/256 = 1.00390625.

Let $\hat{P}(z)$ be the transfer function of the 50-th order LPC predictor, then it has the form $$\hat{P}(z) = -\sum_{i=1}^{50} \hat{a}_i z^{-i}, \tag{5}$$

where $\hat{a}_i$'s are the predictor coefficients. To improve robustness to channel errors, these coefficients are modified so that the peaks in the resulting LPC spectrum have slightly larger bandwidths. The bandwidth expansion module 51 performs this bandwidth expansion procedure in the following way. Given the LPC predictor coefficients $\hat{a}_i$'s, a new set of coefficients $a_i$'s is computed according to $$a_i = \lambda^i \hat{a}_i, \quad i = 1, 2, \ldots, 50, \tag{6}$$

where $\lambda$ is given by $$\lambda = \frac{253}{256} = 0.98828125 . \tag{7}$$

This has the effects of moving all the poles of the synthesis filter radially toward the origin by a factor of $\lambda$. Since the poles are moved away from the unit circle, the peaks in the frequency response are widened.

After such bandwidth expansion, the modified LPC predictor has a transfer function of $$P(z) = -\sum_{i=1}^{50} a_i z^{-i}. \tag{8}$$

The modified coefficients are then fed to the synthesis filters 9 and 22. These coefficients are also fed to the impulse response vector calculator 12.

The synthesis filters 9 and 22 both have a transfer function of $$F(z) = \frac{1}{1 - P(z)} . \tag{9}$$

Similar to the perceptual weighting filter, the synthesis filters 9 and 22 are also updated once every 4 vectors, and the updates also occur at the third speech vector of every 4-vector adaptation cycle. However, the updates are based on the quantized speech up to the last vector of the previous adaptation cycle. In other words, a delay of 2 vectors is introduced before the updates take place. This is because the Levinson-Durbin recursion module 50 and the energy table calculator 15 (described later) are computationally intensive. As a result, even though the autocorrelation of previously quantized speech is available at the first vector of each 4-vector cycle, computations may require more than one vector worth of time. Therefore, to maintain a basic buffer size of 1 vector (so as to keep the coding delay low), and to maintain real-time operation, a 2-vector delay in filter updates is introduced in order to facilitate real-time implementation.

*3.8 Backward Vector Gain Adapter*

This adapter updates the excitation gain $\sigma(n)$ for every vector time index $n$.. The excitation gain $\sigma(n)$ is a scaling factor used to scale the selected excitation vector $y(n)$. The adapter 20 takes the gain-scaled excitation vector $e(n)$ as its input, and produces an excitation gain $\sigma(n)$ as its output. Basically, it attempts to "predict" the gain of $e(n)$ based on the gains of $e(n-1)$, $e(n-2)$, ... by using adaptive linear prediction in the logarithmic gain domain. This backward vector gain adapter 20 is shown in more detail in Figure 6/G.728.

Refer to Fig 6/G.728. This gain adapter operates as follows. The 1-vector delay unit 67 makes the previous gain-scaled excitation vector $e(n-1)$ available. The Root-Mean-Square (RMS) calculator 39 then calculates the RMS value of the vector $e(n-1)$. Next, the logarithm calculator 40 calculates the dB value of the RMS of $e(n-1)$, by first computing the base 10 logarithm and then multiplying the result by 20.

In Figure 6/G.728, a log-gain offset value of 32 dB is stored in the log-gain offset value holder 41. This values is meant to be roughly equal to the average excitation gain level (in dB) during voiced speech. The adder 42 subtracts this log-gain offset value from the logarithmic gain produced by the logarithm calculator 40. The resulting offset-removed logarithmic gain $\delta(n-1)$ is then used by the hybrid windowing module 43 and the Levinson-Durbin recursion module 44. Again, blocks 43 and 44 operate in exactly the same way as blocks 36 and 37 in the perceptual weighting filter adapter module (Figure 4(a)/G.728), except that the hybrid window parameters are different and that the signal under analysis is now the offset-removed logarithmic gain rather than the input speech. (Note that only one gain value is produced for every 5 speech samples.) The hybrid window parameters of block 43 are $M = 10, N = 20, L = 4, \alpha = \left(\frac{3}{4}\right)^{\frac{1}{8}} = 0.96467863$.

The output of the Levinson-Durbin recursion module 44 is the coefficients of a 10-th order linear predictor with a transfer function of $$\hat{R}(z) = -\sum_{i=1}^{10} \hat{\alpha}_i z^{-i} . \tag{10}$$

The bandwidth expansion module 45 then moves the roots of this polynomial radially toward the z-plane original in a way similar to the module 51 in Figure 5/G.728. The resulting bandwidth-expanded gain predictor has a transfer function of $$R(z) = -\sum_{i=1}^{10} \alpha_i z^{-i} , \tag{11}$$

where the coefficients $\alpha_i$'s are computed as $$\alpha_i = \left(\frac{29}{32}\right)^i \hat{\alpha}_i = (0.90625)^i \hat{\alpha}_i . \tag{12}$$

Such bandwidth expansion makes the gain adapter (block 20 in Figure 2/G.728) more robust to channel errors. These $\alpha_i$'s are then used as the coefficients of the log-gain linear predictor (block 46 of Figure 6/G.728).

This predictor 46 is updated once every 4 speech vectors, and the updates take place at the second speech vector of every 4-vector adaptation cycle. The predictor attempts to predict $\delta(n)$ based on a linear combination of $\delta(n-1)$, $\delta(n-2)$, ..., $\delta(n-10)$. The predicted version of $\delta(n)$ is denoted as $\hat{\delta}(n)$ and is given by $$\hat{\delta}(n) = -\sum_{i=1}^{10} \alpha_i \delta(n-i) \ . \quad (13)$$

After $\hat{\delta}(n)$ has been produced by the log-gain linear predictor 46, we add back the log-gain offset value of 32 dB stored in 41. The log-gain limiter 47 then checks the resulting log-gain value and clips it if the value is unreasonably large or unreasonably small. The lower and upper limits are set to 0 dB and 60 dB, respectively. The gain limiter output is then fed to the inverse logarithm calculator 48, which reverses the operation of the logarithm calculator 40 and converts the gain from the dB value to the linear domain. The gain limiter ensures that the gain in the linear domain is in between 1 and 1000.

*3.9 Codebook Search Module*

In Figure 2/G.728, blocks 12 through 18 constitute a codebook search module 24. This module searches through the 1024 candidate codevectors in the excitation VQ codebook 19 and identifies the index of the best codevector which gives a corresponding quantized speech vector that is closest to the input speech vector.

To reduce the codebook search complexity, the 10-bit, 1024-entry codebook is decomposed into two smaller codebooks: a 7-bit "shape codebook" containing 128 independent codevectors and a 3-bit "gain codebook" containing 8 scalar values that are symmetric with respect to zero (i.e., one bit for sign, two bits for magnitude). The final output codevector is the product of the best shape codevector (from the 7-bit shape codebook) and the best gain level (from the 3-bit gain codebook). The 7-bit shape codebook table and the 3-bit gain codebook table are given in Annex B.

*3.9.1 Principle of Codebook Search*

In principle, the codebook search module 24 scales each of the 1024 candidate codevectors by the current excitation gain $\sigma(n)$ and then passes the resulting 1024 vectors one at a time through a cascaded filter consisting of the synthesis filter $F(z)$ and the perceptual weighting filter $W(z)$. The filter memory is initialized to zero each time the module feeds a new codevector to the cascaded filter with transfer function $H(z) = F(z)W(z)$.

The filtering of VQ codevectors can be expressed in terms of matrix-vector multiplication. Let $y_j$ be the $j$-th codevector in the 7-bit shape codebook, and let $g_i$ be the $i$-th level in the 3-bit gain codebook. Let $\{h(n)\}$ denote the impulse response sequence of the cascaded filter. Then, when the codevector specified by the codebook indices $i$ and $j$ is fed to the cascaded filter $H(z)$, the filter output can be expressed as $$\tilde{x}_{ij} = \mathrm{H}\sigma(n) g_i y_j \ , \quad (14)$$

where $$\mathbf{H} = \begin{bmatrix} h(0) & 0 & 0 & 0 & 0 \\ h(1) & h(0) & 0 & 0 & 0 \\ h(2) & h(1) & h(0) & 0 & 0 \\ h(3) & h(2) & h(1) & h(0) & 0 \\ h(4) & h(3) & h(2) & h(1) & h(0) \end{bmatrix} \qquad (15)$$

The codebook search module 24 searches for the best combination of indices $i$ and $j$ which minimizes the following Mean-Squared Error (MSE) distortion.

$$D = \| x(n) - \tilde{x}_{ij} \|^2 = \sigma^2(n) \| \hat{x}(n) - g_i \mathbf{H} y_j \|^2 \qquad (16)$$

where $\hat{x}(n) = x(n)/\sigma(n)$ is the gain-normalized VQ target vector. Expanding the terms gives us $$D = \sigma^2(n) \left[ \| \hat{x}(n) \|^2 - 2 g_i \hat{x}^T(n) \mathbf{H} y_j + g_i^2 \| \mathbf{H} y_j \|^2 \right] \qquad (17)$$

Since the term $\| \hat{x}(n) \|^2$ and the value of $\sigma^2(n)$ are fixed during the codebook search, minimizing $D$ is equivalent to minimizing $$\hat{D} = -2 g_i p^T(n) y_j + g_i^2 E_j \qquad (18)$$

where $$p(n) = \mathbf{H}^T \hat{x}(n) \ , \qquad (19)$$

and $$E_j = \| \mathbf{H} y_j \|^2 . \qquad (20)$$

Note that $E_j$ is actually the energy of the $j$-th filtered shape codevectors and does not depend on the VQ target vector $\hat{x}(n)$. Also note that the shape codevector $y_j$ is fixed, and the matrix $\mathbf{H}$ only depends on the synthesis filter and the weighting filter, which are fixed over a period of 4 speech vectors. Consequently, $E_j$ is also fixed over a period of 4 speech vectors. Based on this observation, when the two filters are updated, we can compute and store the 128 possible energy terms $E_j$, $j = 0, 1, 2, \ldots, 127$ (corresponding to the 128 shape codevectors) and then use these energy terms repeatedly for the codebook search during the next 4 speech vectors. This arrangement reduces the codebook search complexity.

For further reduction in computation, we can precompute and store the two arrays $$b_i = 2 g_i \qquad (21)$$

and $$c_i = g_i^2 \qquad (22)$$

for $i = 0, 1, \ldots, 7$. These two arrays are fixed since $g_i$'s are fixed. We can now express $\hat{D}$ as $$\hat{D} = -b_i P_j + c_i E_j \ , \qquad (23)$$

where $P_j = p^T(n) y_j$.

Note that once the $E_j$, $b_i$, and $c_i$ tables are precomputed and stored, the inner product term $P_j = p^T(n) y_j$, which solely depends on $j$, takes most of the computation in determining $\hat{D}$. Thus, the codebook search procedure steps through the shape codebook and identifies the best gain index $i$ for each shape codevector $y_j$.

There are several ways to find the best gain index $i$ for a given shape codevector $y_j$.

a. The first and the most obvious way is to evaluate the 8 possible $\hat{D}$ values corresponding to the 8 possible values of $i$, and then pick the index $i$ which corresponds to the smallest $\hat{D}$. However, this requires 2 multiplications for each $i$.

b. A second way is to compute the optimal gain $\hat{g} = P_j/E_j$ first, and then quantize this gain $\hat{g}$ to one of the 8 gain levels $\{g_0, ..., g_7\}$ in the 3-bit gain codebook. The best index $i$ is the index of the gain level $g_i$ which is closest to $\hat{g}$. However, this approach requires a division operation for each of the 128 shape codevectors, and division is typically very inefficient to implement using DSP processors.

c. A third approach, which is a slightly modified version of the second approach, is particularly efficient for DSP implementations. The quantization of $\hat{g}$ can be thought of as a series of comparisons between $\hat{g}$ and the "quantizer cell boundaries", which are the mid-points between adjacent gain levels. Let $d_i$ be the mid-point between gain level $g_i$ and $g_{i+1}$ that have the same sign. Then, testing "$\hat{g} < d_i$?" is equivalent to testing "$P_j < d_i E_j$?". Therefore, by using the latter test, we can avoid the division operation and still require only one multiplication for each index $i$. This is the approach used in the codebook search. The gain quantizer cell boundaries $d_i$'s are fixed and can be precomputed and stored in a table. For the 8 gain levels, actually only 6 boundary values $d_0, d_1, d_2, d_4, d_5$, and $d_6$ are used.

Once the best indices $i$ and $j$ are identified, they are concatenated to form the output of the codebook search module — a single 10-bit best codebook index.

*3.9.2 Operation of Codebook Search Module*

With the codebook search principle introduced, the operation of the codebook search module 24 is now described below. Refer to Figure 2/G.728. Every time when the synthesis filter 9 and the perceptual weighting filter 10 are updated, the impulse response vector calculator 12 computes the first 5 samples of the impulse response of the cascaded filter $F(z)W(z)$. To compute the impulse response vector, we first set the memory of the cascaded filter to zero, then excite the filter with an input sequence $\{1, 0, 0, 0, 0\}$. The corresponding 5 output samples of the filter are $h(0)$, $h(1)$, ..., $h(4)$, which constitute the desired impulse response vector. After this impulse response vector is computed, it will be held constant and used in the codebook search for the following 4 speech vectors, until the filters 9 and 10 are updated again.

Next, the shape codevector convolution module 14 computes the 128 vectors $Hy_j$, $j = 0, 1, 2, ..., 127$. In other words, it convolves each shape codevector $y_j$, $j = 0, 1, 2, ..., 127$ with the impulse response sequence $h(0)$, $h(1)$, ..., $h(4)$, where the convolution is only performed for the first 5 samples. The energies of the resulting 128 vectors are then computed and stored by the energy table calculator 15 according to equation (20). The energy of a vector is defined as the sum of the squared value of each vector component.

Note that the computations in blocks 12, 14, and 15 are performed only once every 4 speech vectors, while the other blocks in the codebook search module perform computations for each speech vector. Also note that the updates of the $E_j$ table is synchronized with the updates of the synthesis filter coefficients. That is, the new $E_j$ table will be used starting from the third speech vector of every adaptation cycle. (Refer to the discussion in Section 3.7.)

The VQ target vector normalization module 16 calculates the gain-normalized VQ target vector $\hat{x}(n)=x(n)/\sigma(n)$. In DSP implementations, it is more efficient to first compute $1/\sigma(n)$, and then multiply each component of $x(n)$ by $1/\sigma(n)$.

Next, the time-reversed convolution module 13 computes the vector $p(n)=\mathbf{H}^T\hat{x}(n)$. This operation is equivalent to first reversing the order of the components of $\hat{x}(n)$, then convolving the resulting vector with the impulse response vector, and then reverse the component order of the output again (and hence the name "time-reversed convolution").

Once $E_j$, $b_i$, and $c_i$ tables are precomputed and stored, and the vector $p(n)$ is also calculated, then the error calculator 17 and the best codebook index selector 18 work together to perform the following efficient codebook search algorithm.

a. Initialize $\hat{D}_{min}$ to a number larger than the largest possible value of $\hat{D}$ (or use the largest possible number of the DSP's number representation system).

b. Set the shape codebook index $j=0$ c. Compute the inner product $P_j=p^t(n)y_j$.

d. If $P_j<0$, go to step h to search through negative gains; otherwise, proceed to step e to search through positive gains.

e. If $P_j<d_0E_j$, set $i=0$ and go to step k; otherwise proceed to step f.

f. If $P_j<d_1E_j$, set $i=1$ and go to step k; otherwise proceed to step g.

g. If $P_j<d_2E_j$, set $i=2$ and go to step k; otherwise set $i=3$ and go to step k.

h. If $P_j>d_4E_j$, set $i=4$ and go to step k; otherwise proceed to step i.

i. If $P_j>d_5E_j$, set $i=5$ and go to step k; otherwise proceed to step j.

j. If $P_j>d_6E_j$, set $i=6$; otherwise set $i=7$.

k. Compute $\hat{D}=-b_iP_j+c_iE_j$ l. If $\hat{D}<\hat{D}_{min}$, then set $\hat{D}_{min}=\hat{D}$, $i_{min}=i$, and $j_{min}=j$.

m. If $j<127$, set $j=j+1$ and go to step 3; otherwise proceed to step n.

n. When the algorithm proceeds to here, all 1024 possible combinations of gains and shapes have been searched through. The resulting $i_{min}$, and $j_{min}$ are the desired channel indices for the gain and the shape, respectively. The output best codebook index (10-bit) is the concatenation of these two indices, and the corresponding best excitation codevector is $y(n)=g_{i_{min}}y_{j_{min}}$. The selected 10-bit codebook index is transmitted through the communication channel to the decoder.

*3.10 Simulated Decoder*

Although the encoder has identified and transmitted the best codebook index so far, some additional tasks have to be performed in preparation for the encoding of the following speech vectors. First, the best codebook index is fed to the excitation VQ codebook to extract the corresponding best codevector $y(n) = g_{i_{min}} y_{j_{min}}$. This best codevector is then scaled by the current excitation gain $\sigma(n)$ in the gain stage 21. The resulting gain-scaled excitation vector is $e(n) = \sigma(n) y(n)$.

This vector $e(n)$ is then passed through the synthesis filter 22 to obtain the current quantized speech vector $s_q(n)$. Note that blocks 19 through 23 form a simulated decoder 8. Hence, the quantized speech vector $s_q(n)$ is actually the simulated decoded speech vector when there are no channel errors. In Figure 2/G.728, the backward synthesis filter adapter 23 needs this quantized speech vector $s_q(n)$ to update the synthesis filter coefficients. Similarly, the backward vector gain adapter 20 needs the gain-scaled excitation vector $e(n)$ to update the coefficients of the log-gain linear predictor.

One last task before proceeding to encode the next speech vector is to update the memory of the synthesis filter 9 and the perceptual weighting filter 10. To accomplish this, we first save the memory of filters 9 and 10 which was left over after performing the zero-input response computation described in Section 3.5. We then set the memory of filters 9 and 10 to zero and close the switch 5, i.e., connect it to node 7. Then, the gain-scaled excitation vector $e(n)$ is passed through the two zero-memory filters 9 and 10. Note that since $e(n)$ is only 5 samples long and the filters have zero memory, the number of multiply-adds only goes up from 0 to 4 for the 5-sample period. This is a significant saving in computation since there would be 70 multiply-adds per sample if the filter memory were not zero. Next, we add the saved original filter memory back to the newly established filter memory after filtering $e(n)$. This in effect adds the zero-input responses to the zero-state responses of the filters 9 and 10. This results in the desired set of filter memory which will be used to compute the zero-input response during the encoding of the next speech vector.

Note that after the filter memory update, the top 5 elements of the memory of the synthesis filter 9 are exactly the same as the components of the desired quantized speech vector $s_q(n)$. Therefore, we can actually omit the synthesis filter 22 and obtain $s_q(n)$ from the updated memory of the synthesis filter 9. This means an additional saving of 50 multiply-adds per sample.

The encoder operation described so far specifies the way to encode a single input speech vector. The encoding of the entire speech waveform is achieved by repeating the above operation for every speech vector.

*3.11 Synchronization & In-band Signalling*

In the above description of the encoder, it is assumed that the decoder knows the boundaries of the received 10-bit codebook indices and also knows when the synthesis filter and the log-gain predictor need to be updated (recall that they are updated once every 4 vectors). In practice, such synchronization information can be made available to the decoder by adding extra synchronization bits on top of the transmitted 16 kbit/s bit stream. However, in many applications there is a need to insert synchronization or in-band signalling bits as part of the 16 kbit/s bit stream. This can be done in the following way. Suppose a synchronization bit is to be inserted once every $N$ speech vectors; then, for every $N$-th input speech vector, we can search through only half of the shape codebook and produce a 6-bit shape codebook index. In this way, we rob one bit out of every $N$-th transmitted codebook index and insert a synchronization or signalling bit instead.

It is important to note that we cannot arbitrarily rob one bit out of an already selected 7-bit shape codebook index, instead, the encoder has to know which speech vectors will be robbed one bit and then search through only half of the codebook for those speech vectors. Otherwise, the decoder will not have the same decoded excitation codevectors for those speech vectors.

Since the coding algorithm has a basic adaptation cycle of 4 vectors, it is reasonable to let $N$ be a multiple of 4 so that the decoder can easily determine the boundaries of the encoder adaptation cycles. For a reasonable value of $N$ (such as 16, which corresponds to a 10 milliseconds bit robbing period), the resulting degradation in speech quality is essentially negligible. In particular, we have found that a value of $N$=16 results in little additional distortion. The rate of this bit robbing is only 100 bits/s.

If the above procedure is followed, we recommend that when the desired bit is to be a 0, only the first half of the shape codebook be searched, i.e. those vectors with indices 0 to 63. When the desired bit is a 1, then the second half of the codebook is searched and the resulting index will be between 64 and 127. The significance of this choice is that the desired bit will be the leftmost bit in the codeword, since the 7 bits for the shape codevector precede the 3 bits for the sign and gain codebook. We further recommend that the synchronization bit be robbed from the last vector in a cycle of 4 vectors. Once it is detected, the next codeword received can begin the new cycle of codevectors.

Although we state that synchronization causes very little distortion, we note that no formal testing has been done on hardware which contained this synchronization strategy. Consequently, the amount of the degradation has not been measured.

However, we specifically recommend against using the synchronization bit for synchronization in systems in which the coder is turned on and off repeatedly. For example, a system might use a speech activity detector to turn off the coder when no speech were present. Each time the encoder was turned on, the decoder would need to locate the synchronization sequence. At 100 bits/s, this would probably take several hundred milliseconds. In addition, time must be allowed for the decoder state to track the encoder state. The combined result would be a phenomena known as front-end clipping in which the beginning of the speech utterance would be lost. If the encoder and decoder are both started at the same instant as the onset of speech, then no speech will be lost. This is only possible in systems using external signalling for the start-up times and external synchronization.

4. LD-CELP DECODER PRINCIPLES

Figure 3/G.728 is a block schematic of the LD-CELP decoder. A functional description of each block is given in the following sections.

*4.1 Excitation VQ Codebook*

This block contains an excitation VQ codebook (including shape and gain codebooks) identical to the codebook 19 in the LD-CELP encoder. It uses the received best codebook index to extract the best codevector $y(n)$ selected in the LD-CELP encoder.

*4.2 Gain Scaling Unit*

This block computes the scaled excitation vector $e(n)$ by multiplying each component of $y(n)$ by the gain $\sigma(n)$.

*4.3 Synthesis Filter*

This filter has the same transfer function as the synthesis filter in the LD-CELP encoder (assuming error-free transmission). It filters the scaled excitation vector $e(n)$ to produce the decoded speech vector $s_d(n)$. Note that in order to avoid any possible accumulation of round-off errors during decoding, sometimes it is desirable to exactly duplicate the procedures used in the encoder to obtain $s_q(n)$. If this is the case, and if the encoder obtains $s_q(n)$ from the updated memory of the synthesis filter 9, then the decoder should also compute $s_d(n)$ as the sum of the zero-input response and the zero-state response of the synthesis filter 32, as is done in the encoder.

*4.4 Backward Vector Gain Adapter*

The function of this block is described in Section 3.8.

*4.5 Backward Synthesis Filter Adapter*

The function of this block is described in Section 3.7.

*4.6 Postfilter*

This block filters the decoded speech to enhance the perceptual quality. This block is further expanded in Figure 7/G.728 to show more details. Refer to Figure 7/G.728. The postfilter basically consists of three major parts: (1) long-term postfilter 71, (2) short-term postfilter 72, and (3) output gain scaling unit 77. The other four blocks in Figure 7/G.728 are just to calculate the appropriate scaling factor for use in the output gain scaling unit 77.

The *long-term postfilter* 71, sometimes called the *pitch postfilter*, is a comb filter with its spectral peaks located at multiples of the fundamental frequency (or *pitch frequency*) of the speech to be postfiltered. The reciprocal of the fundamental frequency is called the *pitch period*. The pitch period can be extracted from the decoded speech using a pitch detector (or pitch extractor). Let $p$ be the fundamental pitch period (in samples) obtained by a pitch detector, then the transfer function of the long-term postfilter can be expressed as $$H_l(z) = g_l(1 + b z^{-p}), \tag{24}$$

where the coefficients $g_l$, $b$ and the pitch period $p$ are updated once every 4 speech vectors (an adaptation cycle) and the actual updates occur at the third speech vector of each adaptation cycle.

For convenience, we will from now on call an adaptation cycle a *frame*. The derivation of $g_l$, $b$, and $p$ will be described later in Section 4.7.

The short-term postfilter 72 consists of a 10th-order pole-zero filter in cascade with a first-order all-zero filter. The 10th-order pole-zero filter attenuates the frequency components between formant peaks, while the first-order all-zero filter attempts to compensate for the spectral tilt in the frequency response of the 10th-order pole-zero filter.

Let $\tilde{a}_i$, $i = 1, 2, \ldots, 10$ be the coefficients of the 10th-order LPC predictor obtained by backward LPC analysis of the decoded speech, and let $k_1$ be the first reflection coefficient obtained by the same LPC analysis. Then, both $\tilde{a}_i$'s and $k_1$ can be obtained as by-products of the 50th-order backward LPC analysis (block 50 in Figure 5/G.728). All we have to do is to stop the 50th-order Levinson-Durbin recursion at order 10, copy $k_1$ and $\tilde{a}_1, \tilde{a}_2, \ldots, \tilde{a}_{10}$, and then resume the Levinson-Durbin recursion from order 11 to order 50. The transfer function of the short-term postfilter is $$H_s(z) = \frac{1 - \sum_{i=1}^{10} \bar{b}_i z^{-i}}{1 - \sum_{i=1}^{10} \bar{a}_i z^{-i}} [1 + \mu z^{-1}] \qquad (25)$$

where $$\bar{b}_i = \tilde{a}_i (0.65)^i, \; i = 1, 2, \ldots, 10, \qquad (26)$$

$$\bar{a}_i = \tilde{a}_i (0.75)^i, \; i = 1, 2, \ldots, 10, \qquad (27)$$

and $$\mu = (0.15) k_1 \qquad (28)$$

The coefficients $\bar{a}_i$'s, $\bar{b}_i$'s, and $\mu$ are also updated once a frame, but the updates take place at the first vector of each frame (i.e. as soon as $\tilde{a}_i$'s become available).

In general, after the decoded speech is passed through the long-term postfilter and the short-term postfilter, the filtered speech will not have the same power level as the decoded (unfiltered) speech. To avoid occasional large gain excursions, it is necessary to use automatic gain control to force the postfiltered speech to have roughly the same power as the unfiltered speech. This is done by blocks 73 through 77.

The sum of absolute value calculator 73 operates vector-by-vector. It takes the current decoded speech vector $s_d(n)$ and calculates the sum of the absolute values of its 5 vector components. Similarly, the sum of absolute value calculator 74 performs the same type of calculation, but on the current output vector $s_f(n)$ of the short-term postfilter. The scaling factor calculator 75 then divides the output value of block 73 by the output value of block 74 to obtain a scaling factor for the current $s_f(n)$ vector. This scaling factor is then filtered by a first-order lowpass filter 76 to get a separate scaling factor for each of the 5 components of $s_f(n)$. The first-order lowpass filter 76 has a transfer function of $0.01/(1-0.99z^{-1})$. The lowpass filtered scaling factor is used by the output gain scaling unit 77 to perform sample-by-sample scaling of the short-term postfilter output. Note that since the scaling factor calculator 75 only generates one scaling factor per vector, it would have a stair-case effect on the sample-by-sample scaling operation of block 77 if the lowpass filter 76 were not present. The lowpass filter 76 effectively smoothes out such a stair-case effect.

*4.6.1 Non-speech Operation* CCITT objective test results indicate that for some non-speech signals, the performance of the coder is improved when the adaptive postfilter is turned off. Since the input to the adaptive postfilter is the output of the synthesis filter, this signal is always available. In an actual implementation this unfiltered signal shall be output when the switch is set to disable the postfilter.

*4.7 Postfilter Adapter*

This block calculates and updates the coefficients of the postfilter once a frame. This postfilter adapter is further expanded in Figure 8/G.728.

Refer to Figure 8/G.728. The 10th-order LPC inverse filter 81 and the pitch period extraction module 82 work together to extract the pitch period from the decoded speech. In fact, any pitch extractor with reasonable performance (and without introducing additional delay) may be used here. What we described here is only one possible way of implementing a pitch extractor.

The 10th-order LPC inverse filter 81 has a transfer function of $$\tilde{A}(z) = 1 - \sum_{i=1}^{10} \tilde{a}_i z^{-i} , \tag{29}$$

where the coefficients $\tilde{a}_i$'s are supplied by the Levinson-Durbin recursion module (block 50 of Figure 5/G.728) and are updated at the first vector of each frame. This LPC inverse filter takes the decoded speech as its input and produces the LPC prediction residual sequence $\{d(k)\}$ as its output. We use a pitch analysis window size of 100 samples and a range of pitch period from 20 to 140 samples. The pitch period extraction module 82 maintains a long buffer to hold the last 240 samples of the LPC prediction residual. For indexing convenience, the 240 LPC residual samples stored in the buffer are indexed as $d(-139), d(-138), \ldots, d(100)$.

The pitch period extraction module 82 extracts the pitch period once a frame, and the pitch period is extracted at the third vector of each frame. Therefore, the LPC inverse filter output vectors should be stored into the LPC residual buffer in a special order: the LPC residual vector corresponding to the fourth vector of the last frame is stored as $d(81), d(82), \ldots, d(85)$, the LPC residual of the first vector of the current frame is stored as $d(86), d(87), \ldots, d(90)$, the LPC residual of the second vector of the current frame is stored as $d(91), d(92), \ldots, d(95)$, and the LPC residual of the third vector is stored as $d(96), d(97), \ldots, d(100)$. The samples $d(-139), d(-138), \ldots, d(80)$ are simply the previous LPC residual samples arranged in the correct time order.

Once the LPC residual buffer is ready, the pitch period extraction module 82 works in the following way. First, the last 20 samples of the LPC residual buffer ($d(81)$ through $d(100)$) are lowpass filtered at 1 kHz by a third-order elliptic filter (coefficients given in Annex D) and then 4:1 decimated (i.e. down-sampled by a factor of 4). This results in 5 lowpass filtered and decimated LPC residual samples, denoted $\bar{d}(21), \bar{d}(22), \ldots, \bar{d}(25)$, which are stored as the last 5 samples in a decimated LPC residual buffer. Besides these 5 samples, the other 55 samples $\bar{d}(-34), \bar{d}(-33), \ldots, \bar{d}(20)$ in the decimated LPC residual buffer are obtained by shifting previous frames of decimated LPC residual samples. The $i$-th correlation of the decimated LPC residual samples are then computed as $$\rho(i) = \sum_{n=1}^{25} \bar{d}(n)\bar{d}(n-i) \quad (30)$$

for time lags $i = 5, 6, 7, \ldots, 35$ (which correspond to pitch periods from 20 to 140 samples). The time lag $\tau$ which gives the largest of the 31 calculated correlation values is then identified. Since this time lag $\tau$ is the lag in the 4:1 decimated residual domain, the corresponding time lag which gives the maximum correlation in the original undecimated residual domain should lie between $4\tau-3$ and $4\tau+3$. To get the original time resolution, we next use the undecimated LPC residual buffer to compute the correlation of the undecimated LPC residual $$C(i) = \sum_{k=1}^{100} d(k)\, d(k-i) \quad (31)$$

for 7 lags $i = 4\tau-3, 4\tau-2, \ldots, 4\tau+3$. Out of the 7 time lags, the lag $p_0$ that gives the largest correlation is identified.

The time lag $p_0$ found this way may turn out to be a multiple of the true fundamental pitch period. What we need in the long-term postfilter is the true fundamental pitch period, not any multiple of it. Therefore, we need to do more processing to find the fundamental pitch period. We make use of the fact that we estimate the pitch period quite frequently — once every 20 speech samples. Since the pitch period typically varies between 20 and 140 samples, our frequent pitch estimation means that, at the beginning of each talk spurt, we will first get the fundamental pitch period before the multiple pitch periods have a chance to show up in the correlation peak-picking process described above. From there on, we will have a chance to lock on to the fundamental pitch period by checking to see if there is any correlation peak in the neighborhood of the pitch period of the previous frame.

Let $\hat{p}$ be the pitch period of the previous frame. If the time lag $p_0$ obtained above is not in the neighborhood of $\hat{p}$, then we also evaluate equation (31) for $i = \hat{p}-6, \hat{p}-5, \ldots, \hat{p}+5, \hat{p}+6$. Out of these 13 possible time lags, the time lag $p_1$ that gives the largest correlation is identified. We then test to see if this new lag $p_1$ should be used as the output pitch period of the current frame. First, we compute $$\beta_0 = \frac{\sum_{k=1}^{100} d(k)\, d(k-p_0)}{\sum_{k=1}^{100} d(k-p_0)\, d(k-p_0)}, \quad (32)$$

which is the optimal tap weight of a single-tap pitch predictor with a lag of $p_0$ samples. The value of $\beta_0$ is then clamped between 0 and 1. Next, we also compute $$\beta_1 = \frac{\sum_{k=1}^{100} d(k)\, d(k-p_1)}{\sum_{k=1}^{100} d(k-p_1)\, d(k-p_1)}, \quad (33)$$

which is the optimal tap weight of a single-tap pitch predictor with a lag of $p_1$ samples. The value of $\beta_1$ is then also clamped between 0 and 1. Then, the output pitch period $p$ of block 82 is given by $$p = \begin{cases} p_0 & \text{if } \beta_1 \le 0.4\beta_0 \\ p_1 & \text{if } \beta_1 > 0.4\beta_0 \end{cases} \quad (34)$$

After the pitch period extraction module 82 extracts the pitch period $p$, the pitch predictor tap calculator 83 then calculates the optimal tap weight of a single-tap pitch predictor for the decoded speech. The pitch predictor tap calculator 83 and the long-term postfilter 71 share a long buffer of decoded speech samples. This buffer contains decoded speech samples $s_d(-239)$, $s_d(-238)$, $s_d(-237)$,..., $s_d(4)$, $s_d(5)$, where $s_d(1)$ through $s_d(5)$ correspond to the current vector of decoded speech. The long-term postfilter 71 uses this buffer as the delay unit of the filter. On the other hand, the pitch predictor tap calculator 83 uses this buffer to calculate $$\beta = \frac{\sum_{k=-99}^{0} s_d(k)s_d(k-p)}{\sum_{k=-99}^{0} s_d(k-p)s_d(k-p)} \quad (35)$$

The long-term postfilter coefficient calculator 84 then takes the pitch period $p$ and the pitch predictor tap $\beta$ and calculates the long-term postfilter coefficients $b$ and $g_l$ as follows.

$$b = \begin{cases} 0 & \text{if } \beta < 0.6 \\ 0.15\beta & \text{if } 0.6 \le \beta \le 1 \\ 0.15 & \text{if } \beta > 1 \end{cases} \quad (36)$$

$$g_l = \frac{1}{1+b} \quad (37)$$

In general, the closer $\beta$ is to unity, the more periodic the speech waveform is. As can be seen in equations (36) and (37), if $\beta < 0.6$, which roughly corresponds to unvoiced or transition regions of speech, then $b = 0$ and $g_l = 1$, and the long-term postfilter transfer function becomes $H_l(z) = 1$, which means the filtering operation of the long-term postfilter is totally disabled. On the other hand, if $0.6 \le \beta \le 1$, the long-term postfilter is turned on, and the degree of comb filtering is determined by $\beta$. The more periodic the speech waveform, the more comb filtering is performed. Finally, if $\beta > 1$, then $b$ is limited to 0.15; this is to avoid too much comb filtering. The coefficient $g_l$ is a scaling factor of the long-term postfilter to ensure that the voiced regions of speech waveforms do not get amplified relative to the unvoiced or transition regions. (If $g_l$ were held constant at unity, then after the long-term postfiltering, the voiced regions would be amplified by a factor of $1+b$ roughly. This would make some consonants, which correspond to unvoiced and transition regions, sound unclear or too soft.)

The short-term postfilter coefficient calculator 85 calculates the short-term postfilter coefficients $\bar{a}_i$'s, $\bar{b}_i$'s, and $\mu$ at the first vector of each frame according to equations (26), (27), and (28).

*4.8 Output PCM Format Conversion*

This block converts the 5 components of the decoded speech vector into 5 corresponding *A*-law or μ-law PCM samples and output these 5 PCM samples sequentially at 125 μs time intervals. Note that if the internal linear PCM format has been scaled as described in section 3.1.1, the inverse scaling must be performed before conversion to *A*-law or μ-law PCM.

5. COMPUTATIONAL DETAILS

This section provides the computational details for each of the LD-CELP encoder and decoder elements. Sections 5.1 and 5.2 list the names of coder parameters and internal processing variables which will be referred to in later sections. The detailed specification of each block in Figure 2/G.728 through Figure 6/G.728 is given in Section 5.3 through the end of Section 5. To encode and decode an input speech vector, the various blocks of the encoder and the decoder are executed in an order which roughly follows the sequence from Section 5.3 to the end.

*5.1 Description of Basic Coder Parameters*

The names of basic coder parameters are defined in Table 1/G.728. In Table 1/G.728, the first column gives the names of coder parameters which will be used in later detailed description of the LD-CELP algorithm. If a parameter has been referred to in Section 3 or 4 but was represented by a different symbol, that equivalent symbol will be given in the second column for easy reference. Each coder parameter has a fixed value which is determined in the coder design stage. The third column shows these fixed parameter values, and the fourth column is a brief description of the coder parameters.

Table 1/G.728 Basic Coder Parameters of LD-CELP

| Name | Equivalent Symbol | Value | Description |
|---|---|---|---|
| AGCFAC | | 0.99 | AGC adaptation speed controlling factor |
| FAC | $\lambda$ | 253/256 | Bandwidth expansion factor of synthesis filter |
| FACGP | $\lambda_g$ | 29/32 | Bandwidth expansion factor of log-gain predictor |
| DIMINV | | 0.2 | Reciprocal of vector dimension |
| IDIM | | 5 | Vector dimension (excitation block size) |
| GOFF | | 32 | Log-gain offset value |
| KPDELTA | | 6 | Allowed deviation from previous pitch period |
| KPMIN | | 20 | Minimum pitch period (samples) |
| KPMAX | | 140 | Maximum pitch period (samples) |
| LPC | | 50 | Synthesis filter order |
| LPCLG | | 10 | Log-gain predictor order |
| LPCW | | 10 | Perceptual weighting filter order |
| NCWD | | 128 | Shape codebook size (no. of codevectors) |
| NFRSZ | | 20 | Frame size (adaptation cycle size in samples) |
| NG | | 8 | Gain codebook size (no. of gain levels) |
| NONR | | 35 | No. of non-recursive window samples for synthesis filter |
| NONRLG | | 20 | No. of non-recursive window samples for log-gain predictor |
| NONRW | | 30 | No. of non-recursive window samples for weighting filter |
| NPWSZ | | 100 | Pitch analysis window size (samples) |
| NUPDATE | | 4 | Predictor update period (in terms of vectors) |
| PPFTH | | 0.6 | Tap threshold for turning off pitch postfilter |
| PPFZCF | | 0.15 | Pitch postfilter zero controlling factor |
| SPFPCF | | 0.75 | Short-term postfilter pole controlling factor |
| SPFZCF | | 0.65 | Short-term postfilter zero controlling factor |
| TAPTH | | 0.4 | Tap threshold for fundamental pitch replacement |
| TILTF | | 0.15 | Spectral tilt compensation controlling factor |
| WNCF | | 257/256 | White noise correction factor |
| WPCF | $\gamma_2$ | 0.6 | Pole controlling factor of perceptual weighting filter |
| WZCF | $\gamma_1$ | 0.9 | Zero controlling factor of perceptual weighting filter |

*5.2 Description of Internal Variables*

The internal processing variables of LD-CELP are listed in Table 2/G.728, which has a layout similar to Table 1/G.728. The second column shows the range of index in each variable array. The fourth column gives the recommended initial values of the variables. The initial values of some arrays are given in Annexes A, B or C. It is recommended (although not required) that the internal variables be set to their initial values when the encoder or decoder just starts running, or whenever a reset of coder states is needed (such as in DCME applications). These initial values ensure that there will be no glitches right after start-up or resets.

Note that some variable arrays can share the same physical memory locations to save memory space, although they are given different names in the tables to enhance clarity.

As mentioned in earlier sections, the processing sequence has a basic adaptation cycle of 4 speech vectors. The variable ICOUNT is used as the vector index. In other words, ICOUNT = $n$ when the encoder or decoder is processing the $n$-th speech vector in an adaptation cycle.

Table 2/G.728 LD-CELP Internal Processing Variables

| Name | Array Index Range | Equivalent Symbol | Initial Value | Description |
|---|---|---|---|---|
| A | 1 to LPC+1 | $-a_{i-1}$ | 1,0,0,... | Synthesis filter coefficients |
| AL | 1 to 3 | | Annex D | 1 kHz lowpass filter denominator coeff. |
| AP | 1 to 11 | $-\bar{a}_{i-1}$ | 1,0,0,... | Short-term postfilter denominator coeff. |
| APF | 1 to 11 | $-\tilde{a}_{i-1}$ | 1,0,0,... | 10th-order LPC filter coefficients |
| ATMP | 1 to LPC+1 | $-a_{i-1}$ | | Temporary buffer for synthesis filter coeff. |
| AWP | 1 to LPCW+1 | | 1,0,0,... | Perceptual weighting filter denominator coeff. |
| AWZ | 1 to LPCW+1 | | 1,0,0,... | Perceptual weighting filter numerator coeff. |
| AWZTMP | 1 to LPCW+1 | | 1,0,0,... | Temporary buffer for weighting filter coeff. |
| AZ | 1 to 11 | $-\bar{b}_{i-1}$ | 1,0,0,... | Short-term postfilter numerator coeff. |
| B | 1 | $b$ | 0 | Long-term postfilter coefficient |
| BL | 1 to 4 | | Annex D | 1 kHz lowpass filter numerator coeff. |
| DEC | -34 to 25 | $\bar{d}(n)$ | 0,0,...,0 | 4:1 decimated LPC prediction residual |
| D | -139 to 100 | $d(k)$ | 0,0,...,0 | LPC prediction residual |
| ET | 1 to IDIM | $e(n)$ | 0,0,...,0 | Gain-scaled excitation vector |
| FACV | 1 to LPC+1 | $\lambda^{i-1}$ | Annex C | Synthesis filter BW broadening vector |
| FACGPV | 1 to LPCLG+1 | $\lambda_g^{i-1}$ | Annex C | Gain predictor BW broadening vector |
| G2 | 1 to NG | $b_i$ | Annex B | 2 times gain levels in gain codebook |
| GAIN | 1 | $\sigma(n)$ | | Excitation gain |
| GB | 1 to NG-1 | $d_i$ | Annex B | Mid-point between adjacent gain levels |
| GL | 1 | $g_l$ | 1 | Long-term postfilter scaling factor |
| GP | 1 to LPCLG+1 | $-\alpha_{i-1}$ | 1,-1,0,0,... | log-gain linear predictor coeff. |
| GPTMP | 1 to LPCLG+1 | $-\alpha_{i-1}$ | | temp. array for log-gain linear predictor coeff. |
| GQ | 1 to NG | $g_i$ | Annex B | Gain levels in the gain codebook |
| GSQ | 1 to NG | $c_i$ | Annex B | Squares of gain levels in gain codebook |
| GSTATE | 1 to LPCLG | $\delta(n)$ | -32,-32,...,-32 | Memory of the log-gain linear predictor |
| GTMP | 1 to 4 | | -32,-32,-32,-32 | Temporary log-gain buffer |
| H | 1 to IDIM | $h(n)$ | 1,0,0,0,0 | Impulse response vector of $F(z)W(z)$ |
| ICHAN | 1 | | | Best codebook index to be transmitted |
| ICOUNT | 1 | | | Speech vector counter (indexed from 1 to 4) |
| IG | 1 | $i$ | | Best 3-bit gain codebook index |
| IP | 1 | | IPINIT** | Address pointer to LPC prediction residual |
| IS | 1 | $j$ | | Best 7-bit shape codebook index |
| KP | 1 | $p$ | | Pitch period of the current frame |
| KP1 | 1 | $\hat{p}$ | 50 | Pitch period of the previous frame |
| PN | 1 to IDIM | $p(n)$ | | Correlation vector for codebook search |
| PTAP | 1 | $\beta$ | | Pitch predictor tap computed by block 83 |
| R | 1 to NR+1* | | | Autocorrelation coefficients |
| RC | 1 to NR* | | | Reflection coeff., also as a scratch array |
| RCTMP | 1 to LPC | | | Temporary buffer for reflection coeff. |
| REXP | 1 to LPC+1 | | 0,0,...,0 | Recursive part of autocorrelation, syn. filter |
| REXPLG | 1 to LPCLG+1 | | 0,0,...,0 | Recursive part of autocorrelation, log-gain pred. |
| REXPW | 1 to LPCW+1 | | 0,0,...,0 | Recursive part of autocorrelation, weighting filter |

* NR = Max(LPCW,LPCLG) > IDIM

** IPINIT = NPWSZ-NFRSZ+IDIM

Table 2/G.728 LD-CELP Internal Processing Variables (Continued)

| Name | Array Index Range | Equivalent Symbol | Initial Value | Description |
|---|---|---|---|---|
| RTMP | 1 to LPC+1 | | | Temporary buffer for autocorrelation coeff. |
| S | 1 to IDIM | $s(n)$ | 0,0,...,0 | Uniform PCM input speech vector |
| SB | 1 to 105 | | 0,0,...,0 | Buffer for previously quantized speech |
| SBLG | 1 to 34 | | 0,0,...,0 | Buffer for previous log-gain |
| SBW | 1 to 60 | | 0,0,...,0 | Buffer for previous input speech |
| SCALE | 1 | | | Unfiltered postfilter scaling factor |
| SCALEFIL | 1 | | 1 | Lowpass filtered postfilter scaling factor |
| SD | 1 to IDIM | $s_d(k)$ | | Decoded speech buffer |
| SPF | 1 to IDIM | | | Postfiltered speech vector |
| SPFPCFV | 1 to 11 | $SPFPCF^{i-1}$ | Annex C | Short-term postfilter pole controlling vector |
| SPFZCFV | 1 to 11 | $SPFZCF^{i-1}$ | Annex C | Short-term postfilter zero controlling vector |
| SO | 1 | $s_o(k)$ | | A-law or μ-law PCM input speech sample |
| SU | 1 | $s_u(k)$ | | Uniform PCM input speech sample |
| ST | -239 to IDIM | $s_q(n)$ | 0,0,...,0 | Quantized speech vector |
| STATELPC | 1 to LPC | | 0,0,...,0 | Synthesis filter memory |
| STLPCI | 1 to 10 | | 0,0,...,0 | LPC inverse filter memory |
| STLPF | 1 to 3 | | 0,0,0 | 1 kHz lowpass filter memory |
| STMP | 1 to 4*IDIM | | 0,0,...,0 | Buffer for per. wt. filter hybrid window |
| STPFFIR | 1 to 10 | | 0,0,...,0 | Short-term postfilter memory, all-zero section |
| STPFIIR | 10 | | 0,0,...,0 | Short-term postfilter memory, all-pole section |
| SUMFIL | 1 | | | Sum of absolute value of postfiltered speech |
| SUMUNFIL | 1 | | | Sum of absolute value of decoded speech |
| SW | 1 to IDIM | $v(n)$ | | Perceptually weighted speech vector |
| TARGET | 1 to IDIM | $\hat{x}(n), x(n)$ | | (gain-normalized) VQ target vector |
| TEMP | 1 to IDIM | | | scratch array for temporary working space |
| TILTZ | 1 | $\mu$ | 0 | Short-term postfilter tilt-compensation coeff. |
| WFIR | 1 to LPCW | | 0,0,...,0 | Memory of weighting filter 4, all-zero portion |
| WIIR | 1 to LPCW | | 0,0,...,0 | Memory of weighting filter 4, all-pole portion |
| WNR | 1 to 105 | $w_m(k)$ | Annex A | Window function for synthesis filter |
| WNRLG | 1 to 34 | $w_m(k)$ | Annex A | Window function for log-gain predictor |
| WNRW | 1 to 60 | $w_m(k)$ | Annex A | Window function for weighting filter |
| WPCFV | 1 to LPCW+1 | $\gamma_2^{i-1}$ | Annex C | Perceptual weighting filter pole controlling vector |
| WS | 1 to 105 | | | Work Space array for intermediate variables |
| WZCFV | 1 to LPCW+1 | $\gamma_1^{i-1}$ | Annex C | Perceptual weighting filter zero controlling vector |
| Y | 1 to IDIM*NCWD | $y_j$ | Annex B | Shape codebook array |
| Y2 | 1 to NCWD | $E_j$ | Energy of $y_j$ | Energy of convolved shape codevector |
| YN | 1 to IDIM | $y(n)$ | | Quantized excitation vector |
| ZIRWFIR | 1 to LPCW | | 0,0,...,0 | Memory of weighting filter 10, all-zero portion |
| ZIRWIIR | 1 to LPCW | | 0,0,...,0 | Memory of weighting filter 10, all-pole portion |

It should be noted that, for the convenience of Levinson-Durbin recursion, the first element of A, ATMP, AWP, AWZ, and GP arrays are always 1 and never get changed, and, for $i \geq 2$, the $i$-th elements are the $(i-1)$-th elements of the corresponding symbols in Section 3.

In the following sections, the asterisk * denotes arithmetic multiplication.

*5.3 Input PCM Format Conversion (block 1)*

Input: SO

Output: SU

Function: Convert A-law or μ-law or 16-bit linear input sample to uniform PCM sample.

Since the operation of this block is completely defined in CCITT Recommendations G.721 or G.711, we will not repeat it here. However, recall from section 3.1.1 that some scaling may be necessary to conform to this description's specification of an input range of -4095 to +4095.

---

*5.4 Vector Buffer (block 2)*

Input: SU

Output: S

Function: Buffer 5 consecutive uniform PCM speech samples to form a single 5-dimensional speech vector.

---

*5.5 Adapter for Perceptual Weighting Filter (block 3, Figure 4 (a)/G.728)*

The three blocks (36, 37 and 38) in Figure 4 (a)/G.728 are now specified in detail below.

HYBRID WINDOWING MODULE (block 36)

Input: STMP

Output: R

Function: Apply the hybrid window to input speech and compute autocorrelation coefficients.

The operation of this module is now described below, using a "Fortran-like" style, with loop boundaries indicated by indentation and comments on the right-hand side of "|". The following algorithm is to be used once every adaptation cycle (20 samples). The STMP array holds 4 consecutive input speech vectors up to the second speech vector of the current adaptation cycle. That is, STMP(1) through STMP(5) is the third input speech vector of the previous adaptation cycle (zero initially), STMP(6) through STMP(10) is the fourth input speech vector of the previous adaptation cycle (zero initially), STMP(11) through STMP(15) is the first input speech vector of the current adaptation cycle, and STMP(16) through STMP(20) is the second input speech vector of the current adaptation cycle.

```
N1=LPCW+NFRSZ                        | compute some constants (can be
N2=LPCW+NONRW                        | precomputed and stored in memory)
N3=LPCW+NFRSZ+NONRW

For N=1,2,...,N2, do the next line
    SBW(N)=SBW(N+NFRSZ)              | shift the old signal buffer;
For N=1,2,...,NFRSZ, do the next line
    SBW(N2+N)=STMP(N)                | shift in the new signal;
                                     | SBW(N3) is the newest sample
K=1
For N=N3,N3-1,...,3,2,1, do the next 2 lines
    WS(N)=SBW(N)*WNRW(K)             | multiply the window function
    K=K+1

For I=1,2,...,LPCW+1, do the next 4 lines
    TMP=0.
    For N=LPCW+1,LPCW+2,...,N1, do the next line
        TMP=TMP+WS(N)*WS(N+1-I)
    REXPW(I)=(1/2)*REXPW(I)+TMP      | update the recursive component

For I=1,2,...,LPCW+1, do the next 3 lines
    R(I)=REXPW(I)
    For N=N1+1,N1+2,...,N3, do the next line
        R(I)=R(I)+WS(N)*WS(N+1-I)    | add the non-recursive component

R(1)=R(1)*WNCF                       | white noise correction
```

---

LEVINSON-DURBIN RECURSION MODULE (block 37)

Input: R (output of block 36)

Output: AWZTMP

Function: Convert autocorrelation coefficients to linear predictor coefficients.

This block is executed once every 4-vector adaptation cycle. It is done at ICOUNT=3 after the processing of block 36 has finished. Since the Levinson-Durbin recursion is well-known prior art, the algorithm is given below without explanation.

```
If R(LPCW+1) = 0, go to LABEL                 | Skip if zero
                                              |
If R(1) ≤ 0, go to LABEL                      | Skip if zero signal.
                                              |
RC(1)=-R(2)/R(1)
AWZTMP(1)=1.                                  |
AWZTMP(2)=RC(1)                               | First-order predictor
ALPHA=R(1)+R(2)*RC(1)                         |
If ALPHA ≤ 0, go to LABEL                     | Abort if ill-conditioned

For MINC=2,3,4,...,LPCW, do the following
    SUM=0.
    For IP=1,2,3,...,MINC, do the next 2 lines
        N1=MINC-IP+2
        SUM=SUM+R(N1)*AWZTMP(IP)
                                              |
    RC(MINC)=-SUM/ALPHA                       | Reflection coeff.
    MH=MINC/2+1                               |
    For IP=2,3,4,...,MH, do the next 4 lines
        IB=MINC-IP+2
        AT=AWZTMP(IP)+RC(MINC)*AWZTMP(IB)              |
        AWZTMP(IB)=AWZTMP(IB)+RC(MINC)*AWZTMP(IP)      | Predictor coeff.
        AWZTMP(IP)=AT                                  |

    AWZTMP(MINC+1)=RC(MINC)                   |
    ALPHA=ALPHA+RC(MINC)*SUM                  | Prediction residual energy.
    If ALPHA ≤ 0, go to LABEL                 | Abort if ill-conditioned.
                                              |
Repeat the above for the next MINC
                                              | Program terminates normally
Exit this program                             | if execution proceeds to
                                              | here.
LABEL: If program proceeds to here, ill-conditioning had happened,
      then, skip block 38, do not update the weighting filter coefficients
      (That is, use the weighting filter coefficients of the previous
      adaptation cycle.)
```

---

WEIGHTING FILTER COEFFICIENT CALCULATOR (block 38)

Input: AWZTMP

Output: AWZ, AWP

Function: Calculate the perceptual weighting filter coefficients from the linear predictor coefficients for input speech.

This block is executed once every adaptation cycle. It is done at ICOUNT=3 after the processing of block 37 has finished.

```
For I=2,3,...,LPCW+1, do the next line          |
    AWP(I)=WPCFV(I)*AWZTMP(I)                    | Denominator coeff.

For I=2,3,...,LPCW+1, do the next line          |
    AWZ(I)=WZCFV(I)*AWZTMP(I)                    | Numerator coeff.
```

*5.6 Backward Synthesis Filter Adapter (block 23, Figure 5/G.728)*

The three blocks (49, 50, and 51) in Figure 5/G.728 are specified below.

HYBRID WINDOWING MODULE (block 49)

Input: STTMP

Output: RTMP

Function: Apply the hybrid window to quantized speech and compute autocorrelation coefficients.

The operation of this block is essentially the same as in block 36, except for some substitutions of parameters and variables, and for the sampling instant when the autocorrelation coefficients are obtained. As described in Section 3, the autocorrelation coefficients are computed based on the quantized speech vectors up to the last vector in the previous 4-vector adaptation cycle. In other words, the autocorrelation coefficients used in the current adaptation cycle are based on the information contained in the quantized speech up to the last (20-th) sample of the previous adaptation cycle. (This is in fact how we define the adaptation cycle.) The STTMP array contains the 4 quantized speech vectors of the previous adaptation cycle.

```
N1=LPC+NFRSZ                       | compute some constants (can be
N2=LPC+NONR                        | precomputed and stored in memory)
N3=LPC+NFRSZ+NONR

For N=1,2,...,N2, do the next line
    SB(N)=SB(N+NFRSZ)              | shift the old signal buffer;
For N=1,2,...,NFRSZ, do the next line
    SB(N2+N)=STTMP(N)              | shift in the new signal;
                                   | SB(N3) is the newest sample
K=1
For N=N3,N3-1,...,3,2,1, do the next 2 lines
    WS(N)=SB(N)*WNR(K)             | multiply the window function
    K=K+1

For I=1,2,...,LPC+1, do the next 4 lines
    TMP=0.
    For N=LPC+1,LPC+2,...,N1, do the next line
        TMP=TMP+WS(N)*WS(N+1-I)
    REXP(I)=(3/4)*REXP(I)+TMP      | update the recursive component

For I=1,2,...,LPC+1, do the next 3 lines
    RTMP(I)=REXP(I)
    For N=N1+1,N1+2,...,N3, do the next line
        RTMP(I)=RTMP(I)+WS(N)*WS(N+1-I)
                                   | add the non-recursive component

RTMP(1)=RTMP(1)*WNCF               | white noise correction
```

---

LEVINSON-DURBIN RECURSION MODULE (block 50)

Input: RTMP

Output: ATMP

Function: Convert autocorrelation coefficients to synthesis filter coefficients.

The operation of this block is exactly the same as in block 37, except for some substitutions of parameters and variables. However, special care should be taken when implementing this block. As described in Section 3, although the autocorrelation RTMP array is available at the first vector of each adaptation cycle, the actual updates of synthesis filter coefficients will not take place until the third vector. This intentional delay of updates allows the real-time hardware to spread the computation of this module over the first three vectors of each adaptation cycle. While this module is being executed during the first two vectors of each cycle, the old set of synthesis filter coefficients (the array "A") obtained in the previous cycle is still being used. This is why we need to keep a separate array ATMP to avoid overwriting the old "A" array. Similarly, RTMP, RCTMP, ALPHATMP, etc. are used to avoid interference to other Levinson-Durbin recursion modules (blocks 37 and 44).

```
If RTMP(LPC+1) = 0, go to LABEL            | Skip if zero
                                           |
If RTMP(1) ≤ 0, go to LABEL                | Skip if zero signal.
                                           |
RCTMP(1)=-RTMP(2)/RTMP(1)
ATMP(1)=1.                                 |
ATMP(2)=RCTMP(1)                           | First-order predictor
ALPHATMP=RTMP(1)+RTMP(2)*RCTMP(1)          |
if ALPHATMP ≤ 0, go to LABEL               | Abort if ill-conditioned

For MINC=2,3,4,...,LPC, do the following
    SUM=0.
    For IP=1,2,3,...,MINC, do the next 2 lines
        N1=MINC-IP+2
        SUM=SUM+RTMP(N1)*ATMP(IP)
                                               |
    RCTMP(MINC)=-SUM/ALPHATMP                  | Reflection coeff.
    MH=MINC/2+1                                |
    For IP=2,3,4,...,MH, do the next 4 lines
        IB=MINC-IP+2
        AT=ATMP(IP)+RCTMP(MINC)*ATMP(IB)       |
        ATMP(IB)=ATMP(IB)+RCTMP(MINC)*ATMP(IP) | Update predictor coeff.
        ATMP(IP)=AT                            |

    ATMP(MINC+1)=RCTMP(MINC)               |
    ALPHATMP=ALPHATMP+RCTMP(MINC)*SUM      | Pred. residual energy.
    If ALPHATMP ≤ 0, go to LABEL           | Abort if ill-conditioned.
                                           |
Repeat the above for the next MINC
                                           | Recursion completed normally
Exit this program                          | if execution proceeds to
                                           | here.
LABEL: If program proceeds to here, ill-conditioning had happened,
   then, skip block 51, do not update the synthesis filter coefficients
   (That is, use the synthesis filter coefficients of the previous
   adaptation cycle.)
```

---

BANDWIDTH EXPANSION MODULE (block 51)

Input: ATMP

Output: A

Function: Scale synthesis filter coefficients to expand the bandwidths of spectral peaks.

This block is executed only once every adaptation cycle. It is done after the processing of block 50 has finished and before the execution of blocks 9 and 10 at ICOUNT=3 take place. When the execution of this module is finished and ICOUNT=3, then we copy the ATMP array to the "A" array to update the filter coefficients.

```
For I=2,3,...,LPC+1, do the next line          |
    ATMP(I)=FACV(I)*ATMP(I)                    | scale coeff.

Wait until ICOUNT=3, then                      |
for I=2,3,...,LPC+1, do the next line          | Update coeff. at the third
    A(I)=ATMP(I)                               | vector of each cycle.
```

*5.7 Backward Vector Gain Adapter (block 20, Figure 6/G.728)*

The blocks in Figure 6/G.728 are specified below. For implementation efficiency, some blocks are described together as a single block (they are shown separately in Figure 6/G.728 just to explain the concept). All blocks in Figure 6/G.728 are executed once every speech vector, except for blocks 43, 44 and 45, which are executed only when ICOUNT=2.

1-VECTOR DELAY, RMS CALCULATOR, AND LOGARITHM CALCULATOR (blocks 67, 39, and 40)

Input: ET

Output: ETRMS

Function: Calculate the dB level of the Root-Mean Square (RMS) value of the previous gain-scaled excitation vector.

When these three blocks are executed (which is before the VQ codebook search), the ET array contains the gain-scaled excitation vector determined for the previous speech vector. Therefore, the 1-vector delay unit (block 67) is automatically executed. (It appears in Figure 6/G.728 just to enhance clarity.) Since the logarithm calculator immediately follow the RMS calculator, the square root operation in the RMS calculator can be implemented as a "divide-by-two" operation to the output of the logarithm calculator. Hence, the output of the logarithm calculator (the dB value) is $10 * \log_{10}$ ( energy of ET / IDIM ). To avoid overflow of logarithm value when ET = 0 (after system initialization or reset), the argument of the logarithm operation is clipped to 1 if it is too small. Also, we note that ETRMS is usually kept in an accumulator, as it is a temporary value which is immediately processed in block 42.

```
ETRMS = ET(1)*ET(1)                            |
For K=2,3,...,IDIM, do the next line           | Compute energy of ET.
    ETRMS = ETRMS + ET(K)*ET(K)                |

ETRMS = ETRMS*DIMINV                           | Divide by IDIM.
If ETRMS < 1., set ETRMS = 1.                  | Clip to avoid log overflow.
ETRMS = 10 * log10 (ETRMS)                     | Compute dB value.
```

LOG-GAIN OFFSET SUBTRACTOR (block 42)

Input: ETRMS, GOFF

Output: GSTATE(1)

Function: Subtract the log-gain offset value held in block 41 from the output of block 40 (dB gain level).

```
GSTATE(1) = ETRMS - GOFF
```

---

HYBRID WINDOWING MODULE (block 43)

Input: GTMP

Output: R

Function: Apply the hybrid window to offset-subtracted log-gain sequence and compute autocorrelation coefficients.

The operation of this block is very similar to block 36, except for some substitutions of parameters and variables, and for the sampling instant when the autocorrelation coefficients are obtained.

An important difference between block 36 and this block is that only 4 (rather than 20) gain sample is fed to this block each time the block is executed.

The log-gain predictor coefficients are updated at the second vector of each adaptation cycle. The GTMP array below contains 4 offset-removed log-gain values, starting from the log-gain of the second vector of the previous adaptation cycle to the log-gain of the first vector of the current adaptation cycle, which is GTMP(1). GTMP(4) is the offset-removed log-gain value from the first vector of the current adaptation cycle, the newest value.

```
N1=LPCLG+NUPDATE                   | compute some constants (can be
N2=LPCLG+NONRLG                    | precomputed and stored in memory)
N3=LPCLG+NUPDATE+NONRLG

For N=1,2,...,N2, do the next line
    SBLG(N)=SBLG(N+NUPDATE)        | shift the old signal buffer;
For N=1,2,...,NUPDATE, do the next line
    SBLG(N2+N)=GTMP(N)             | shift in the new signal;
                                   | SBLG(N3) is the newest sample
K=1
For N=N3,N3-1,...,3,2,1, do the next 2 lines
    WS(N)=SBLG(N)*WNRLG(K)         | multiply the window function
    K=K+1

For I=1,2,...,LPCLG+1, do the next 4 lines
    TMP=0.
    For N=LPCLG+1,LPCLG+2,...,N1, do the next line
        TMP=TMP+WS(N)*WS(N+1-I)
    REXPLG(I)=(3/4)*REXPLG(I)+TMP  | update the recursive component

For I=1,2,...,LPCLG+1, do the next 3 lines
    R(I)=REXPLG(I)
    For N=N1+1,N1+2,...,N3, do the next line
        R(I)=R(I)+WS(N)*WS(N+1-I)  | add the non-recursive component

R(1)=R(1)*WNCF                     | white noise correction
```

---

LEVINSON-DURBIN RECURSION MODULE (block 44)

Input: R (output of block 43)

Output: GPTMP

Function: Convert autocorrelation coefficients to log-gain predictor coefficients.

The operation of this block is exactly the same as in block 37, except for the substitutions of parameters and variables indicated below: replace LPCW by LPCLG and AWZ by GP. This block is executed only when ICOUNT=2, after block 43 is executed. Note that as the first step, the value of R(LPCLG+1) will be checked. If it is zero, we skip blocks 44 and 45 without updating the log-gain predictor coefficients. (That is, we keep using the old log-gain predictor coefficients determined in the previous adaptation cycle.) This special procedure is designed to avoid a very small glitch that would have otherwise happened right after system initialization or reset. In case the matrix is ill-conditioned, we also skip block 45 and use the old values.

BANDWIDTH EXPANSION MODULE (block 45)

Input: GPTMP

Output: GP

Function: Scale log-gain predictor coefficients to expand the bandwidths of spectral peaks.

This block is executed only when ICOUNT=2, after block 44 is executed.

```
For I=2,3,...,LPCLG+1, do the next line       |
    GP(I)=FACGPV(I)*GPTMP(I)                  | scale coeff.
```

LOG-GAIN LINEAR PREDICTOR (block 46)

Input: GP, GSTATE

Output: GAIN

Function: Predict the current value of the offset-subtracted log-gain.

```
GAIN = 0.
For I=LGLPC,LPCLG-1,...,3,2, do the next 2 lines
    GAIN = GAIN - GP(I+1)*GSTATE(I)
    GSTATE(I) = GSTATE(I-1)

GAIN = GAIN - GP(2)*GSTATE(1)
```

LOG-GAIN OFFSET ADDER (between blocks 46 and 47)

Input: GAIN, GOFF

Output: GAIN

Function: Add the log-gain offset value back to the log-gain predictor output.

```
GAIN = GAIN + GOFF
```

LOG-GAIN LIMITER (block 47)

Input: GAIN

Output: GAIN

Function: Limit the range of the predicted logarithmic gain.

```
If GAIN < 0., set GAIN = 0.       | Correspond to linear gain 1.
If GAIN > 60., set GAIN = 60.     | Correspond to linear gain 1000.
```

---

INVERSE LOGARITHM CALCULATOR (block 48)

Input: GAIN

Output: GAIN

Function: Convert the predicted logarithmic gain (in dB) back to linear domain.

$$GAIN = 10^{(GAIN/20)}$$

---

*5.8 Perceptual Weighting Filter*

PERCEPTUAL WEIGHTING FILTER (block 4)

Input: S, AWZ, AWP

Output: SW

Function: Filter the input speech vector to achieve perceptual weighting.

```
For K=1,2,...,IDIM, do the following
    SW(K) = S(K)
    For J=LPCW,LPCW-1,...,3,2, do the next 2 lines
        SW(K) = SW(K) + WFIR(J)*AWZ(J+1)              | All-zero part
        WFIR(J) = WFIR(J-1)                           | of the filter.

    SW(K) = SW(K) + WFIR(1)*AWZ(2)                    | Handle last one
    WFIR(1) = S(K)                                    | differently.

    For J=LPCW,LPCW-1,...,3,2, do the next 2 lines
        SW(K)=SW(K)-WIIR(J)*AWP(J+1)                  | All-pole part
        WIIR(J)=WIIR(J-1)                             | of the filter.

    SW(K)=SW(K)-WIIR(1)*AWP(2)                        | Handle last one
    WIIR(1)=SW(K)                                     | differently.

Repeat the above for the next K
```

---

*5.9 Computation of Zero-Input Response Vector*

Section 3.5 explains how a "zero-input response vector" $r(n)$ is computed by blocks 9 and 10. Now the operation of these two blocks during this phase is specified below. Their operation during the "memory update phase" will be described later.

SYNTHESIS FILTER (block 9) DURING ZERO-INPUT RESPONSE COMPUTATION

Input: A, STATELPC

Output: TEMP

Function: Compute the zero-input response vector of the synthesis filter.

```
For K=1,2,...,IDIM, do the following
    TEMP(K)=0.
    For J=LPC,LPC-1,...,3,2, do the next 2 lines
        TEMP(K)=TEMP(K)-STATELPC(J)*A(J+1)          | Multiply-add.
        STATELPC(J)=STATELPC(J-1)                   | Memory shift.

    TEMP(K)=TEMP(K)-STATELPC(1)*A(2)                | Handle last one
    STATELPC(1)=TEMP(K)                             | differently.

Repeat the above for the next K
```

---

PERCEPTUAL WEIGHTING FILTER DURING ZERO-INPUT RESPONSE COMPUTATION (block 10)

Input: AWZ, AWP, ZIRWFIR, ZIRWIIR, TEMP computed above

Output: ZIR

Function: Compute the zero-input response vector of the perceptual weighting filter.

```
For K=1,2,...,IDIM, do the following
  TMP = TEMP(K)
    For J=LPCW,LPCW-1,...,3,2, do the next 2 lines
        TEMP(K) = TEMP(K) + ZIRWFIR(J)*AWZ(J+1)         | All-zero part
        ZIRWFIR(J) = ZIRWFIR(J-1)                       | of the filter.

    TEMP(K) = TEMP(K) + ZIRWFIR(1)*AWZ(2)               | Handle last one
    ZIRWFIR(1) = TMP

    For J=LPCW,LPCW-1,...,3,2, do the next 2 lines
        TEMP(K)=TEMP(K)-ZIRWIIR(J)*AWP(J+1)             | All-pole part
        ZIRWIIR(J)=ZIRWIIR(J-1)                         | of the filter.

    ZIR(K)=TEMP(K)-ZIRWIIR(1)*AWP(2)                    | Handle last one
    ZIRWIIR(1)=ZIR(K)                                   | differently.

Repeat the above for the next K
```

---

*5.10 VQ Target Vector Computation*

VQ TARGET VECTOR COMPUTATION (block 11)

Input: SW, ZIR

Output: TARGET

Function: Subtract the zero-input response vector from the weighted speech vector.

Note: *ZIR(K)=ZIRWIIR(IDIM+1-K)* from block 10 above. It does not require a separate storage location.

```
For K=1,2,...,IDIM, do the next line
    TARGET(K) = SW(K) - ZIR(K)
```

---

*5.11 Codebook Search Module (block 24)*

The 7 blocks contained within the codebook search module (block 24) are specified below. Again, some blocks are described as a single block for convenience and implementation efficiency. Blocks 12, 14, and 15 are executed once every adaptation cycle when ICOUNT=3, while the other blocks are executed once every speech vector.

IMPULSE RESPONSE VECTOR CALCULATOR (block 12)

Input: A, AWZ, AWP

Output: H

Function: Compute the impulse response vector of the cascaded synthesis filter and perceptual weighting filter.

This block is executed when ICOUNT=3 and after the execution of block 23 and 3 is completed (i.e., when the new sets of A, AWZ, AWP coefficients are ready).

```
TEMP(1)=1.                                | TEMP = synthesis filter memory
RC(1)=1.                                  | RC = W(z) all-pole part memory
For K=2,3,...,IDIM, do the following
    A0=0.
    A1=0.
    A2=0.
    For I=K,K-1,...,3,2, do the next 5 lines
        TEMP(I)=TEMP(I-1)
        RC(I)=RC(I-1)                     |
        A0=A0-A(I)*TEMP(I)                | Filtering.
        A1=A1+AWZ(I)*TEMP(I)              |
        A2=A2-AWP(I)*RC(I)

    TEMP(1)=A0
    RC(1)=A0+A1+A2
Repeat the above indented section for the next K

ITMP=IDIM+1                               | Obtain h(n) by reversing
For K=1,2,...,IDIM, do the next line      | the order of the memory of
    H(K)=RC(ITMP-K)                       | all-pole section of W(z)
```

SHAPE CODEVECTOR CONVOLUTION MODULE AND ENERGY TABLE CALCULATOR (blocks 14 and 15)

Input: H, Y

Output: Y2

Function: Convolve each shape codevector with the impulse response obtained in block 12, then compute and store the energy of the resulting vector.

This block is also executed when ICOUNT=3 after the execution of block 12 is completed.

```
For J=1,2,...,NCWD, do the following          | One codevector per loop.
    J1=(J-1)*IDIM
    For K=1,2,...,IDIM, do the next 4 lines
        K1=J1+K+1
        TEMP(K)=0.
        For I=1,2,...,K, do the next line      |
            TEMP(K)=TEMP(K)+H(I)*Y(K1-I)       | Convolution.
    Repeat the above 4 lines for the next K

    Y2(J)=0.
    For K=1,2,...,IDIM, do the next line       |
        Y2(J)=Y2(J)+TEMP(K)*TEMP(K)            | Compute energy.

Repeat the above for the next J
```

---

VQ TARGET VECTOR NORMALIZATION (block 16)

Input: TARGET, GAIN

Output: TARGET

Function: Normalize the VQ target vector using the predicted excitation gain.

```
TMP = 1. / GAIN
For K=1,2,...,IDIM, do the next line
    TARGET(K) = TARGET(K) * TMP
```

---

TIME-REVERSED CONVOLUTION MODULE (block 13)

Input: H, TARGET (output from block 16)

Output: PN

Function: Perform time-reversed convolution of the impulse response vector and the normalized VQ target vector (to obtain the vector $p(n)$).

Note: The vector PN can be kept in temporary storage.

```
For K=1,2,...,IDIM, do the following
    K1=K-1
    PN(K)=0.
    For J=K,K+1,...,IDIM, do the next line
        PN(K)=PN(K)+TARGET(J)*H(J-K1)

Repeat the above for the next K
```

---

ERROR CALCULATOR AND BEST CODEBOOK INDEX SELECTOR (blocks 17 and 18)

Input: PN, Y, Y2, GB, G2, GSQ

Output: IG, IS, ICHAN

Function: Search through the gain codebook and the shape codebook to identify the best combination of gain codebook index and shape codebook index, and combine the two to obtain the 10-bit best codebook index.

Notes: The variable COR used below is usually kept in an accumulator, rather than storing it in memory. The variables IDXG and J can be kept in temporary registers, while IG and IS can be kept in memory.

```
        Initialize DISTM to the largest number representable in the hardware
        N1=NG/2
        For J=1,2,...,NCWD, do the following
            J1=(J-1)*IDIM
            COR=0.
            For K=1,2,...,IDIM, do the next line   |
                COR=COR+PN(K)*Y(J1+K)               | Compute inner product Pj.

            If COR > 0., then do the next 5 lines
                IDXG=N1
                For K=1,2,...,N1-1, do the next "if" statement
                    If COR < GB(K)*Y2(J), do the next 2 lines
                        IDXG=K                      | Best positive gain found.
                        GO TO LABEL

            If COR ≤ 0., then do the next 5 lines
                IDXG=NG
                For K=N1+1,N1+2,...,NG-1, do the next "if" statement
                    If COR > GB(K)*Y2(J), do the next 2 lines
                        IDXG=K                      | Best negative gain found.
                        GO TO LABEL

LABEL:      D=-G2(IDXG)*COR+GSQ(IDXG)*Y2(J)         | Compute distortion D̂.

            If D < DISTM, do the next 3 lines
                DISTM=D                             | Save the lowest distortion
                IG=IDXG                             | and the best codebook
                IS=J                                | indices so far.

        Repeat the above indented section for the next J

        ICHAN = (IS - 1) * NG + (IG - 1)            | Concatenate shape and gain
                                                    | codebook indices.

        Transmit ICHAN through communication channel.
```

For serial bit stream transmission, the most significant bit of ICHAN should be transmitted first.

If ICHAN is represented by the 10 bit word $b_9b_8b_7b_6b_5b_4b_3b_2b_1b_0$, then the order of the transmitted bits should be $b_9$, and then $b_8$, and then $b_7$, ...., and finally $b_0$. ($b_9$ is the most significant bit.)

---

*5.12 Simulated Decoder (block 8)*

Blocks 20 and 23 have been described earlier. Blocks 19, 21, and 22 are specified below.

EXCITATION VQ CODEBOOK (block 19)

Input: IG, IS

Output: YN

Function: Perform table look-up to extract the best shape codevector and the best gain, then multiply them to get the quantized excitation vector.

```
NN = (IS-1)*IDIM
For K=1,2,...,IDIM, do the next line
    YN(K) = GQ(IG) * Y(NN+K)
```

---

GAIN SCALING UNIT (block 21)

Input: GAIN, YN

Output: ET

Function: multiply the quantized excitation vector by the excitation gain.

```
For K=1,2,...,IDIM, do the next line
    ET(K) = GAIN * YN(K)
```

---

SYNTHESIS FILTER (block 22)

Input: ET, A

Output: ST

Function: Filter the gain-scaled excitation vector to obtain the quantized speech vector As explained in Section 3, this block can be omitted and the quantized speech vector can be obtained as a by-product of the memory update procedure to be described below. If, however, one wishes to implement this block anyway, a separate set of filter memory (rather than STATELPC) should be used for this all-pole synthesis filter.

*5.13 Filter Memory Update for Blocks 9 and 10*

The following description of the filter memory update procedures for blocks 9 and 10 assumes that the quantized speech vector ST is obtained as a by-product of the memory updates. To safeguard possible overloading of signal levels, a magnitude limiter is built into the procedure so that the filter memory clips at MAX and MIN, where MAX and MIN are respectively the positive and negative saturation levels of A-law or μ-law PCM, depending on which law is used.

FILTER MEMORY UPDATE (blocks 9 and 10)

Input: ET, A, AWZ, AWP, STATELPC, ZIRWFIR, ZIRWIIR

Output: ST, STATELPC, ZIRWFIR, ZIRWIIR

Function: Update the filter memory of blocks 9 and 10 and also obtain the quantized speech vector.

```
ZIRWFIR(1)=ET(1)                                | ZIRWFIR now a scratch array.
TEMP(1)=ET(1)
For K=2,3,...,IDIM, do the following
    A0=ET(K)
    A1=0.
    A2=0.
    For I=K,K-1,...,2,do the next 5 lines
        ZIRWFIR(I)=ZIRWFIR(I-1)
        TEMP(I)=TEMP(I-1)
        A0=A0-A(I)*ZIRWFIR(I)                   |
        A1=A1+AWZ(I)*ZIRWFIR(I)                 | Compute zero-state responses
        A2=A2-AWP(I)*TEMP(I)                    | at various stages of the
                                                | cascaded filter.
    ZIRWFIR(1)=A0                               |
    TEMP(1)=A0+A1+A2

Repeat the above indented section for the next K

                                  | Now update filter memory by adding
                                  | zero-state responses to zero-input
                                  | responses
For K=1,2,...,IDIM, do the next 4 lines
    STATELPC(K)=STATELPC(K)+ZIRWFIR(K)
    If STATELPC(K) > MAX, set STATELPC(K)=MAX    | Limit the range.
    If STATELPC(K) < MIN, set STATELPC(K)=MIN    |
    ZIRWIIR(K)=ZIRWIIR(K)+TEMP(K)

For I=1,2,...,LPCW, do the next line          | Now set ZIRWFIR to the
    ZIRWFIR(I)=STATELPC(I)                    | right value.

I=IDIM+1
For K=1,2,...,IDIM, do the next line          | Obtain quantized speech by
    ST(K)=STATELPC(I-K)                       | reversing order of synthesis
                                              | filter memory.
```

*5.14 Decoder (Figure 3/G.728)*

The blocks in the decoder (Figure 3/G.728) are described below. Except for the output PCM format conversion block, all other blocks are exactly the same as the blocks in the simulated decoder (block 8) in Figure 2/G.728.

The decoder only uses a subset of the variables in Table 2/G.728. If a decoder and an encoder are to be implemented in a single DSP chip, then the decoder variables should be given different names to avoid overwriting the variables used in the simulated decoder block of the encoder. For example, to name the decoder variables, we can add a prefix "d" to the corresponding variable names in Table 2/G.728. If a decoder is to be implemented as a stand-alone unit independent of an encoder, then there is no need to change the variable names.

The following description assumes a stand-alone decoder. Again, the blocks are executed in the same order they are described below.

DECODER BACKWARD SYNTHESIS FILTER ADAPTER (block 33)

Input: ST

Output: A

Function: Generate synthesis filter coefficients periodically from previously decoded speech.

The operation of this block is exactly the same as block 23 of the encoder.

---

DECODER BACKWARD VECTOR GAIN ADAPTER (block 30)

Input: ET

Output: GAIN

Function: Generate the excitation gain from previous gain-scaled excitation vectors.

The operation of this block is exactly the same as block 20 of the encoder.

---

DECODER EXCITATION VQ CODEBOOK (block 29)

Input: ICHAN

Output: YN

Function: Decode the received best codebook index (channel index) to obtain the excitation vector.

This block first extracts the 3-bit gain codebook index IG and the 7-bit shape codebook index IS from the received 10-bit channel index. Then, the rest of the operation is exactly the same as block 19 of the encoder.

```
ITMP = integer part of (ICHAN / NG)        | Decode (IS-1).
IG = ICHAN - ITMP * NG + 1                 | Decode IG.

NN = ITMP * IDIM
For K=1,2,...,IDIM, do the next line
    YN(K) = GQ(IG) * Y(NN+K)
```

---

DECODER GAIN SCALING UNIT (block 31)

Input: GAIN, YN

Output: ET

Function: Multiply the excitation vector by the excitation gain.

The operation of this block is exactly the same as block 21 of the encoder.

---

DECODER SYNTHESIS FILTER (block 32)

Input: ET, A, STATELPC

Output: ST

Function: Filter the gain-scaled excitation vector to obtain the decoded speech vector.

This block can be implemented as a straightforward all-pole filter. However, as mentioned in Section 4.3, if the encoder obtains the quantized speech as a by-product of filter memory update (to save computation), and if potential accumulation of round-off error is a concern, then this block should compute the decoded speech in exactly the same way as in the simulated decoder block of the encoder. That is, the decoded speech vector should be computed as the sum of the zero-input response vector and the zero-state response vector of the synthesis filter. This can be done by the following procedure.

```
For K=1,2,...,IDIM, do the next 7 lines
    TEMP(K)=0.
    For J=LPC,LPC-1,...,3,2, do the next 2 lines
        TEMP(K)=TEMP(K)-STATELPC(J)*A(J+1)        | Zero-input response.
        STATELPC(J)=STATELPC(J-1)

    TEMP(K)=TEMP(K)-STATELPC(1)*A(2)              | Handle last one
    STATELPC(1)=TEMP(K)                           | differently.

Repeat the above for the next K

TEMP(1)=ET(1)
For K=2,3,...,IDIM, do the next 5 lines
    A0=ET(K)
    For I=K,K-1,...,2, do the next 2 lines
        TEMP(I)=TEMP(I-1)
        A0=A0-A(I)*TEMP(I)            | Compute zero-state response

    TEMP(1)=A0

Repeat the above 5 lines for the next K

                                      | Now update filter memory by adding
                                      | zero-state responses to zero-input
                                      | responses
For K=1,2,...,IDIM, do the next 3 lines
    STATELPC(K)=STATELPC(K)+TEMP(K)               | ZIR + ZSR
    If STATELPC(K) > MAX, set STATELPC(K)=MAX     | Limit the range.
    If STATELPC(K) < MIN, set STATELPC(K)=MIN     |

I=IDIM+1
For K=1,2,...,IDIM, do the next line      | Obtain quantized speech by
    ST(K)=STATELPC(I-K)                   | reversing order of synthesis
                                          | filter memory.
```

---

10th-ORDER LPC INVERSE FILTER (block 81)

This block is executed once a vector, and the output vector is written sequentially into the last 20 samples of the LPC prediction residual buffer (i.e. D(81) through D(100)). We use a pointer IP to point to the address of D(K) array samples to be written to. This pointer IP is initialized to NPWSZ-NFRSZ+IDIM before this block starts to process the first decoded speech vector of the first adaptation cycle (frame), and from there on IP is updated in the way described below. The 10th-order LPC predictor coefficients APF(I)'s are obtained in the middle of Levinson-Durbin recursion by block 50, as described in Section 4.6. It is assumed that before this block starts execution, the decoder synthesis filter (block 32 of Figure 3/G.728) has already written the current decoded speech vector into ST(1) through ST(IDIM).

```
    TMP=0
    For N=1,2,...,NPWSZ/4, do the next line
       TMP=TMP+DEC(N)*DEC(N-J)   | TMP = correlation in decimated domain
    If TMP > CORMAX, do the next 2 lines
       CORMAX=TMP                | find maximum correlation and
       KMAX=J                    | the corresponding lag.
For N=-M2+1,-M2+2,...,(NPWSZ-NFRSZ)/4, do the next line
    DEC(N)=DEC(N+IDIM)           | shift decimated LPC residual buffer.

M1=4*KMAX-3        | start correlation peak-picking in undecimated domain
M2=4*KMAX+3
If M1 < KPMIN, set M1 = KPMIN.   | check whether M1 out of range.
If M2 > KPMAX, set M2 = KPMAX.   | check whether M2 out of range.
CORMAX = most negative number of the machine
For J=M1,M1+1,...,M2, do the next 6 lines
    TMP=0.
    For K=1,2,...,NPWSZ, do the next line
       TMP=TMP+D(K)*D(K-J)       | correlation in undecimated domain.
    If TMP > CORMAX, do the next 2 lines
       CORMAX=TMP                | find maximum correlation and
       KP=J                      | the corresponding lag.

M1 = KP1 - KPDELTA               | determine the range of search around
M2 = KP1 + KPDELTA               | the pitch period of previous frame.
If KP < M2+1, go to LABEL.       | KP can't be a multiple pitch if true.
If M1 < KPMIN, set M1 = KPMIN.   | check whether M1 out of range.
CMAX = most negative number of the machine
  For J=M1,M1+1,...,M2, do the next 6 lines
     TMP=0.
     For K=1,2,...,NPWSZ, do the next line
        TMP=TMP+D(K)*D(K-J)      | correlation in undecimated domain.
     If TMP > CMAX, do the next 2 lines
        CMAX=TMP                 | find maximum correlation and
        KPTMP=J                  | the corresponding lag.
SUM=0.
TMP=0.                           | start computing the tap weights
For K=1,2,...,NPWSZ, do the next 2 lines
   SUM = SUM + D(K-KP)*D(K-KP)
   TMP = TMP + D(K-KPTMP)*D(K-KPTMP)
If SUM=0, set TAP=0; otherwise, set TAP=CORMAX/SUM.
If TMP=0, set TAP1=0; otherwise, set TAP1=CMAX/TMP.
If TAP > 1, set TAP = 1.         | clamp TAP between 0 and 1
If TAP < 0, set TAP = 0.
If TAP1 > 1, set TAP1 = 1.       | clamp TAP1 between 0 and 1
```

Input: ST, APF

Output: D

Function: Compute the LPC prediction residual for the current decoded speech vector.

```
If IP = NPWSZ, then set IP = NPWSZ - NFRSZ          | check & update IP

 For K=1,2,...,IDIM, do the next 7 lines
   ITMP=IP+K
     D(ITMP) = ST(K)
     For J=10,9,...,3,2, do the next 2 lines
         D(ITMP) = D(ITMP) + STLPCI(J)*APF(J+1)      | FIR filtering.
         STLPCI(J) = STLPCI(J-1)                     | Memory shift.
     D(ITMP) = D(ITMP) + STLPCI(1)*APF(2)            | Handle last one.
     STLPCI(1) = ST(K)                               | shift in input.

 IP = IP + IDIM                                      | update IP.
```

---

PITCH PERIOD EXTRACTION MODULE (block 82)

This block is executed once a frame at the third vector of each frame, after the third decoded speech vector is generated.

Input: D

Output: KP

Function: Extract the pitch period from the LPC prediction residual

```
If ICOUNT ≠ 3, skip the execution of this block;
Otherwise, do the following.
                                | lowpass filtering & 4:1 downsampling.
  For K=NPWSZ-NFRSZ+1,...,NPWSZ, do the next 7 lines
   TMP=D(K)-STLPF(1)*AL(1)-STLPF(2)*AL(2)-STLPF(3)*AL(3)  | IIR filter
   If K is divisible by 4, do the next 2 lines
      N=K/4                     | do FIR filtering only if needed.
      DEC(N)=TMP*BL(1)+STLPF(1)*BL(2)+STLPF(2)*BL(3)+STLPF(3)*BL(4)
   STLPF(3)=STLPF(2)
   STLPF(2)=STLPF(1)            | shift lowpass filter memory.
   STLPF(1)=TMP

 M1 = KPMIN/4                   | start correlation peak-picking in
 M2 = KPMAX/4                   | the decimated LPC residual domain.
 CORMAX = most negative number of the machine
 For J=M1,M1+1,...,M2, do the next 6 lines
```

```
If TAP1 < 0, set TAP1 = 0.
                                   | Replace KP with fundamental pitch if
                                   | TAP1 is large enough.
If TAP1 > TAPTH * TAP, then set KP = KPTMP.

LABEL:  KP1 = KP                   | update pitch period of previous frame
   For K=-KPMAX+1,-KPMAX+2,...,NPWSZ-NFRSZ, do the next line
      D(K) = D(K+NFRSZ)            | shift the LPC residual buffer
```

---

PITCH PREDICTOR TAP CALCULATOR (block 83)

This block is also executed once a frame at the third vector of each frame, right after the execution of block 82. This block shares the decoded speech buffer (ST(K) array) with the long-term postfilter 71, which takes care of the shifting of the array such that ST(1) through ST(IDIM) constitute the current vector of decoded speech, and ST(-KPMAX-NPWSZ+1) through ST(0) are previous vectors of decoded speech.

Input: ST, KP

Output: PTAP

Function: Calculate the optimal tap weight of the single-tap pitch predictor of the decoded speech.

```
If ICOUNT ≠ 3, skip the execution of this block;
Otherwise, do the following.
  SUM=0.
  TMP=0.
  For K=-NPWSZ+1,-NPWSZ+2,...,0, do the next 2 lines
     SUM = SUM + ST(K-KP)*ST(K-KP)
     TMP = TMP + ST(K)*ST(K-KP)
  If SUM=0, set PTAP=0; otherwise, set PTAP=TMP/SUM.
```

---

LONG-TERM POSTFILTER COEFFICIENT CALCULATOR (block 84)

This block is also executed once a frame at the third vector of each frame, right after the execution of block 83.

Input: PTAP

Output: B, GL

Function: Calculate the coefficient $b$ and the scaling factor $g_l$ of the long-term postfilter.

```
If ICOUNT ≠ 3, skip the execution of this block;
Otherwise, do the following.
  If PTAP > 1, set PTAP = 1.           | clamp PTAP at 1.
  If PTAP < PPFTH, set PTAP = 0.       | turn off pitch postfilter if
                                       | PTAP smaller than threshold.

B = PPFZCF * PTAP
GL = 1 / (1+B)
```

---

SHORT-TERM POSTFILTER COEFFICIENT CALCULATOR (block 85)

This block is also executed once a frame, but it is executed at the first vector of each frame.

Input: APF, RCTMP(1)

Output: AP, AZ, TILTZ

Function: Calculate the coefficients of the short-term postfilter.

```
If ICOUNT ≠ 1, skip the execution of this block;
Otherwise, do the following.
  For I=2,3,...,11, do the next 2 lines |
      AP(I)=SPFPCFV(I)*APF(I)           | scale denominator coeff.
      AZ(I)=SPFZCFV(I)*APF(I)           | scale numerator coeff.
  TILTZ=TILTF*RCTMP(1)                  | tilt compensation filter coeff.
```

---

LONG-TERM POSTFILTER (block 71)

This block is executed once a vector.

Input: ST, B, GL, KP

Output: TEMP

Function: Perform filtering operation of the long-term postfilter.

```
For K=1,2,...,IDIM, do the next line
    TEMP(K)=GL*(ST(K)+B*ST(K-KP))       | long-term postfiltering.

For K=-NPWSZ-KPMAX+1,...,-2,-1,0, do the next line
    ST(K)=ST(K+IDIM)                    | shift decoded speech buffer.
```

---

SHORT-TERM POSTFILTER (block 72)

This block is executed once a vector right after the execution of block 71.

Input: AP, AZ, TILTZ, STPFFIR, STPFIIR, TEMP (output of block 71)

Output: TEMP

Function: Perform filtering operation of the short-term postfilter.

```
For K=1,2,...,IDIM, do the following
  TMP = TEMP(K)
    For J=10,9,...,3,2, do the next 2 lines
        TEMP(K) = TEMP(K) + STPFFIR(J)*AZ(J+1)        | All-zero part
        STPFFIR(J) = STPFFIR(J-1)                      | of the filter.
    TEMP(K) = TEMP(K) + STPFFIR(1)*AZ(2)               | Last multiplier.
    STPFFIR(1) = TMP

    For J=10,9,...,3,2, do the next 2 lines
        TEMP(K) = TEMP(K) - STPFIIR(J)*AP(J+1)        | All-pole part
        STPFIIR(J) = STPFIIR(J-1)                      | of the filter.
    TEMP(K) = TEMP(K) - STPFIIR(1)*AP(2)               | Last multiplier.
    STPFIIR(1) = TEMP(K)
  TEMP(K) = TEMP(K) + STPFIIR(2)*TILTZ               | Spectral tilt com-
                                                     | pensation filter.
```

---

SUM OF ABSOLUTE VALUE CALCULATOR (block 73)

This block is executed once a vector after execution of block 32.

Input: ST

Output: SUMUNFIL

Function: Calculate the sum of absolute values of the components of the decoded speech vector.

```
SUMUNFIL=0.
FOR K=1,2,...,IDIM, do the next line
    SUMUNFIL = SUMUNFIL + absolute value of ST(K)
```

---

SUM OF ABSOLUTE VALUE CALCULATOR (block 74)

This block is executed once a vector after execution of block 72.

Input: TEMP (output of block 72)

Output: SUMFIL

Function: Calculate the sum of absolute values of the components of the short-term postfilter output vector.

```
SUMFIL=0.
FOR K=1,2,...,IDIM, do the next line
    SUMFIL = SUMFIL + absolute value of TEMP(K)
```

---

SCALING FACTOR CALCULATOR (block 75)

This block is executed once a vector after execution of blocks 73 and 74.

Input: SUMUNFIL, SUMFIL

Output: SCALE

Function: Calculate the overall scaling factor of the postfilter

```
If SUMFIL > 1, set SCALE = SUMUNFIL / SUMFIL;
Otherwise, set SCALE = 1.
```

---

FIRST-ORDER LOWPASS FILTER (block 76) and OUTPUT GAIN SCALING UNIT (block 77)

These two blocks are executed once a vector after execution of blocks 72 and 75. It is more convenient to describe the two blocks together.

Input: SCALE, TEMP (output of block 72)

Output: SPF

Function: Lowpass filter the once-a-vector scaling factor and use the filtered scaling factor to scale the short-term postfilter output vector.

```
For K=1,2,...,IDIM, do the following
    SCALEFIL = AGCFAC*SCALEFIL + (1-AGCFAC)*SCALE    | lowpass filtering
    SPF(K) = SCALEFIL*TEMP(K)                        | scale output.
```

---

OUTPUT PCM FORMAT CONVERSION (block 28)

Input: SPF

Output: SD

Function: Convert the 5 components of the decoded speech vector into 5 corresponding A-law or μ-law PCM samples and put them out sequentially at 125 μs time intervals.

The conversion rules from uniform PCM to A-law or μ-law PCM are specified in Recommendation G.711.

ANNEX A
(to Recommendation G.728)

HYBRID WINDOW FUNCTIONS FOR VARIOUS LPC ANALYSES IN LD-CELP

In the LD-CELP coder, we use three separate LPC analyses to update the coefficients of three filters: (1) the synthesis filter, (2) the log-gain predictor, and (3) the perceptual weighting filter. Each of these three LPC analyses has its own hybrid window. For each hybrid window, we list the values of window function samples that are used in the hybrid windowing calculation procedure. These window functions were first designed using floating-point arithmetic and then quantized to the numbers which can be exactly represented by 16-bit representations with 15 bits of fraction. For each window, we will first give a table containing the floating-point equivalent of the 16-bit numbers and then give a table with corresponding 16-bit integer representations.

A.1 Hybrid Window for the Synthesis Filter

The following table contains the first 105 samples of the window function for the synthesis filter. The first 35 samples are the non-recursive portion, and the rest are the recursive portion. The table should be read from left to right from the first row, then left to right for the second row, and so on (just like the raster scan line).

| | | | | |
|---|---|---|---|---|
| 0.047760010 | 0.095428467 | 0.142852783 | 0.189971924 | 0.236663818 |
| 0.282775879 | 0.328277588 | 0.373016357 | 0.416900635 | 0.459838867 |
| 0.501739502 | 0.542480469 | 0.582000732 | 0.620178223 | 0.656921387 |
| 0.692199707 | 0.725891113 | 0.757904053 | 0.788208008 | 0.816680908 |
| 0.843322754 | 0.868041992 | 0.890747070 | 0.911437988 | 0.930053711 |
| 0.946533203 | 0.960876465 | 0.973022461 | 0.982910156 | 0.990600586 |
| 0.996002197 | 0.999114990 | 0.999969482 | 0.998565674 | 0.994842529 |
| 0.988861084 | 0.981781006 | 0.974731445 | 0.967742920 | 0.960815430 |
| 0.953948975 | 0.947082520 | 0.940307617 | 0.933563232 | 0.926879883 |
| 0.920227051 | 0.913635254 | 0.907104492 | 0.900604248 | 0.894134521 |
| 0.887725830 | 0.881378174 | 0.875061035 | 0.868774414 | 0.862548828 |
| 0.856384277 | 0.850250244 | 0.844146729 | 0.838104248 | 0.832092285 |
| 0.826141357 | 0.820220947 | 0.814331055 | 0.808502197 | 0.802703857 |
| 0.796936035 | 0.791229248 | 0.785583496 | 0.779937744 | 0.774353027 |
| 0.768798828 | 0.763305664 | 0.757812500 | 0.752380371 | 0.747009277 |
| 0.741638184 | 0.736328125 | 0.731048584 | 0.725830078 | 0.720611572 |
| 0.715454102 | 0.710327148 | 0.705230713 | 0.700164795 | 0.695159912 |
| 0.690185547 | 0.685241699 | 0.680328369 | 0.675445557 | 0.670593262 |
| 0.665802002 | 0.661041260 | 0.656280518 | 0.651580811 | 0.646911621 |
| 0.642272949 | 0.637695313 | 0.633117676 | 0.628570557 | 0.624084473 |
| 0.619598389 | 0.615142822 | 0.610748291 | 0.606384277 | 0.602020264 |

The next table contains the corresponding 16-bit integer representation. Dividing the table entries by $2^{15} = 32768$ gives the table above.

| | | | | |
|---|---|---|---|---|
| 1565 | 3127 | 4681 | 6225 | 7755 |
| 9266 | 10757 | 12223 | 13661 | 15068 |
| 16441 | 17776 | 19071 | 20322 | 21526 |
| 22682 | 23786 | 24835 | 25828 | 26761 |
| 27634 | 28444 | 29188 | 29866 | 30476 |
| 31016 | 31486 | 31884 | 32208 | 32460 |
| 32637 | 32739 | 32767 | 32721 | 32599 |
| 32403 | 32171 | 31940 | 31711 | 31484 |
| 31259 | 31034 | 30812 | 30591 | 30372 |
| 30154 | 29938 | 29724 | 29511 | 29299 |
| 29089 | 28881 | 28674 | 28468 | 28264 |
| 28062 | 27861 | 27661 | 27463 | 27266 |
| 27071 | 26877 | 26684 | 26493 | 26303 |
| 26114 | 25927 | 25742 | 25557 | 25374 |
| 25192 | 25012 | 24832 | 24654 | 24478 |
| 24302 | 24128 | 23955 | 23784 | 23613 |
| 23444 | 23276 | 23109 | 22943 | 22779 |
| 22616 | 22454 | 22293 | 22133 | 21974 |
| 21817 | 21661 | 21505 | 21351 | 21198 |
| 21046 | 20896 | 20746 | 20597 | 20450 |
| 20303 | 20157 | 20013 | 19870 | 19727 |

A.2 Hybrid Window for the Log-Gain Predictor

The following table contains the first 34 samples of the window function for the log-gain predictor. The first 20 samples are the non-recursive portion, and the rest are the recursive portion. The table should be read in the same manner as the two tables above.

| | | | | |
|---|---|---|---|---|
| 0.092346191 | 0.183868408 | 0.273834229 | 0.361480713 | 0.446014404 |
| 0.526763916 | 0.602996826 | 0.674072266 | 0.739379883 | 0.798400879 |
| 0.850585938 | 0.895507813 | 0.932769775 | 0.962066650 | 0.983154297 |
| 0.995819092 | 0.999969482 | 0.995635986 | 0.982757568 | 0.961486816 |
| 0.932006836 | 0.899078369 | 0.867309570 | 0.836669922 | 0.807128906 |
| 0.778625488 | 0.751129150 | 0.724578857 | 0.699005127 | 0.674316406 |
| 0.650482178 | 0.627502441 | 0.605346680 | 0.583953857 | |

The next table contains the corresponding 16-bit integer representation. Dividing the table entries by $2^{15} = 32768$ gives the table above.

| | | | | |
|---|---|---|---|---|
| 3026 | 6025 | 8973 | 11845 | 14615 |
| 17261 | 19759 | 22088 | 24228 | 26162 |
| 27872 | 29344 | 30565 | 31525 | 32216 |
| 32631 | 32767 | 32625 | 32203 | 31506 |
| 30540 | 29461 | 28420 | 27416 | 26448 |
| 25514 | 24613 | 23743 | 22905 | 22096 |
| 21315 | 20562 | 19836 | 19135 | |

A.3 Hybrid Window for the Perceptual Weighting Filter

The following table contains the first 60 samples of the window function for the perceptual weighting filter. The first 30 samples are the non-recursive portion, and the rest are the recursive portion. The table should be read in the same manner as the four tables above.

| | | | | |
|---|---|---|---|---|
| 0.059722900 | 0.119262695 | 0.178375244 | 0.236816406 | 0.294433594 |
| 0.351013184 | 0.406311035 | 0.460174561 | 0.512390137 | 0.562774658 |
| 0.611145020 | 0.657348633 | 0.701171875 | 0.742523193 | 0.781219482 |
| 0.817108154 | 0.850097656 | 0.880035400 | 0.906829834 | 0.930389404 |
| 0.950622559 | 0.967468262 | 0.980865479 | 0.990722656 | 0.997070313 |
| 0.999847412 | 0.999084473 | 0.994720459 | 0.986816406 | 0.975372314 |
| 0.960449219 | 0.943939209 | 0.927734375 | 0.911804199 | 0.896148682 |
| 0.880737305 | 0.865600586 | 0.850738525 | 0.836120605 | 0.821746826 |
| 0.807647705 | 0.793762207 | 0.780120850 | 0.766723633 | 0.753570557 |
| 0.740600586 | 0.727874756 | 0.715393066 | 0.703094482 | 0.691009521 |
| 0.679138184 | 0.667480469 | 0.656005859 | 0.644744873 | 0.633666992 |
| 0.622772217 | 0.612091064 | 0.601562500 | 0.591217041 | 0.581085205 |

The next table contains the corresponding 16-bit integer representation. Dividing the table entries by $2^{15} = 32768$ gives the table above.

| | | | | |
|---|---|---|---|---|
| 1957 | 3908 | 5845 | 7760 | 9648 |
| 11502 | 13314 | 15079 | 16790 | 18441 |
| 20026 | 21540 | 22976 | 24331 | 25599 |
| 26775 | 27856 | 28837 | 29715 | 30487 |
| 31150 | 31702 | 32141 | 32464 | 32672 |
| 32763 | 32738 | 32595 | 32336 | 31961 |
| 31472 | 30931 | 30400 | 29878 | 29365 |
| 28860 | 28364 | 27877 | 27398 | 26927 |
| 26465 | 26010 | 25563 | 25124 | 24693 |
| 24268 | 23851 | 23442 | 23039 | 22643 |
| 22254 | 21872 | 21496 | 21127 | 20764 |
| 20407 | 20057 | 19712 | 19373 | 19041 |

ANNEX B
(to Recommendation G.728)

EXCITATION SHAPE AND GAIN CODEBOOK TABLES

This appendix first gives the 7-bit excitation VQ shape codebook table. Each row in the table specifies one of the 128 shape codevectors. The first column is the channel index associated with each shape codevector (obtained by a Gray-code index assignment algorithm). The second through the sixth columns are the first through the fifth components of the 128 shape codevectors as represented in 16-bit fixed point. To obtain the floating point value from the integer value, divide the integer value by 2048. This is equivalent to multiplication by $2^{-11}$ or shifting the binary point 11 bits to the left.

| Channel Index | | | Codevector Components | | |
|---|---|---|---|---|---|
| 0 | 668 | -2950 | -1254 | -1790 | -2553 |
| 1 | -5032 | -4577 | -1045 | 2908 | 3318 |
| 2 | -2819 | -2677 | -948 | -2825 | -4450 |
| 3 | -6679 | -340 | 1482 | -1276 | 1262 |
| 4 | -562 | -6757 | 1281 | 179 | -1274 |
| 5 | -2512 | -7130 | -4925 | 6913 | 2411 |
| 6 | -2478 | -156 | 4683 | -3873 | 0 |
| 7 | -8208 | 2140 | -478 | -2785 | 533 |
| 8 | 1889 | 2759 | 1381 | -6955 | -5913 |
| 9 | 5082 | -2460 | -5778 | 1797 | 568 |
| 10 | -2208 | -3309 | -4523 | -6236 | -7505 |
| 11 | -2719 | 4358 | -2988 | -1149 | 2664 |
| 12 | 1259 | 995 | 2711 | -2464 | -10390 |
| 13 | 1722 | -7569 | -2742 | 2171 | -2329 |
| 14 | 1032 | 747 | -858 | -7946 | -12843 |
| 15 | 3106 | 4856 | -4193 | -2541 | 1035 |
| 16 | 1862 | -960 | -6628 | 410 | 5882 |
| 17 | -2493 | -2628 | -4000 | -60 | 7202 |
| 18 | -2672 | 1446 | 1536 | -3831 | 1233 |
| 19 | -5302 | 6912 | 1589 | -4187 | 3665 |
| 20 | -3456 | -8170 | -7709 | 1384 | 4698 |
| 21 | -4699 | -6209 | -11176 | 8104 | 16830 |
| 22 | 930 | 7004 | 1269 | -8977 | 2567 |
| 23 | 4649 | 11804 | 3441 | -5657 | 1199 |
| 24 | 2542 | -183 | -8859 | -7976 | 3230 |

| | | | | | |
|---|---|---|---|---|---|
| 25 | -2872 | -2011 | -9713 | -8385 | 12983 |
| 26 | 3086 | 2140 | -3680 | -9643 | -2896 |
| 27 | -7609 | 6515 | -2283 | -2522 | 6332 |
| 28 | -3333 | -5620 | -9130 | -11131 | 5543 |
| 29 | -407 | -6721 | -17466 | -2889 | 11568 |
| 30 | 3692 | 6796 | -262 | -10846 | -1856 |
| 31 | 7275 | 13404 | -2989 | -10595 | 4936 |
| 32 | 244 | -2219 | 2656 | 3776 | -5412 |
| 33 | -4043 | -5934 | 2131 | 863 | -2866 |
| 34 | -3302 | 1743 | -2006 | -128 | -2052 |
| 35 | -6361 | 3342 | -1583 | -21 | 1142 |
| 36 | -3837 | -1831 | 6397 | 2545 | -2848 |
| 37 | -9332 | -6528 | 5309 | 1986 | -2245 |
| 38 | -4490 | 748 | 1935 | -3027 | -493 |
| 39 | -9255 | 5366 | 3193 | -4493 | 1784 |
| 40 | 4784 | -370 | 1866 | 1057 | -1889 |
| 41 | 7342 | -2690 | -2577 | 676 | -611 |
| 42 | -502 | 2235 | -1850 | -1777 | -2049 |
| 43 | 1011 | 3880 | -2465 | 2209 | -152 |
| 44 | 2592 | 2829 | 5588 | 2839 | -7306 |
| 45 | -3049 | -4918 | 5955 | 9201 | -4447 |
| 46 | 697 | 3908 | 5798 | -4451 | -4644 |
| 47 | -2121 | 5444 | -2570 | 321 | -1202 |
| 48 | 2846 | -2086 | 3532 | 566 | -708 |
| 49 | -4279 | 950 | 4980 | 3749 | 452 |
| 50 | -2484 | 3502 | 1719 | -170 | 238 |
| 51 | -3435 | 263 | 2114 | -2005 | 2361 |
| 52 | -7338 | -1208 | 9347 | -1216 | -4013 |
| 53 | -13498 | -439 | 8028 | -4232 | 361 |
| 54 | -3729 | 5433 | 2004 | -4727 | -1259 |
| 55 | -3986 | 7743 | 8429 | -3691 | -987 |
| 56 | 5198 | -423 | 1150 | -1281 | 816 |
| 57 | 7409 | 4109 | -3949 | 2690 | 30 |
| 58 | 1246 | 3055 | -35 | -1370 | -246 |
| 59 | -1489 | 5635 | -678 | -2627 | 3170 |
| 60 | 4830 | -4585 | 2008 | -1062 | 799 |
| 61 | -129 | 717 | 4594 | 14937 | 10706 |
| 62 | 417 | 2759 | 1850 | -5057 | -1153 |
| 63 | -3887 | 7361 | -5768 | 4285 | 666 |
| 64 | 1443 | -938 | 20 | -2119 | -1697 |
| 65 | -3712 | -3402 | -2212 | 110 | 2136 |
| 66 | -2952 | 12 | -1568 | -3500 | -1855 |
| 67 | -1315 | -1731 | 1160 | -558 | 1709 |
| 68 | 88 | -4569 | 194 | -454 | -2957 |

| | | | | | |
|---|---|---|---|---|---|
| 69 | -2839 | -1666 | -273 | 2084 | -155 |
| 70 | -189 | -2376 | 1663 | -1040 | -2449 |
| 71 | -2842 | -1369 | 636 | -248 | -2677 |
| 72 | 1517 | 79 | -3013 | -3669 | -973 |
| 73 | 1913 | -2493 | -5312 | -749 | 1271 |
| 74 | -2903 | -3324 | -3756 | -3690 | -1829 |
| 75 | -2913 | -1547 | -2760 | -1406 | 1124 |
| 76 | 1844 | -1834 | 456 | 706 | -4272 |
| 77 | 467 | -4256 | -1909 | 1521 | 1134 |
| 78 | -127 | -994 | -637 | -1491 | -6494 |
| 79 | 873 | -2045 | -3828 | -2792 | -578 |
| 80 | 2311 | -1817 | 2632 | -3052 | 1968 |
| 81 | 641 | 1194 | 1893 | 4107 | 6342 |
| 82 | -45 | 1198 | 2160 | -1449 | 2203 |
| 83 | -2004 | 1713 | 3518 | 2652 | 4251 |
| 84 | 2936 | -3968 | 1280 | 131 | -1476 |
| 85 | 2827 | 8 | -1928 | 2658 | 3513 |
| 86 | 3199 | -816 | 2687 | -1741 | -1407 |
| 87 | 2948 | 4029 | 394 | -253 | 1298 |
| 88 | 4286 | 51 | -4507 | -32 | -659 |
| 89 | 3903 | 5646 | -5588 | -2592 | 5707 |
| 90 | -606 | 1234 | -1607 | -5187 | 664 |
| 91 | -525 | 3620 | -2192 | -2527 | 1707 |
| 92 | 4297 | -3251 | -2283 | 812 | -2264 |
| 93 | 5765 | 528 | -3287 | 1352 | 1672 |
| 94 | 2735 | 1241 | -1103 | -3273 | -3407 |
| 95 | 4033 | 1648 | -2965 | -1174 | 1444 |
| 96 | 74 | 918 | 1999 | 915 | -1026 |
| 97 | -2496 | -1605 | 2034 | 2950 | 229 |
| 98 | -2168 | 2037 | 15 | -1264 | -208 |
| 99 | -3552 | 1530 | 581 | 1491 | 962 |
| 100 | -2613 | -2338 | 3621 | -1488 | -2185 |
| 101 | -1747 | 81 | 5538 | 1432 | -2257 |
| 102 | -1019 | 867 | 214 | -2284 | -1510 |
| 103 | -1684 | 2816 | -229 | 2551 | -1389 |
| 104 | 2707 | 504 | 479 | 2783 | -1009 |
| 105 | 2517 | -1487 | -1596 | 621 | 1929 |
| 106 | -148 | 2206 | -4288 | 1292 | -1401 |
| 107 | -527 | 1243 | -2731 | 1909 | 1280 |
| 108 | 2149 | -1501 | 3688 | 610 | -4591 |
| 109 | 3306 | -3369 | 1875 | 3636 | -1217 |
| 110 | 2574 | 2513 | 1449 | -3074 | -4979 |
| 111 | 814 | 1826 | -2497 | 4234 | -4077 |
| 112 | 1664 | -220 | 3418 | 1002 | 1115 |

| | | | | | |
|---|---|---|---|---|---|
| 113 | 781 | 1658 | 3919 | 6130 | 3140 |
| 114 | 1148 | 4065 | 1516 | 815 | 199 |
| 115 | 1191 | 2489 | 2561 | 2421 | 2443 |
| 116 | 770 | -5915 | 5515 | -368 | -3199 |
| 117 | 1190 | 1047 | 3742 | 6927 | -2089 |
| 118 | 292 | 3099 | 4308 | -758 | -2455 |
| 119 | 523 | 3921 | 4044 | 1386 | 85 |
| 120 | 4367 | 1006 | -1252 | -1466 | -1383 |
| 121 | 3852 | 1579 | -77 | 2064 | 868 |
| 122 | 5109 | 2919 | -202 | 359 | -509 |
| 123 | 3650 | 3206 | 2303 | 1693 | 1296 |
| 124 | 2905 | -3907 | 229 | -1196 | -2332 |
| 125 | 5977 | -3585 | 805 | 3825 | -3138 |
| 126 | 3746 | -606 | 53 | -269 | -3301 |
| 127 | 606 | 2018 | -1316 | 4064 | 398 |

Next we give the values for the gain codebook. This table not only includes the values for GQ, but also the values for GB, G2 and GSQ as well. Both GQ and GB can be represented exactly in 16-bit arithmetic using Q13 format. The fixed point representation of G2 is just the same as GQ, except the format is now Q12. An approximate representation of GSQ to the nearest integer in fixed point Q12 format will suffice.

| Array Index | 1 | 2 | 3 | 4 | 5 | 6 | 7 | 8 |
|---|---|---|---|---|---|---|---|---|
| GQ ** | 0.515625 | 0.90234375 | 1.579101563 | 2.763427734 | -GQ(1) | -GQ(2) | -GQ(3) | -GQ(4) |
| GB | 0.708984375 | 1.240722656 | 2.171264649 | * | -GB(1) | -GB(2) | -GB(3) | * |
| G2 | 1.03125 | 1.8046875 | 3.158203126 | 5.526855468 | -G2(1) | -G2(2) | -G2(3) | -G2(4) |
| GSQ | 0.26586914 | 0.814224243 | 2.493561746 | 7.636532841 | GSQ(1) | GSQ(2) | GSQ(3) | GSQ(4) |

* Can be any arbitrary value (not used).

** Note that GQ(1) = 33/64, and GQ(i)=(7/4)GQ(i-1) for i=2,3,4.

Table

Values of Gain Codebook Related Arrays

ANNEX C (to Recommendation G.728)

VALUES USED FOR BANDWIDTH BROADENING

The following table gives the integer values for the pole control, zero control and bandwidth broadening vectors listed in Table 2. To obtain the floating point value, divide the integer value by 16384. The values in this table represent these floating point values in the Q14 format, the most commonly used format to represent numbers less than 2 in 16 bit fixed point arithmetic.

| i | FACV | FACGPV | WPCFV | WZCFV | SPFPCFV | SPFZCFV |
|---|---|---|---|---|---|---|
| 1 | 16384 | 16384 | 16384 | 16384 | 16384 | 16384 |
| 2 | 16192 | 14848 | 9830 | 14746 | 12288 | 10650 |
| 3 | 16002 | 13456 | 5898 | 13271 | 9216 | 6922 |
| 4 | 15815 | 12195 | 3539 | 11944 | 6912 | 4499 |
| 5 | 15629 | 11051 | 2123 | 10750 | 5184 | 2925 |
| 6 | 15446 | 10015 | 1274 | 9675 | 3888 | 1901 |
| 7 | 15265 | 9076 | 764 | 8707 | 2916 | 1236 |
| 8 | 15086 | 8225 | 459 | 7836 | 2187 | 803 |
| 9 | 14910 | 7454 | 275 | 7053 | 1640 | 522 |
| 10 | 14735 | 6755 | 165 | 6347 | 1230 | 339 |
| 11 | 14562 | 6122 | 99 | 5713 | 923 | 221 |
| 12 | 14391 | | | | | |
| 13 | 14223 | | | | | |
| 14 | 14056 | | | | | |
| 15 | 13891 | | | | | |
| 16 | 13729 | | | | | |
| 17 | 13568 | | | | | |
| 18 | 13409 | | | | | |
| 19 | 13252 | | | | | |
| 20 | 13096 | | | | | |
| 21 | 12943 | | | | | |
| 22 | 12791 | | | | | |
| 23 | 12641 | | | | | |
| 24 | 12493 | | | | | |
| 25 | 12347 | | | | | |
| 26 | 12202 | | | | | |
| 27 | 12059 | | | | | |
| 28 | 11918 | | | | | |
| 29 | 11778 | | | | | |
| 30 | 11640 | | | | | |
| 31 | 11504 | | | | | |
| 32 | 11369 | | | | | |
| 33 | 11236 | | | | | |

| | |
|---|---|
| 34 | 11104 |
| 35 | 10974 |
| 36 | 10845 |
| 37 | 10718 |
| 38 | 10593 |
| 39 | 10468 |
| 40 | 10346 |
| 41 | 10225 |
| 42 | 10105 |
| 43 | 9986 |
| 44 | 9869 |
| 45 | 9754 |
| 46 | 9639 |
| 47 | 9526 |
| 48 | 9415 |
| 49 | 9304 |
| 50 | 9195 |
| 51 | 9088 |

ANNEX D
(to Recommendation G.728)

COEFFICIENTS OF THE 1 kHz LOWPASS ELLIPTIC FILTER USED IN PITCH PERIOD EXTRACTION MODULE (BLOCK 82)

The 1 kHz lowpass filter used in the pitch lag extraction and encoding module (block 82) is a third-order pole-zero filter with a transfer function of $$L(z) = \frac{\sum_{i=0}^{3} b_i z^{-i}}{1 + \sum_{i=1}^{3} a_i z^{-i}}$$

where the coefficients $a_i$'s and $b_i$'s are given in the following tables.

| $i$ | $a_i$ | $b_i$ |
|---|---|---|
| 0 | — | 0.0357081667 |
| 1 | -2.34036589 | -0.0069956244 |
| 2 | 2.01190019 | -0.0069956244 |
| 3 | -0.614109218 | 0.0357081667 |

ANNEX E
(to Recommendation G.728)

TIME SCHEDULING THE SEQUENCE OF COMPUTATIONS

All of the computation in the encoder and decoder can be divided up into two classes. Included in the first class are those computations which take place once per vector. Sections 3 through 5.14 note which computations these are. Generally they are the ones which involve or lead to the actual quantization of the excitation signal and the synthesis of the output signal. Referring specifically to the block numbers in Fig. 2, this class includes blocks 1, 2, 4, 9, 10, 11, 13, 16, 17, 18, 21, and 22. In Fig. 3, this class includes blocks 28, 29, 31, 32 and 34. In Fig. 6, this class includes blocks 39, 40, 41, 42, 46, 47, 48, and 67. (Note that Fig. 6 is applicable to both block 20 in Fig. 2 and block 30 in Fig. 3. Blocks 43, 44 and 45 of Fig. 6 are not part of this class. Thus, blocks 20 and 30 are part of both classes.)

In the other class are those computations which are only done once for every four vectors. Once more referring to Figures 2 through 8, this class includes blocks 3, 12, 14, 15, 23, 33, 35, 36, 37, 38, 43, 44, 45, 49, 50, 51, 81, 82, 83, 84, and 85. All of the computations in this second class are associated with updating one or more of the adaptive filters or predictors in the coder. In the encoder there are three such adaptive structures, the 50th order LPC synthesis filter, the vector gain predictor, and the perceptual weighting filter. In the decoder there are four such structures, the synthesis filter, the gain predictor, and the long term and short term adaptive postfilters. Included in the descriptions of sections 3 through 5.14 are the times and input signals for each of these five adaptive structures. Although it is redundant, this appendix explicitly lists all of this timing information in one place for the convenience of the reader. The following table summarizes the five adaptive structures, their input signals, their times of computation and the time at which the updated values are first used. For reference, the fourth column in the table refers to the block numbers used in the figures and in sections 3, 4 and 5 as a cross reference to these computations.

By far, the largest amount of computation is expended in updating the 50th order synthesis filter. The input signal required is the synthesis filter output speech (ST). As soon as the fourth vector in the previous cycle has been decoded, the hybrid window method for computing the autocorrelation coefficients can commence (block 49). When it is completed, Durbin's recursion to obtain the prediction coefficients can begin (block 50). In practice we found it necessary to stretch this computation over more than one vector cycle. We begin the hybrid window computation before vector 1 has been fully received. Before Durbin's recursion can be fully completed, we must interrupt it to encode vector 1. Durbin's recursion is not completed until vector 2. Finally bandwidth expansion (block 51) is applied to the predictor coefficients. The results of this calculation are not used until the encoding or decoding of vector 3 because in the encoder we need to combine these updated values with the update of the perceptual weighting filter and codevector energies. These updates are not available until vector 3.

The gain adaptation precedes in two fashions. The adaptive predictor is updated once every four vectors. However, the adaptive predictor produces a new gain value once per vector. In this section we are describing the timing of the update of the predictor. To compute this requires first performing the hybrid window method on the previous log gains (block 43), then Durbin's

| Timing of Adapter Updates | | | |
|---|---|---|---|
| Adapter | Input Signal(s) | First Use of Updated Parameters | Reference Blocks |
| Backward Synthesis Filter Adapter | Synthesis filter output speech (ST) through vector 4 | Encoding/ Decoding vector 3 | 23, 33 (49,50,51) |
| Backward Vector Gain Adapter | Log gains through vector 1 | Encoding/ Decoding vector 2 | 20, 30 (43,44,45) |
| Adapter for Perceptual Weighting Filter & Fast Codebook Search | Input speech (S) through vector 2 | Encoding vector 3 | 3 (36,37,38) 12, 14, 15 |
| Adapter for Long Term Adaptive Postfilter | Synthesis filter output speech (ST) through vector 3 | Synthesizing postfiltered vector 3 | 35 (81 - 84) |
| Adapter for Short Term Adaptive Postfilter | Synthesis filter output Speech (ST) through vector 4 | Synthesizing postfiltered vector 1 | 35 (85) |

recursion (block 44), and bandwidth expansion (block 45). All of this can be completed during vector 2 using the log gains available up through vector 1. If the result of Durbin's recursion indicates there is no singularity, then the new gain predictor is used immediately in the encoding of vector 2.

The perceptual weighting filter update is computed during vector 3. The first part of this update is performing the LPC analysis on the input speech up through vector 2. We can begin this computation immediately after vector 2 has been encoded, not waiting for vector 3 to be fully received. This consists of performing the hybrid window method (block 36), Durbin's recursion (block 37) and the weighting filter coefficient calculations (block 38). Next we need to combine the perceptual weighting filter with the updated synthesis filter to compute the impulse response vector calculator (block 12). We also must convolve every shape codevector with this impulse response to find the codevector energies (blocks 14 and 15). As soon as these computations are completed, we can immediately use all of the updated values in the encoding of vector 3. (Note: Because the computation of codevector energies is fairly intensive, we were unable to complete the perceptual weighting filter update as part of the computation during the time of vector 2, even if the gain predictor update were moved elsewhere. This is why it was deferred to vector 3.)

The long term adaptive postfilter is updated on the basis of a fast pitch extraction algorithm which uses the synthesis filter output speech (ST) for its input. Since the postfilter is only used in the decoder, scheduling time to perform this computation was based on the other computational loads in the decoder. The decoder does not have to update the perceptual weighting filter and codevector energies, so the time slot of vector 3 is available. The codeword for vector 3 is decoded and its synthesis filter output speech is available together with all previous synthesis output vectors. These are input to the adapter which then produces the new pitch period (blocks 81 and 82) and long-term postfilter coefficient (blocks 83 and 84). These new values are immediately used in calculating the postfiltered output for vector 3.

The short term adaptive postfilter is updated as a by-product of the synthesis filter update. Durbin's recursion is stopped at order 10 and the prediction coefficients are saved for the postfilter update. Since the Durbin computation is usually begun during vector 1, the short term adaptive postfilter update is completed in time for the postfiltering of output vector 1.

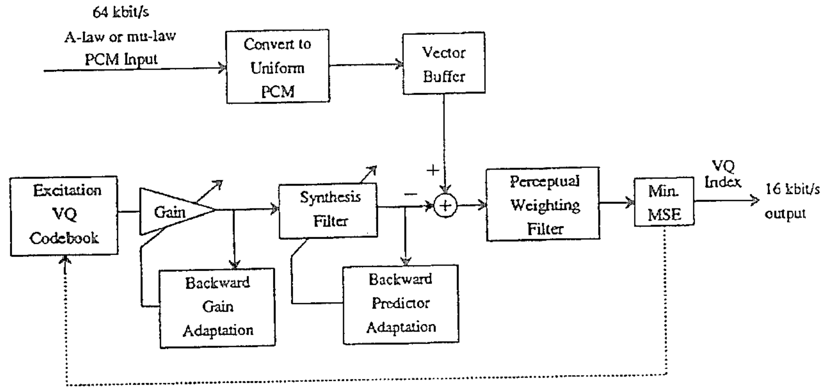
LD-CELP Encoder
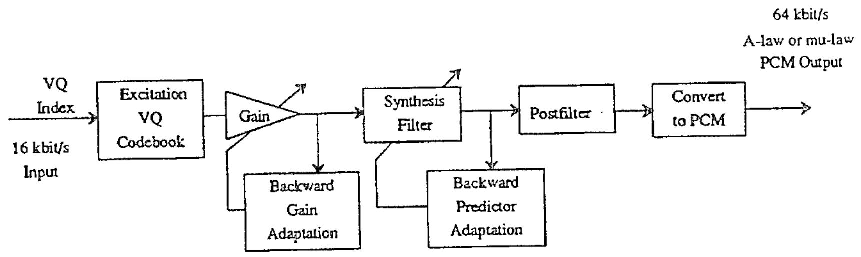
LD-CELP Decoder
Figure 1/G.728 Simplified Block Diagram of LD-CELP Coder

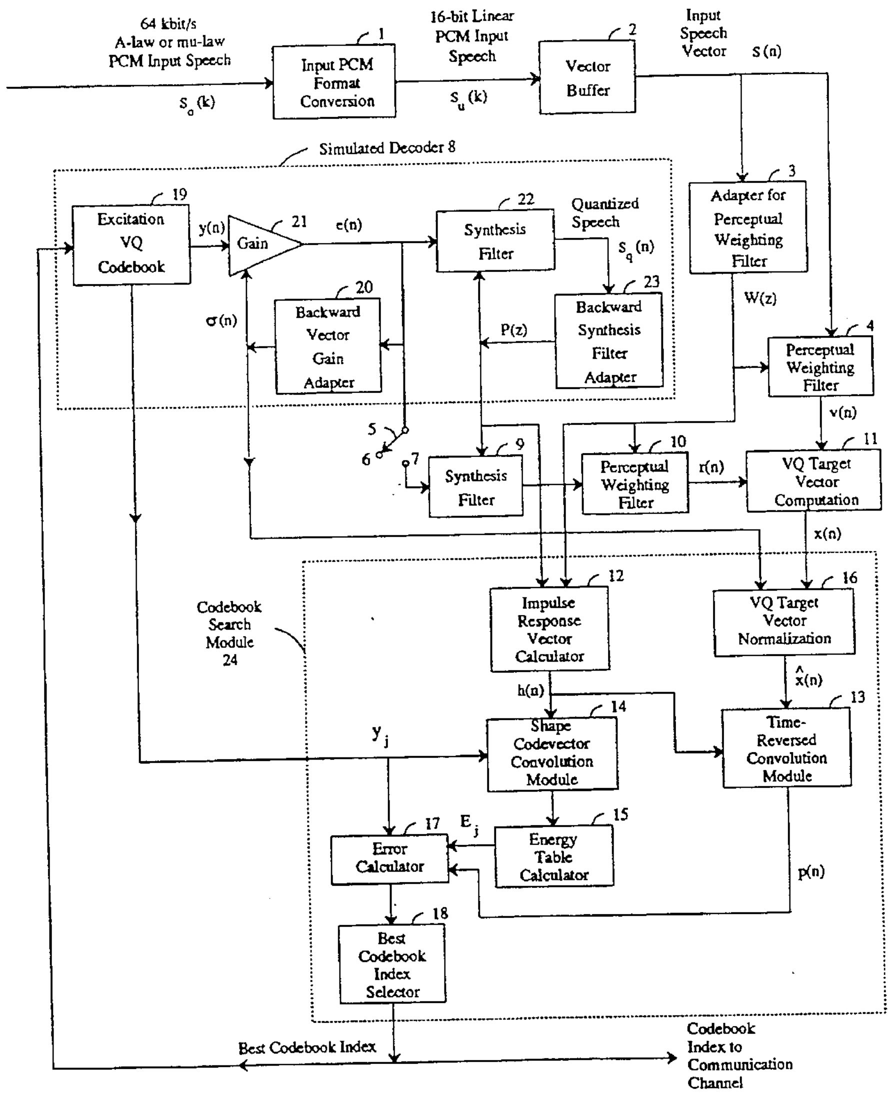
Figure 2/G.728 LD-CELP Encoder Block Schematic

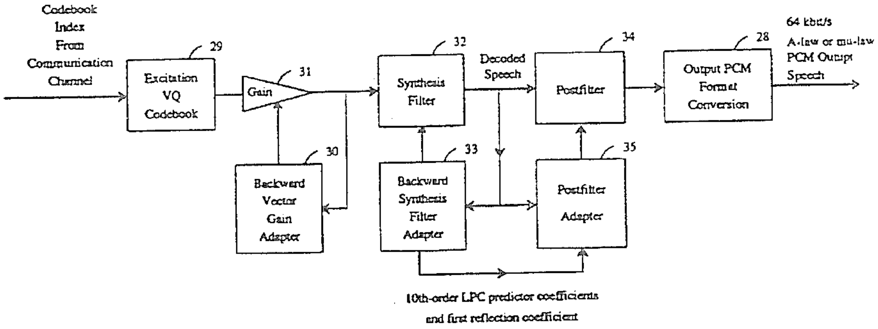
Figure 3/G.728 LD-CELP Decoder Block Schematic

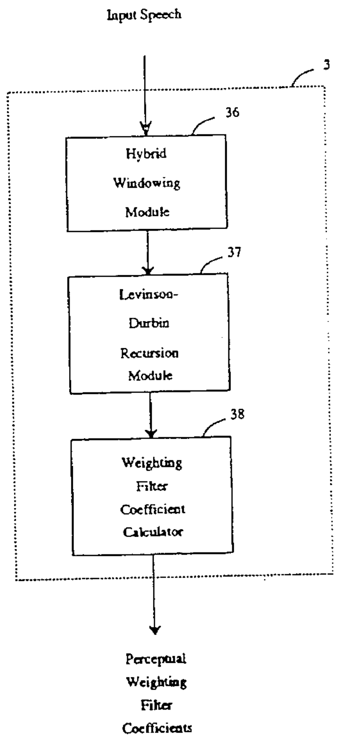
Figure 4(a)/G.728 Perceptual Weighting Filter Adapter

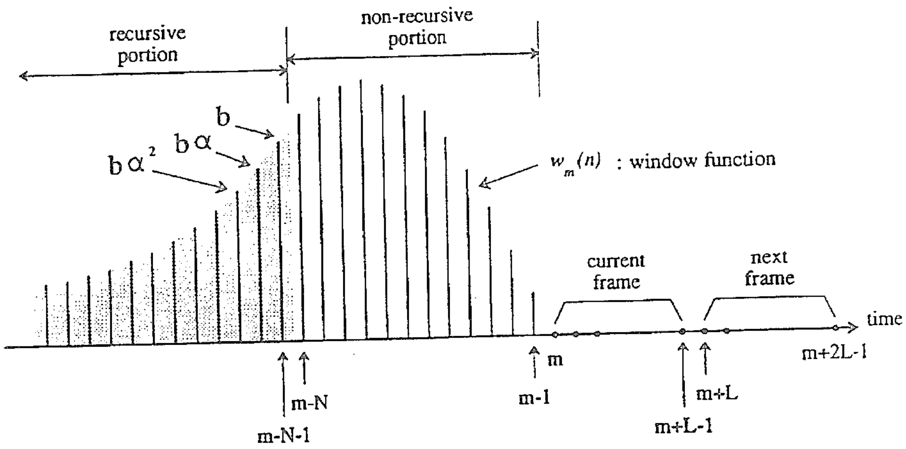
Figure 4(b)/G.728 Illustration of a hybrid window

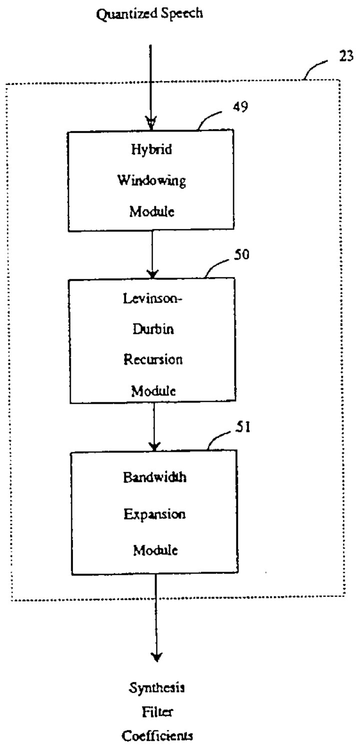
Figure 5/G.728 Backward Synthesis Filter Adapter

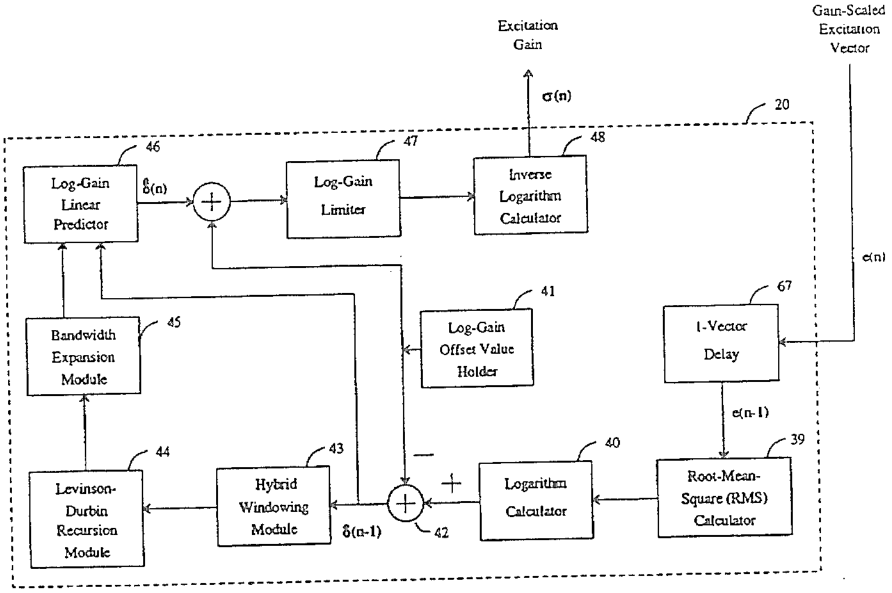
Figure 6/G.728 Backward Vector Gain Adapter

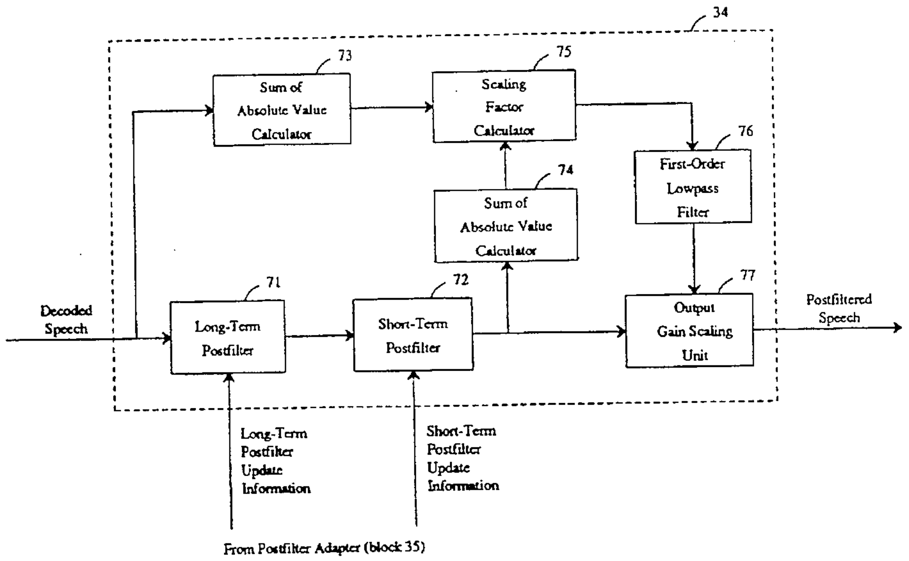
Figure 7/G.728 Postfilter Block Schematic

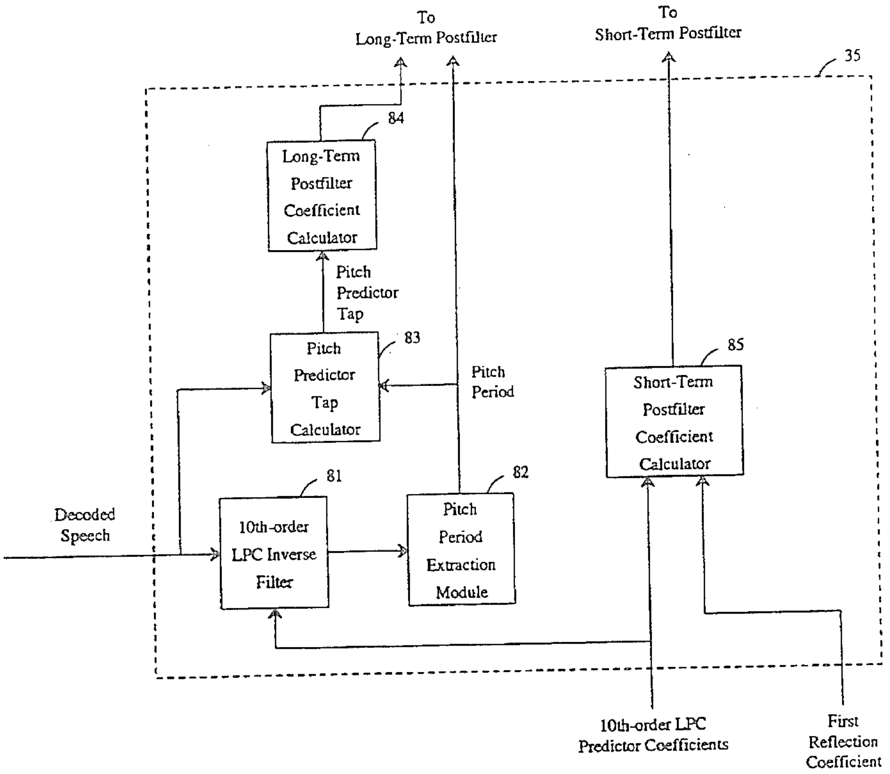
Figure 8/G.728 Postfilter Adapter Block Schematic

APPENDIX 1
(to Recommendation G.728)

IMPLEMENTATION VERIFICATION

A set of verification tools have been designed in order to facilitate the compliance verification of different implementations to the algorithm defined in this Recommendation. These verification tools are available from the ITU on a set of distribution diskettes.

Implementation verification

This Appendix describes the digital test sequences and the measurement software to be used for implementation verification. These verification tools are available from the ITU on a set of verification diskettes.

*I.1 Verification principle*

The LD-CELP algorithm specification is formulated in a non-bitexact manner to allow for simple implementation on different kinds of hardware. This implies that the verification procedure can not assume the implementation under test to be exactly equal to any reference implementation. Hence, objective measurements are needed to establish the degree of deviation between test and reference. If this measured deviation is found to be sufficiently small, the test implementation is assumed to be interoperable with any other implementation passing the test. Since no finite length test is capable of testing every aspect of an implementation, 100% certainty that an implementation is correct can never be guaranteed. However, the test procedure described exercises all main parts of the LD-CELP algorithm and should be a valuable tool for the implementor.

The verification procedures described in this appendix have been designed with 32 bit floating-point implementations in mind. Although they could be applied to any LD-CELP implementation, 32 bit floating-point format will probably be needed to fulfill the test requirements. Verification procedures that could permit a fixed-point algorithm to be realized are currently under study.

*I.2 Test configurations*

This section describes how the different test sequences and measurement programs should be used together to perform the verification tests. The procedure is based on black-box testing at the interfaces SU and ICHAN of the test encoder and ICHAN and SPF of the test decoder. The signals SU and SPF are represented in 16 bits fixed point precision as described in Section I.4.2. A possibility to turn off the adaptive postfilter should be provided in the tested decoder implementation. All test sequence processing should be started with the test implementation in the initial reset state, as defined by the LD-CELP recommendation. Three measurement programs, CWCOMP, SNR and WSNR, are needed to perform the test output sequence evaluations. These programs are further described in Section I.3. Descriptions of the different test configurations to be used are found in the following subsections (I.2.1-I.2.4).

*I.2.1 Encoder test*

The basic operation of the encoder is tested with the configuration shown in Figure I-1/G.728. An input signal test sequence, IN, is applied to the encoder under test. The output codewords are compared directly to the reference codewords, INCW, by using the CWCOMP program.

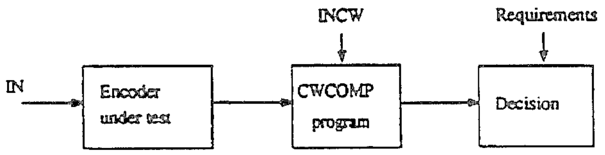

FIGURE I-1/G.728

Encoder test configuration (1)

*I.2.2 Decoder test*

The basic operation of the decoder is tested with the configuration in Figure I-2/G.728. A codeword test sequence, CW, is applied to the decoder under test with the adaptive postfilter turned off. The output signal is then compared to the reference output signal, OUTA, with the SNR program.

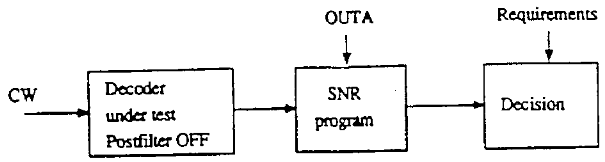

FIGURE I-2/G.728

Decoder test configuration (2)

*I.2.3 Perceptual weighting filter test*

The encoder perceptual weighting filter is tested with the configuration in Figure I-3/G.728. An input signal test sequence, IN, is passed through the encoder under test, and the quality of the output codewords are measured with the WSNR program. The WSNR program also needs the input sequence to compute the correct distance measure.

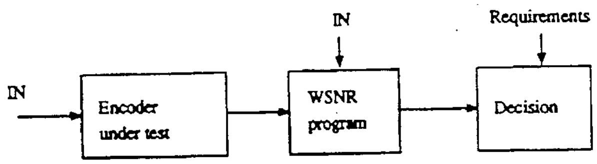

FIGURE I-3/G.728

Decoder test configuration (3)

*I.2.4 Postfilter test*

The decoder adaptive postfilter is tested with the configuration in Figure I-4/G.728. A codeword test sequence, CW, is applied to the decoder under test with the adaptive postfilter turned on. The output signal is then compared to the reference output signal, OUTB, with the SNR program.

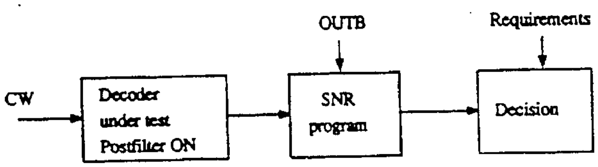

FIGURE I-4/G.728

Decoder test configuration (4)

*I.3 Verification programs*

This section describes the programs CWCOMP, SNR and WSNR, referred to in the test configuration section, as well as the program LDCDEC provided as an implementors debugging tool.

The verification software is written in Fortran and is kept as close to the ANSI Fortran 77 standard as possible. Double precision floating point resolution is used extensively to minimize numerical error in the reference LD-CELP modules. The programs have been compiled with a commercially available Fortran compiler to produce executable versions for 386/87-based PC's. The READ.ME file in the distribution describes how to create executable programs on other computers.

*I.3.1 CWCOMP*

The CWCOMP program is a simple tool to compare the content of two codeword files. The user is prompted for two codeword file names, the reference encoder output (filename in last column of Table I-1/G.728) and the test encoder output. The program compares each codeword in these files and writes the comparison result to terminal. The requirement for test configuration 2 is that no different codewords should exist.

*I.3.2 SNR*

The SNR program implements a signal-to-noise ratio measurement between two signal files. The first is a reference file provided by the reference decoder progam, and the second is the test decoder output file. A global SNR, GLOB, is computed as the total file signal-to-noise ratio. A segmental SNR, SEG256, is computed as the average signal-to-noise ratio of all 256-sample segments with reference signal power above a certain threshold. Minimum segment SNRs are found for segments of length 256, 128, 64, 32, 16, 8 and 4 with power above the same threshold.

To run the SNR program, the user needs to enter names of two input files. The first is the reference decoder output file as described in the last column of Table I-3/G.728. The second is the decoded output file produced by the decoder under test. After processing the files, the program outputs the different SNRs to terminal. Requirement values for the test configurations 2 and 4 are given in terms of these SNR numbers.

*I.3.3 WSNR*

The WSNR algorithm is based on a reference decoder and distance measure implementation to compute the mean perceptually weighted distortion of a codeword sequence. A logarithmic signal-to-distortion ratio is computed for every 5-sample signal vector, and the ratios are averaged over all signal vectors with energy above a certain threshold.

To run the WSNR program, the user needs to enter names of two input files. The first is the encoder input signal file (first column of Table I-1/G.728) and the second is the encoder output codeword file. After processing the sequence, WSNR writes the output WSNR value to terminal. The requirement value for test configuration 3 is given in terms of this WSNR number.

*I.3.4 LDCDEC*

In addition to the three measurement programs, the distribution also includes a reference decoder demonstration program, LDCDEC. This program is based on the same decoder subroutine as WSNR and could be modified to monitor variables in the decoder for debugging purposes. The user is prompted for the input codeword file, the output signal file and whether to include the adaptive postfilter or not.

*I.4 Test sequences*

The following is a description of the test sequences to be applied. The description includes the specific requirements for each sequence.

*I.4.1 Naming conventions*

The test sequences are numbered sequentially, with a prefix that identifies the type of signal:

| | |
|---|---|
| IN: | encoder input signal |
| INCW: | encoder output codewords |
| CW: | decoder input codewords |
| OUTA: | decoder output signal without postfilter |
| OUTB: | decoder output signal with postfilter |

All test sequence files have the extension *.BIN.

*I.4.2 File formats*

The signal files, according to the LD-CELP interfaces SU and SPF (file prefix IN, OUTA and OUTB) are all in 2's complement 16 bit binary format and should be interpreted to have a fixed binary point between bit #2 and #3, as shown in Figure I-5/G.728. Note that all the 16 available bits must be used to achieve maximum precision in the test measurements.

The codeword files (LD-CELP signal ICHAN, file prefix CW or INCW), are stored in the same 16 bit binary format as the signal files. The least significant 10 bits of each 16 bit word represent the 10 bit codeword, as shown in Figure I-5/G.728. The other bits (#12-#15) are set to zero.

Both signal and codeword files are stored in the low-byte first word storage format that is usual on IBM/DOS and VAX/VMS computers. For use on other platforms, such as most UNIX machines, this ordering may have to be changed by a byteswap operation.

| | | | | | | | | | | | | | | | | |
|---|---|---|---|---|---|---|---|---|---|---|---|---|---|---|---|---|
| Signal: | +/- | 14 | 13 | 12 | 11 | 10 | 9 | 8 | 7 | 6 | 5 | 4 | 3 | 2 | 1 | 0 |
| | | | | | | | | | | | | fixed binary point | | | | |
| Codeword: | - | - | - | - | - | - | 9 | 8 | 7 | 6 | 5 | 4 | 3 | 2 | 1 | 0 |
| Bit #: | 15 (MSB/sign bit) | | | | | | | | | | | | | | | 0 (LSB) |

FIGURE I-5/G.728

Signal and codeword binary file format

*I.4.3 Test sequences and requirements*

The tables in this section describe the complete set of tests to be performed to verify that an implementation of LD-CELP follows the specification and is interoperable with other correct implementations. Table I-1/G.728 is a summary of the encoder tests sequences. The corresponding requirements are expressed in Table I-2/G.728. Table I-3/G.728 and I-4/G.728 contain the decoder test sequence summary and requirements.

TABLE I-3/G.728

Decoder tests

| Input signal | Length, vectors | Description of test | Test config. | Output signal |
|---|---|---|---|---|
| CW1 | 1536 | Test that all 1024 possible codewords are properly implemented | 2 | OUTA1 |
| CW2 | 1792 | Exercise dynamic range of log-gain autocorrelation function | 2 | OUTA2 |
| CW3 | 1280 | Exercise dynamic range of decoded signals autocorrelation function | 2 | OUTA3 |
| CW4 | 10240 | Test decoder with frequency sweep through typical speech pitch range | 2 | OUTA4 |
| CW4 | 10240 | Test postfilter with frequency sweep through allowed pitch range | 4 | OUTB4 |
| CW5 | 84480 | Real speech signal with different input levels and microphones | 2 | OUTA5 |
| CW6 | 256 | Test decoder limiters | 2 | OUTA6 |

TABLE I-4/G.728

Decoder test requirements

| Output file name | Requirements (minimum values for SNR, in dB) SEG256 | GLOB | MIN256 | MIN128 | MIN64 | MIN32 | MIN16 | MIN8 | MIN4 |
|---|---|---|---|---|---|---|---|---|---|
| OUTA1 | 75.00 | 74.00 | 68.00 | 68.00 | 67.00 | 64.00 | 55.00 | 50.00 | 41.00 |
| OUTA2 | 94.00 | 85.00 | 67.00 | 58.00 | 55.00 | 50.00 | 48.00 | 44.00 | 41.00 |
| OUTA3 | 79.00 | 76.00 | 70.00 | 28.00 | 29.00 | 31.00 | 37.00 | 29.00 | 26.00 |
| OUTA4 | 60.00 | 58.00 | 51.00 | 51.00 | 49.00 | 46.00 | 40.00 | 35.00 | 28.00 |
| OUTB4 | 59.00 | 57.00 | 50.00 | 50.00 | 49.00 | 46.00 | 40.00 | 34.00 | 26.00 |
| OUTA5 | 59.00 | 61.00 | 41.00 | 39.00 | 39.00 | 34.00 | 35.00 | 30.00 | 26.00 |
| OUTA6 | 69.00 | 67.00 | 66.00 | 64.00 | 63.00 | 63.00 | 62.00 | 61.00 | 60.00 |

TABLE I-1/G.728

Encoder tests

| Input signal | Length, vectors | Description of test | Test config. | Output signal |
|---|---|---|---|---|
| IN1 | 1536 | Test that all 1024 possible codewords are properly implemented | 1 | INCW1 |
| IN2 | 1536 | Exercise dynamic range of log-gain autocorrelation function | 1 | INCW2 |
| IN3 | 1024 | Exercise dynamic range of decoded signals autocorrelation function | 1 | INCW3 |
| IN4 | 10240 | Frequency sweep through typical speech pitch range | 1 | INCW4 |
| IN5 | 84480 | Real speech signal with different input levels and microphones | 3 | - |
| IN6 | 256 | Test encoder limiters | 1 | INCW6 |

TABLE I-2/G.728

Encoder test requirements

| Input signal | Output signal | Requirement |
|---|---|---|
| IN1 | INCW1 | 0 different codewords detected by CWCOMP |
| IN2 | INCW2 | 0 different codewords detected by CWCOMP |
| IN3 | INCW3 | 0 different codewords detected by CWCOMP |
| IN4 | INCW4 | 0 different codewords detected by CWCOMP |
| IN5 | - | WSNR > 20.55 dB |
| IN6 | INCW6 | 0 different codewords detected by CWCOMP |

*I.5. Verification tools distribution*

All the files in the distribution are stored in two 1.44 Mbyte 3.5" DOS diskettes. Diskette copies can be ordered from the ITU at the following address:

ITU General Secretariat
Sales Service
Place du Nations
CH-1211 Geneve 20
Switzerland A READ.ME file is included on diskette #1 to describe the content of each file and the procedures necessary to compile and link the programs. Extensions are used to separate different file types. *.FOR files are source code for the fortran programs, *.EXE files are 386/87 executables and *.BIN are binary test sequence files. The content of each diskette is listed in Table I-5/G.728.

TABLE I-5/G.728

Distribution directory

| Disk | Filename | Number of bytes |
|---|---|---|
| Diskette #1<br>Total size:<br>1 289 859 bytes | READ.ME | 10430 |
| | CWCOMP.FOR | 2642 |
| | CWCOMP.EXE | 25153 |
| | SNR.FOR | 5536 |
| | SNR.EXE | 36524 |
| | WSNR.FOR | 3554 |
| | WSNR.EXE | 103892 |
| | LDCDEC.FOR | 3016 |
| | LDCDEC.EXE | 101080 |
| | LDCSUB.FOR | 37932 |
| | FILSUB.FOR | 1740 |
| | DSTRUCT.FOR | 2968 |
| | IN1.BIN | 15360 |
| | IN2.BIN | 15360 |
| | IN3.BIN | 10240 |
| | IN5.BIN | 844800 |
| | IN6.BIN | 2560 |
| | INCW1.BIN | 3072 |
| | INCW2.BIN | 3072 |
| | INCW3.BIN | 2048 |
| | INCW6.BIN | 512 |
| | CW1.BIN | 3072 |
| | CW2.BIN | 3584 |
| | CW3.BIN | 2560 |
| | CW6.BIN | 512 |
| | OUTA1.BIN | 15360 |
| | OUTA2.BIN | 17920 |
| | OUTA3.BIN | 12800 |
| | OUTA6.BIN | 2560 |
| Diskette #2<br>Total size:<br>1 361 920 bytes | IN4.BIN | 102400 |
| | INCW4.BIN | 20480 |
| | CW4.BIN | 20480 |
| | CW5.BIN | 168960 |
| | OUTA4.BIN | 102400 |
| | OUTB4.BIN | 102400 |
| | OUTA5.BIN | 844800 |

We claim:

1. A method of generating linear prediction filter coefficient signals during frame erasure, the generated linear prediction coefficient signals for use by a linear prediction filter in synthesizing a speech signal, the method comprising the steps of:

storing linear prediction coefficient signals in a memory, said linear prediction coefficient signals generated responsive to a speech signal corresponding to a non-erased frame; and responsive to a frame erasure, scaling one or more of said stored linear prediction coefficient signals by a scale factor, BEF raised to an exponent i, where $0.95 \leqq BEF \leqq 0.99$ and where i indexes the stored linear prediction coefficient signals, the scaled linear prediction coefficient signals applied to the linear prediction filter for use in synthesizing the speech signal.

2. The method of claim 1 wherein BEF is substantially equal to 0.97.

3. The method of claim 1 wherein BEF is substantially equal to 0.98.

4. The method of claim 1 wherein the linear prediction filter comprises a 50th order linear prediction filter and said exponent indexes 50 linear prediction coefficient signals.

5. The method of claim 1 wherein the linear prediction filter comprises a filter of an order greater than 20 and said exponent indexes a number of linear prediction coefficient signals, the number equal to the order of the filter.

6. The method of claim 1 wherein the step of scaling is performed once per erased frame.

* * * * *